United States Patent [19]

Kishigami et al.

[11] Patent Number: 5,787,132
[45] Date of Patent: Jul. 28, 1998

[54] DATA COMMUNICATION SYSTEM HAVING IMPROVED SYNCHRONIZATION CAPABILITY

[75] Inventors: Tomohisa Kishigami, Obu; Katsuhisa Tsuji, Hoi-gun; Yoshiki Tatsutomi, Obu, all of Japan

[73] Assignee: Nippondenso Co., Ltd., Kariya, Japan

[21] Appl. No.: 504,456

[22] Filed: Jul. 20, 1995

[30] Foreign Application Priority Data

Jul. 25, 1994 [JP] Japan .................. 6-172475
Dec. 13, 1994 [JP] Japan .................. 6-309130

[51] Int. Cl.$^6$ .................. H04L 7/00; H04L 7/06; H04L 13/10; H04L 12/42
[52] U.S. Cl. .................. 375/354; 375/364; 375/369; 370/304; 370/305; 370/449
[58] Field of Search .................. 375/354, 363, 375/364, 365, 368, 369, 370, 359, 293, 238, 360; 370/212, 304, 305, 489, 449, 539; 340/825.15

[56] References Cited

U.S. PATENT DOCUMENTS

| | | | |
|---|---|---|---|
| 5,268,937 | 12/1993 | Marbot .................. | 375/121 |
| 5,305,316 | 4/1994 | Yoshida et al. .................. | 370/85.1 |
| 5,357,542 | 10/1994 | Suzuki .................. | 375/3 |
| 5,493,571 | 2/1996 | Engdahl et al. .................. | 370/105.4 |
| 5,532,692 | 7/1996 | Tatsuya .................. | 340/825.54 |
| 5,546,427 | 8/1996 | Shimada et al. .................. | 375/293 |

*Primary Examiner*—Chi H. Pham
*Assistant Examiner*—Khai Tran
*Attorney, Agent, or Firm*—Cushman Darby & Cushman IP Group of Pillsbury Madison & Sutro LLP

[57] ABSTRACT

A data receiving unit includes a data receiving circuit for receiving, through a transmission path, transmission data which has been encoded into a predetermined transmission code by using a predetermined transmission clock signal and includes a reference pulse having a pulse width corresponding to a period of the transmission clock signal, a clock for generating a received clock signal in synchronization with the transmission data, and a data decoding circuit for decoding the transmission data received by the data receiving circuit using the received clock signal generated by the clock, where the clock includes an oscillator generating at least a reference clock having a period which is shorter than that of the transmission clock signal, a counter circuit counting an interval between points of change of the transmission data received by the data receiving circuit according to the reference clock signal, a reference pulse detector circuit for detecting the reference pulse on the basis of a count value from the counter circuit, and a received clock signal generating circuit for generating a received clock signal in synchronization with the transmission data by frequency-dividing the reference clock signal on the basis of the count value when the counter circuit counts the pulse width of the reference pulse.

16 Claims, 36 Drawing Sheets

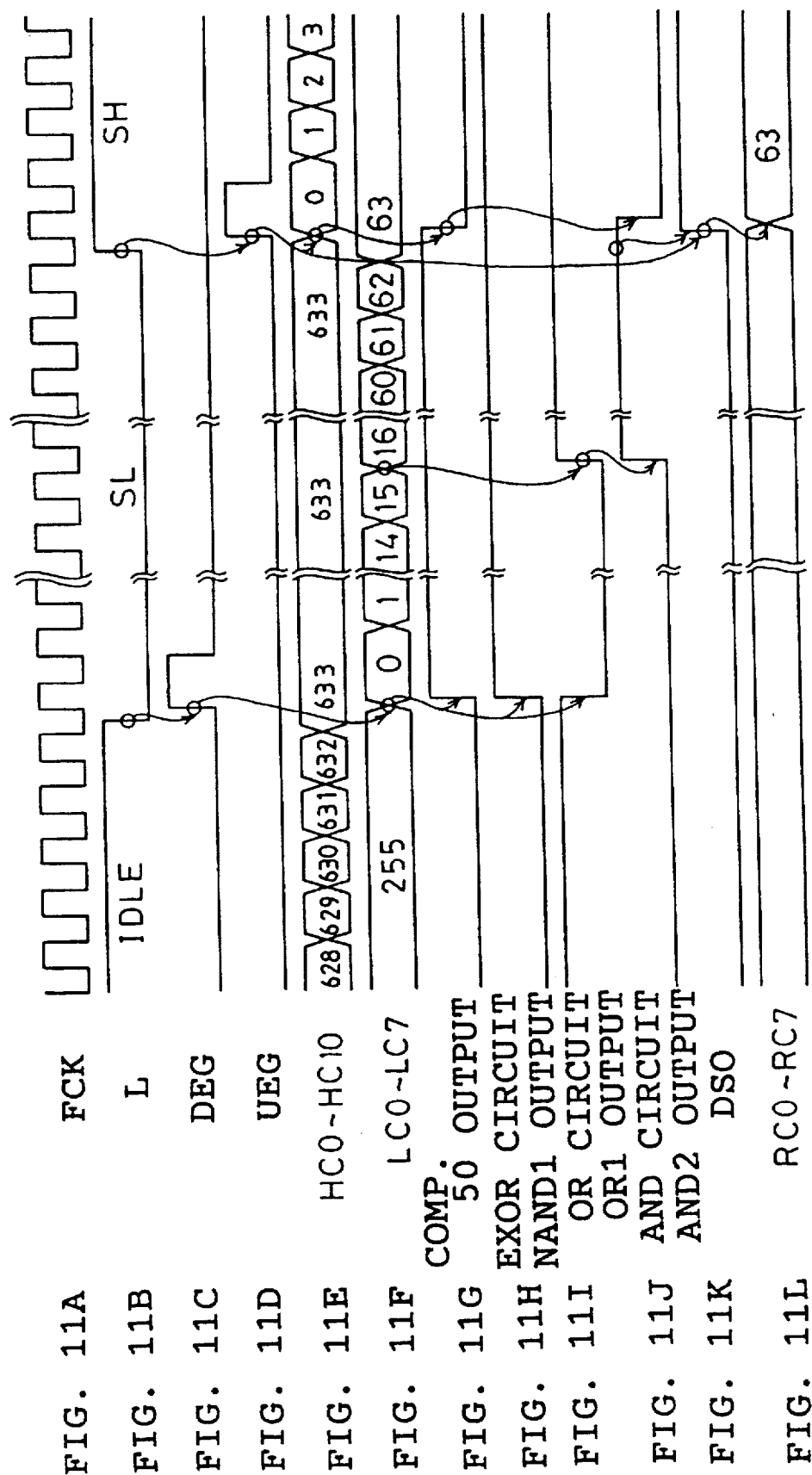

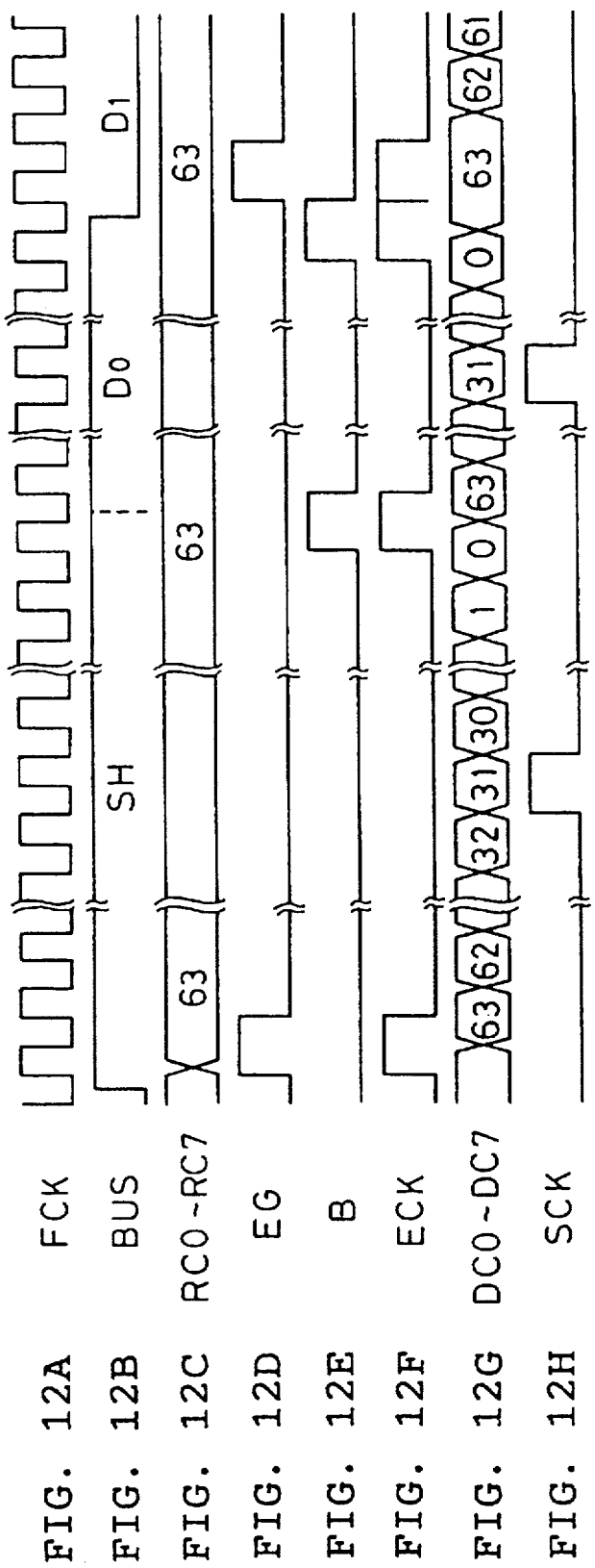

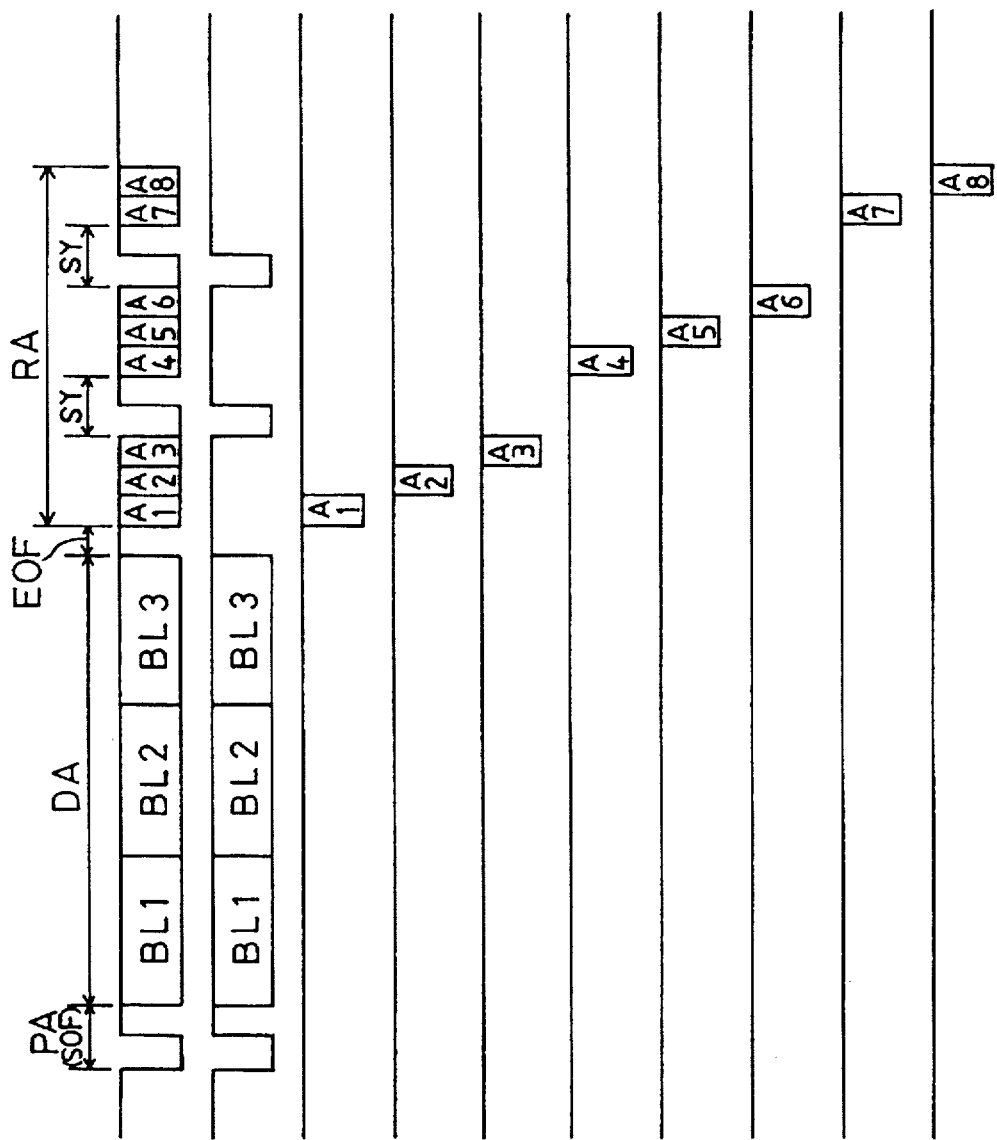

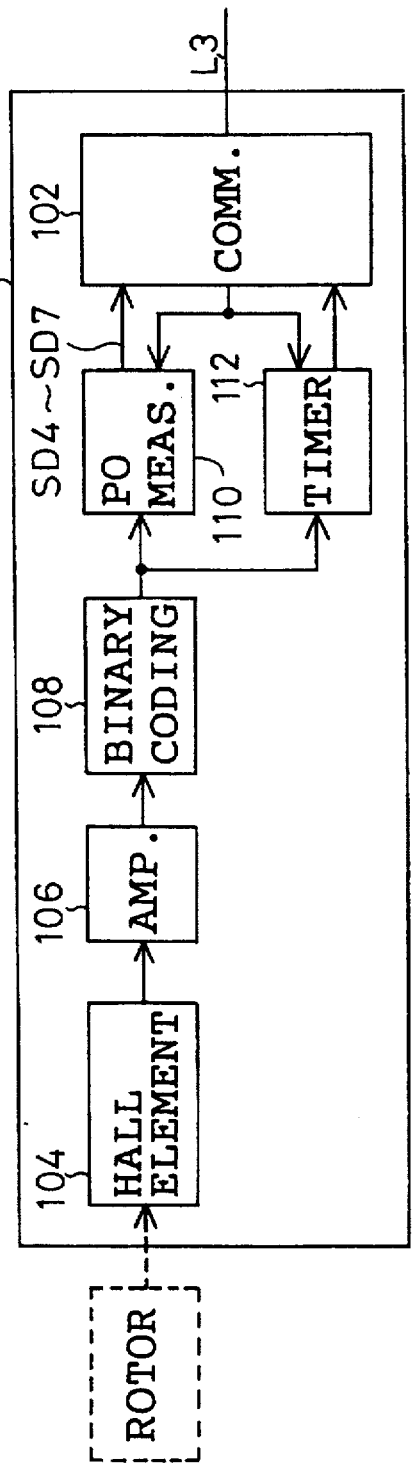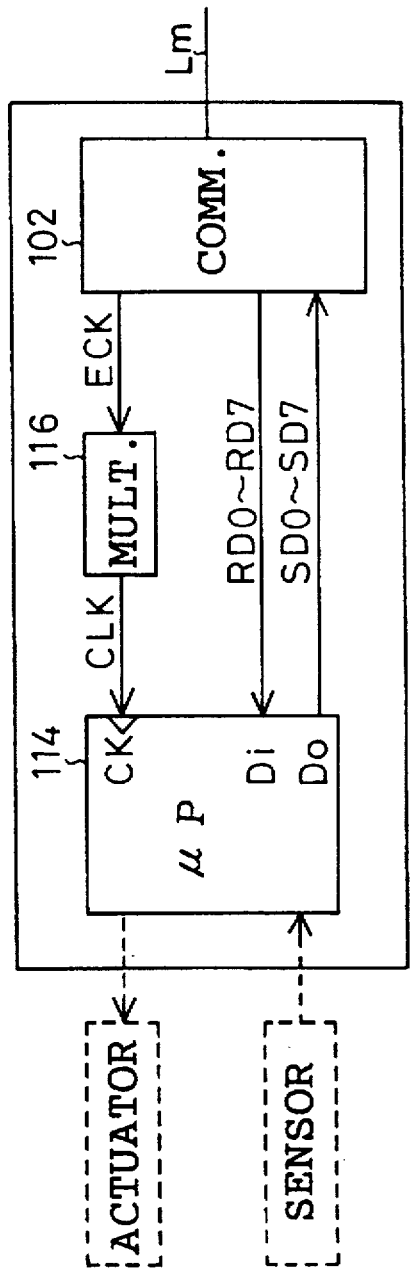

DATA COMMUNICATION SYSTEM HAVING IMPROVED SYNCHRONIZATION CAPABILITY

CROSS-REFERENCE TO RELATED APPLICATIONS

This application is related to and claims priority under 35 U.S.C. §119 from Japanese Patent Application Nos. Hei. 6-172475 and 6-309130, hereby incorporated by reference.

BACKGROUND OF THE INVENTION

1. Field of the Invention

The present invention relates to a data receiving unit for receiving transmission data, which has been encoded using a predetermined transmission code, through a transmission path and decoding the received transmission data, a data transmitting unit for transmitting transmission data suitable for processing by the data receiving unit, and a data communication unit which includes the data receiving unit and the data transmitting unit.

2. Description of the Related Art

One prior art system for controlling an object such as an engine or a brake employs drive units for controlling a variety of actuators such as motors and solenoids, where the drive units are coupled to an electronic control unit (ECU) which controls them through a transmission path so that serial data communication is conducted between the drive units and the ECU via the transmission path, and the object to be controlled is driven by the actuators.

There are two types of serial data receiving units for use in such a control unit. One type is a receiving unit for start-stop asynchronous communication, equipped with a local oscillator, which conducts the receiving operation due to its individual clock signal, and the other type is a receiving unit for synchronous communication which conducts the receiving operation upon receipt of a clock signal synchronous with transmission data from a transmitting side.

For example, a prior art receiving unit for start-stop communication (that is, an asynchronous communication type receiving unit) may include, as shown in FIG. 36A, a receiver 200 for receiving transmission data on a transmission path, a control circuit 202 for decoding a control signal received through a transmission path and for producing a drive signal for driving a predetermined actuator, a driver 204 for sending out a signal outputted from the control circuit 202 to the transmission path, a drive circuit 206 which includes a drive transistor or the like for driving an actuator or other such device in response to a drive signal outputted from the control circuit 202, and a local oscillator 208 acting as a clock for operating the control circuit 202 and other sections. The receiving unit thus organized receives transmission data in accordance with the clock signal produced by the local oscillator 208.

Also, a prior art receiving unit for synchronous communication may include, as shown in FIG. 36B, a control circuit 210, a receiver 212, a driver 214 and a control circuit 216. As a clock for operating the control circuit 210 and other sections, the receiving unit receives a clock signal synchronous with transmission data from the transmission side through another transmission path which is provided separately from the transmission path for data communication, without using the local oscillator 208.

However, in the asynchronous receiving unit, it is previously determined that one bit of transmission data is sampled every predetermined number of clock cycles, and a clock period of the receiving unit must be identical to that of the transmitting side to prevent mis-synchronization. For that reason, a clock signal must be produced by using a high-accuracy timing element such as a quartz crystal or ceramic element. When a communication unit is intended to be downsized or manufactured inexpensively, the communication unit is generally integrated into an IC. However, because the quartz crystal or ceramic element cannot be formed integrally on a chip as can other components, the oscillator element must be provided external to the IC. This prevents the communication unit from being downsized and manufactured inexpensively.

On the other hand, in the receiving unit for synchronous communication which transmits a clock signal through another path as shown in FIG. 36B, a dedicated transmission path through which the clock signal is transmitted is additionally required, thereby resulting in an increased number of pins for wiring or connectors linking the receiving unit with the transmission side.

Japanese Patent Application Laid-Open No. Hei. 2-305038 discloses a receiving unit which includes an APLL (analog phase locked loop) that has a voltage controlled oscillator which is capable of varying its oscillation frequency by controlling an input voltage, a phase comparator for comparing a phase of a clock signal outputted by the voltage controlled oscillator with that of received data, and a loop filter for producing a voltage corresponding to a phase difference detected by the phase comparator.

The APLL reproduces a clock signal which is synchronous with transmission data received through the transmission path by controlling its clock frequency to reduce the phase difference detected by the phase comparator.

However, in order to make the phase of a clock signal outputted by the voltage-controlled oscillator coincide with that of received data, the APLL must continuously transmit a signal for synchronizing a clock for a long time before sending out data. This reduces the efficiency of transmitting data on the transmission path.

SUMMARY OF THE INVENTION

The present invention has been made to solve the foregoing problems, and an object of the present invention is to provide a data receiving unit, a data transmitting unit and a data communication unit where the receiving unit requires no high-accuracy clock source and is capable of producing a received clock in synchronization with the phase of transmission data.

To solve the foregoing problems, a first aspect of the invention includes a data receiving circuit for receiving, through a transmission path, transmission data which has been encoded according to a predetermined transmission code by using a predetermined transmission clock signal and has a reference pulse with a pulse width corresponding to a period of the transmission clock signal, a clock for generating a received clock signal in synchronization with the transmission data, and a data decoding circuit for decoding the transmission data received by the data receiving circuit by using the received clock signal generated by the clock, wherein the clock comprises an oscillator for generating at least a reference clock having a period which is shorter than that of the transmission clock signal, a counter circuit for counting an interval between points of change of the transmission data received by the data receiving circuit according to the reference clock signal, a reference pulse detector circuit for detecting the reference pulse on the basis of a count value from the counter circuit; and a received clock signal generating circuit for generating a received clock signal in synchronization with the transmission data by frequency-dividing the reference clock signal on the basis of the count value when the counter circuit counts the pulse width of the reference pulse.

Thus, the data receiving circuit receives, through a transmission path, transmission data which has been encoded according to a predetermined transmission code by using a predetermined transmission clock signal and includes a reference pulse having a pulse width corresponding to a period of the transmission clock signal. In this situation, in the clock, the counter circuit counts an interval between points of change of the transmission data received by the data receiving circuit by using the reference clock signal having at least a period which is shorter than that of the transmission clock signal, and the reference pulse detector circuit detects the reference pulse contained in the transmission data on the basis of a count value from the counter circuit. The received clock signal generating circuit generates a received clock signal which has a period substantially identical with that of the transmission clock signal and is synchronous with the transmission data by frequency-dividing the reference clock signal on the basis of the count value obtained by counting the pulse width of the reference pattern detected. Then, the data decoding circuit decodes the transmission data received by using the received clock signal generated by the clock.

In other words, by utilizing the fact that the reference pulse contained in the transmission data received corresponds to a period of the transmission clock signal obtained by encoding the transmission data, the reference pulse is detected, and its pulse width is measured by using the reference clock signal, to thereby generate the received clock signal having the same speed as the communication speed of the transmission data.

Therefore, information necessary for generating the received clock signal is obtained by counting the reference pulses in accordance with the reference clock signals. As a result, the received clock signal having the same speed as the communication speed of the transmission data can be generated in a remarkably short time.

Also, unlike the conventional asynchronous communication, it is unnecessary to make the clock frequency of the transmission side coincide with that of the reception side with accuracy. As a result, the manufacturing, adjustment and calibration of the unit is simplified.

Further, once the transmission data including the reference pulse is received, then the received clock signal can be generated in accordance with that transmission data. However, for example, if the reference pulse is set to be always contained in each of transmission data, the reference pulse width is again measured every the reference pulse is detected, and a period of the received clock signal can be corrected on the basis of the measured value. As a result, communication can be conducted without any problem even though the clock signal at the transmission side or the reference clock signal at the reception side is less stable and its frequency often fluctuates. By corollary, no high-accuracy clock source is required and the unit can be implemented inexpensively because fluctuation of the clock signal is permitted.

Moreover, even though transmission data is encoded by an entirely different transmission clock signal, the transmission data can be received without any problem as long as the duration of the transmission data is sufficiently larger than the reference clock signal.

Further, the clock may include a correction circuit which resets the received clock generating circuit when detecting the point of change of the transmission data, for correcting a phase shift of the received clock signal. Thus, the clock includes a correction circuit which resets the received clock generating circuit when detecting the point of change of the transmission data, for correcting a phase shift of the received clock so as to coincide with the phase of the transmission data.

In other words, when the pulse width of the reference pulse is not an accurate integral multiple of the reference clock signal, the shift of phases is accumulated gradually over a number of bits. However, if the correction circuit resets the received clock generating circuit at the point of change of the transmission data, that is, at the boundary of bits of the transmission data, the start of frequency division of the reference clock signal coincides with the point of change of the transmission data so that the phases of received clock signal and the transmission data can coincide with each other.

Therefore, if the transmission data in which the point of change always exists within a predetermined interval is transmitted from the transmitting side, the phase of the received clock signal can be corrected before the phase shift is accumulated and synchronization is lost. As a result, even data having a long frame length can be received.

Also, the reference pulse detector circuit may detect the reference pulse on the basis of a ratio of the count values of intervals of two continuous sections having opposite levels, the two continuous sections interposing the point of change of the transmission data therebetween. Thus, the reference pulse detector circuit detects the reference pulse on the basis of a ratio of the count values of intervals of two continuous sections having opposite levels, which are counted by the counter circuit, the two continuous sections interposing the point of change of the transmission data therebetween. Therefore, the reference pulse can be reliably detected even though the number of cycles of the reference clock signal to which one bit of the transmission clock signal in accordance with which the transmission data has been encoded corresponds is not known.

In other words, usually, in communication between the units for reproducing clock signals at the receiving side on the basis of the transmission data, if data is normally sent out, the same level is not maintained a predetermined number of clock cycles or more. The same level is maintained for the predetermined number of clock cycles or more only when there is no signal and no transmission data is sent out on a transmission path. For that reason, for example, if a reference pulse having a level opposite to the signal level during the no-signal state is added to a head of the transmission data, it can be judged whether a reference pulse is detected or not by investigating whether the ratio of the count value of counting the level during the no-signal state and the count value of the opposite level is larger than the ratio of the predetermined clock signal and the reference pulse.

The ratio of the count value may be set to a ratio by which the violation of an encoding rule of a transmission code to be used is detected. Also, the reference pulse is detected not by a fixed bit width but by the ratio of signal levels. As a result, even in the case where a transmission clock signal fluctuates a great deal or is otherwise changed, the reference pulse can be reliably detected without any modification, and a received clock signal which is synchronous with the transmission data can be generated.

Moreover, the clock generating circuit may include a count value determining circuit for determining whether the count value of the counter circuit is within a predetermined range having a count value used for the frequency division of the reference clock as a reference when the reference pulse detector circuit detects the reference pulse, and when the counter value determining circuit determines that the count value of the counter circuit is within the predetermined range, the count value used for the frequency division of the reference clock is renewed to a count value of the counter circuit.

Thus, the count value determining circuit determines whether the count value of the counter circuit is within a predetermined range having a count value used for the frequency division of the reference clock as a reference when the reference pulse detector circuit detects the reference pulse. When the counter value determining circuit determines that the count value of the counter circuit is within the predetermined range, the count value used for the frequency division of the reference clock is renewed to a count value of the counter circuit.

Therefore, even if the clock generating circuit malfunctions due to noise or the like, a received clock signal with a high reliability can be generated in spite of the malfunction. In other words, even though the count value of the counter circuit may vary because the accuracy of the oscillating circuit is lowered, it still will be within a certain range, and the fluctuation of the count value stays within a predetermined range having the count value of counting the previous reference pulses as a reference. Therefore, when the count value is out of the predetermined range, it is determined that the clock generating circuit has malfunctioned. Then, the count value used for the frequency division of the reference clock is not renewed, and a received clock signal with a high reliability can be produced with the use of the previous count value.

Further, the unit may include an error determining circuit for determining whether data decoded by the data decoding means is in error, and the count value judging circuit may include a judgement range changing circuit for changing the predetermined range used for determining by the count value determining circuit on the basis of the determination result from the error determining circuit. Thus, the error determining circuit determines whether data decoded by the data decoding circuit on the basis of the received clock is in error or not, and the judgement range changing circuit changes the predetermined range used for determination in the count value determination circuit on the basis of the determination result.

Therefore, a received clock signal which is more reliably stabilized can be generated. In other words, because the data decoding circuit decodes the received transmission data by using a reception clock signal generated by the clock generating circuit, the out-of-synchronization of the reception clock is deemed by the error determining circuit as an error of demodulated data.

When the error determining circuit determines that there is no error, i.e., when the reception clock is in synchronization with the transmission data, the count value is not largely shifted from the predetermined range when the succeeding reference pulse has been detected. Hence, in this situation, with the predetermined range being narrowed, even though a signal close to the reference pulse is generated due to noise or the like, the count value can be prevented from being renewed following generation of that signal. As a result, a stabilized clock signal can be generated.

Also, when the error determining circuit determines that there is an error, the reception clock signal may be out of synchronization because of the change in state of the oscillator or the like. When the succeeding reference pulse is detected, the count value cannot be predicted. Therefore, in this case, if the predetermined range is broadened, even though the count value is greatly changed with the change in state of the oscillator, it can follow the new state rapidly. As a result, since the reception clock can be rapidly returned to the state where the reception clock is synchronous with the transmission data, stabilized communication can be realized.

In this way, a method of changing the predetermined range, a method in which the predetermined range is broadened when the error determining circuit determines that there is an error is disclosed where the range is narrowed when the error determining circuit determines that there is no error.

Also, the data receiving circuit may include multiple binary coding circuits having threshold values different from each other, with a clock generating and data decoding circuit being provided for each of the binary coding circuits, and an error determining circuit for determining whether data which has been decoded by each of the data decoding circuits is in error and a selection output circuit for selecting an output of the data decoding circuits which is determined to be error-free by the error determining circuit to output a selected output.

Thus, the data receiving circuit subjects the transmission data to binary coding simultaneously and takes in it through a plurality of binary coding circuits having threshold values different from each other. The taken-in data is decoded by the clock and data decoding circuits provided for each of the binary coding circuits. The error determining circuit determines whether data which has been decoded by each of the data decoding means is in error. The selection output circuit selectively outputs an output from the data decoding circuits which is determined to be error-free. Therefore, according to the present invention, even when the signal level of the transmission data fluctuates, the transmission data can be reliably received.

In other words, if there are multiple transmitting data transmitters, the signal levels of the transmission data which is received by the data receiving unit may be different from each other depending on the transmitter of transmission data. In order to cope with this, there has been known a device which can change a threshold value in accordance with the signal level. In this device, reception becomes unstabilized because the threshold value fluctuates when the signal level fluctuates. This leads to problems such as that the transmission data at that time cannot be received normally. However, according to the present invention, the received transmission data is binary coded by a plurality of threshold values simultaneously and then read so that the received data which can be received without any error is selectively outputted. As a result, even though the transmission data different in signal level is transmitted alternately, any transmission data can be received with accuracy.

Also, because the signal level of transmission data received is different between a device connected close to the transmission data transmitter and a device connected far from the transmitter, it is necessary in prior art systems to adjust an optimal threshold value in accordance with the signal level actually received when the data receiving unit is located. However, according to the present invention, since reception data previously having a plurality of threshold values and no error is selectively outputted, no adjustment of the threshold value is required.

Still further, the clock generating circuit may be implemented using a semiconductor integrated circuit. Thus, the data receiving unit in accordance with the present invention makes it unnecessary to have the reference clock to accurately coincide with the transmission clock where the transmission data has been encoded. Also, the reference clock can be used even though the oscillation frequency fluctuates somewhat due to temperature variations or the like. Therefore, it is unnecessary to use an expensive element to provide a highly accurate oscillation signal such as one from a quartz or ceramic oscillator. For example, an oscillator which is low in accuracy but can be integrated into a semiconductor integrated circuit such as an R-C oscillator can be used.

Therefore, since the external attachment of an oscillator is unnecessary, the structure of the unit can be simplified. Also, since the use of an expensive oscillator is unnecessary, the unit can be implemented inexpensively. Moreover, the clock generating circuit can be formed on one chip together with other components, thereby simplifying the structure of the unit further and implementing the unit inexpensively.

Another aspect of the invention provides a data transmitting unit which includes a data encoding circuit for encoding data to be transmitted into a predetermined transmission code by using a predetermined transmission clock signal to generate transmission data, a data transmitting circuit for transmitting the transmission data generated by the data encoding circuit to a transmission path, and a reference pulse adding circuit for adding a reference pulse having a pulse width corresponding to the period of the transmission clock to a head of the transmission data.

Thus, the data encoding circuit encodes data to be transmitted into a predetermined transmission code by using a predetermined transmission clock signal, and the data transmitting circuit transmits the transmission data to the transmission path. Also, the reference pulse adding circuit adds a reference pulse having a pulse width corresponding to the period of the transmission clock to a head of the transmission data. Therefore, since the reference pulse is always added to the head of the transfer data sent out to the transmission path, the data receiving unit can learn the clock period, and therefore can receive the transmission data with accuracy.

Further, the reference pulse adding circuit may insert a reference pulse having a pattern which violates an encoding rule of the transmission code to an arbitrary point of the transmission data immediately before the reference pulse. Therefore, the reference pulse can be inserted not only at a the start of transmission of a transmission data but also during transmitting. In summary, the system detects the reference pulse inserted and conducts the reception of transmission data while correcting the clock.

Yet another aspect of the invention provides a data communication unit which includes a data receiving unit which includes a data receiving circuit for receiving, through a transmission path, transmission data which has been encoded into a predetermined transmission code by using a predetermined transmission clock signal and includes a reference pulse having a pulse width corresponding to a period of the transmission clock signal, a clock generating circuit for generating a received clock signal in synchronization with the transmission data, and a data decoding circuit for decoding the transmission data received by the data receiving circuit by using the received clock generated by the clock generating circuit, where the clock generating circuit includes an oscillator generating at least a reference clock having a period which is shorter than that of the transmission clock signal, a counter circuit for counting an interval between points of change of the transmission data received by the data receiving circuit according to the reference clock signal, a reference pulse detector circuit for detecting the reference pulse on the basis of a count value from the counter circuit, a received clock signal generating circuit for generating a received clock signal in synchronization with the transmission data by frequency-dividing the reference clock signal on the basis of the count value when the counter circuit counts the pulse width of the reference pulse, and a data transmitting unit, which includes a data encoding circuit for encoding data to be transmitted into a predetermined transmission code by using a predetermined transmission clock signal to generate transmission data, a data transmitting circuit for transmitting the transmission data generated by the data encoding circuit to a transmission path, and a reference pulse adding circuit for adding a reference pulse having a pulse width corresponding to the period of the transmission clock to a head of the transmission data, where the data receiving unit further includes a response data transmitting circuit for encoding data to be transmitted into a predetermined transmission code by using the received clock signal generated by the clock generating circuit to generate transmission data, and a response data transmitting circuit for transmitting the transmission data generated by the data encoding circuit to the transmission path at a predetermined timing, the data transmission circuit including a push-pull circuit providing a tri-state output to the transmission path, and the response data transmitting circuit includes a transistor which is connected to the transmission path in an open/collector manner.

Thus, because the data transmitting circuit of the data transmitting unit includes a push-pull circuit providing a tri-state output, the data transmitting unit sends out a signal which is symmetrical with respect to the rising and falling edges and which has reduced distortion. Accordingly, the data transmitting unit allows the data receiving unit to learn the communication speed with high accuracy, and stabilized communication can be realized between the data transmitting unit and the data receiving unit.

The response data transmitting circuit of the data receiving unit consists of a transistor which is connected to the transmission path in an open-collector manner. Accordingly, the unit can be implemented inexpensively. In other words, in the data receiving unit, the communication speed is learned to generate a reception clock by counting the pulse width of a reference pulse contained in the transmission data outputted by the data transmitting unit. Accordingly, a signal having uniform rising and falling characteristics is required as a signal which is sent out from the data transmitting unit, so that the reference pulse width corresponds to the transmission clock with accuracy. The signal sent out from the data receiving unit has no problems even though the waveform of transmission data is distorted somewhat so far as that signal can be detected as data in the data transmitting unit. In this way, a push-pull circuit is used only for the data transmitting unit which requires the pulse width of a high accuracy, and a transistor of the open collector connection type which is simple in structure is used for the data receiving unit which permits the waveform of the signal sent out to be distorted somewhat with no ill effects. As a result, a communication unit high in reliability can be implemented inexpensively.

Further, the response data transmitting section may include a current limiter circuit for limiting a current output of the transistor so that it does not exceed a current output of the data transmitting circuit. As a result, when the data transmitting unit and the data receiving unit output signals simultaneously, the signal level of the signal line is equal to the output level of the data transmitting unit which is larger than the current output.

Therefore, the output of the data transmitting unit is correctly transmitted to the data receiving unit even though the response data transmitting means of the data receiving unit outputs an invalid signal onto the transmission path because of its default or the like. As a result, even though such an abnormality occurs, since the data transmitting unit can surely transmit an instruction for coping with the abnormality to the respective data receiving units, a communication system high in safety can be constituted.

Also, the transistor of the response data transmitting means may include a negative feedback circuit for negatively feeding the change in an output of the transistor back to a base of the transistor. Therefore, the rising and falling of the waveform of a signal outputted from the transistor are rounded, thereby reducing the generation of parasitic radio frequency emanations.

The output which is negatively fed back may be the change in voltage or the change in current. In a transmission path having a relatively large capacitance, because the change in voltage does not coincide with the change in current, it is more effective to negatively feed back the change in current. It goes without saying that both the changes in voltage and current may be negatively fed back.

Still another aspect of the invention provides a data communication unit comprising a plurality of communication circuits each including a data transmitting unit and at least one data receiving unit, the data transmitting apparatus comprising a data encoding circuit for encoding data to be transmitted into a predetermined transmission code by using a predetermined transmission clock signal to generate transmission data, a data transmitting circuit for transmitting the transmission data generated by the data encoding circuit to a transmission path, and a reference pulse adding circuit for adding a reference pulse having a pulse width corresponding to the period of the transmission clock to a head of the transmission data, the data receiving unit including a data receiving circuit for receiving, through a transmission path, transmission data which has been encoded into a predetermined transmission code by using a predetermined transmission clock signal and which includes a reference pulse having a pulse width corresponding to a period of the transmission clock signal, a clock generating circuit for generating a received clock signal in synchronization with the transmission data, and a data decoding circuit for decoding the transmission data received by the data receiving circuit by using the received clock signal generated by the clock generating circuit, where the clock generating circuit includes an oscillator for generating at least a reference clock having a period which is shorter than that of the transmission clock signal, a counter circuit for counting an interval between points of change of the transmission data received by the data receiving circuit according to the reference clock signal, a reference pulse detector circuit for detecting the reference pulse on the basis of a count value from the counter circuit, and a received clock signal generating circuit for generating a received clock signal in synchronization with the transmission data by frequency-dividing the reference clock signal on the basis of the count value when the counter circuit counts the pulse width of the reference pulse, where a communication circuit is provided for every data receiving unit where a power supply is interrupted simultaneously.

Thus, the data receiving unit is provided with a transmission path to every device for which power is interrupted simultaneously, and connected to the data transmitting unit via the transmission path. In other words, there is no case where a data receiving unit for which power is on and a data receiving unit for which power is off are mixed together in the same transmission path. Therefore, since no protective circuit is required for preventing a signal on the transmission path from passing to a data receiving unit when power of the data receiving unit is off, the construction of the data receiving unit can be simplified.

In other words, when the data receiving unit for which power is on and the data receiving unit for which power is off are mixed together on the same transmission path, if a signal on the transmission path leaks to the exterior through the data receiving unit for which power is off, the signal level of transmission data is changed so that stabilized communication cannot be conducted. For the purpose of preventing this, it was formerly necessary to provide the protective circuit for maintaining the output of the data receiving unit for which power is off at a high impedance. However, according to the present invention, because all of the data receiving units on the transmission path are interrupted simultaneously, such a protective circuit is not required.

Another aspect of the invention provides a data communication unit comprising a data transmitting unit including a data encoding circuit for encoding data to be transmitted into a predetermined transmission code by using a predetermined transmission clock signal to generate transmission data, a data transmitting circuit for transmitting the transmission data generated by the data encoding circuit to a transmission path and a reference pulse adding circuit for adding a reference pulse having a pulse width corresponding to the period of the transmission clock to a head of the transmission data, at least one data receiving unit including a data receiving circuit for receiving, through a transmission path, transmission data which has been encoded into a predetermined transmission code by using a predetermined transmission clock signal and which includes a reference pulse having a pulse width corresponding to a period of the transmission clock signal, a clock generating circuit for generating a received clock signal in synchronization with the transmission data, and a data decoding circuit for decoding the transmission data received by the data receiving circuit by using the received clock generated by the clock generating circuit, where the clock generating circuit includes an oscillator generating at least a reference clock having a period which is shorter than that of the transmission clock signal, a counter circuit for counting an interval between points of change of the transmission data received by the data receiving circuit according to the reference clock signal a reference pulse detector circuit for detecting the reference pulse on the basis of a count value from the counter circuit, and a received clock signal generating circuit for generating a received clock signal in synchronization with the transmission data by frequency-dividing the reference clock signal on the basis of the count value when the counter circuit counts the pulse width of the reference pulse, where the data encoding circuit of the data transmitting unit includes a bit expansion circuit for expanding a predetermined bit of data to be transmitted into a plurality of bits by adding redundant bits including at least a bit logically inverse to the predetermined bit to the predetermined bit, and where the data decoding circuit of the data receiving unit includes a second error detector circuit for detecting whether the redundant bits added by the bit expansion circuit are in error.

Thus, the bit expansion circuit of the data transmitting unit expands a predetermined bit of data to be transmitted into a plurality of bits by adding redundant bits including at least a bit logically inverse to the predetermined bit to the predetermined bit. The second error detector circuit of the data receiving unit detects whether the redundant bits added by the bit expansion means are in error. Therefore, as the bit are important, a larger number of redundant bits are added thereby improving the reliability of the bit data.

Also, because the redundant bits necessarily include a bit logically inverse to the original bit, the abnormality of temporal interruption or short-circuiting of the transmission path and so on can be reliably detected. In other words, when all the redundant bits are logically the same as the original bit, the temporal interruption or short-circuiting of the transmission path has the same waveform as that of the normal signal, they cannot be distinct. However, since the logically inverse bit is always contained in the redundant bit, in this case, the abnormality of data can be reliably detected.

A yet further aspect of the invention provides a multiplex communication unit in data communication unit including a data transmitting unit and a plurality of data receiving units, the data transmitting unit including a data encoding circuit for encoding data to be transmitted into a predetermined transmission code by using a predetermined transmission clock signal to generate transmission data, a data transmitting circuit for transmitting the transmission data generated by the data encoding circuit to a transmission path, and a reference pulse adding circuit for adding a reference pulse having a pulse width corresponding to the period of the transmission clock to a head of the transmission data, the data receiving unit including a data receiving circuit for receiving, through a transmission path, transmission data which has been encoded into a predetermined transmission code by using a predetermined transmission clock signal and includes a reference pulse having a pulse width corresponding to a period of the transmission clock signal, a clock generating circuit for generating a received clock signal in synchronization with the transmission data, and a data decoding circuit for decoding the transmission data received by the data receiving circuit by using the received clock generated by the clock generating circuit, where the clock generating circuit includes an oscillator generating at least a reference clock having a period which is shorter than that of the transmission clock signal, a counter circuit for counting an interval between points of change of the transmission data received by the data receiving circuit according to the reference clock signal, a reference pulse detector circuit for detecting the reference pulse on the basis of a count value from the counter circuit, and a received clock signal generating circuit for generating a received clock signal in synchronization with the transmission data by frequency-dividing the reference clock signal on the basis of the count value when the counter circuit counts the pulse width of the reference pulse, where the clock generating circuit includes a correction circuit which resets the received clock generating circuit when detecting the point of change of the transmission data, for correcting a phase shift of the received clock signal, the data transmitting unit further includes a synchronous signal sending circuit for periodically sending out a synchronous signal including a low level and a high level at a predetermined timing, following the sending of the transmission data, and the data receiving unit includes a response sending circuit for sending out a response signal for notifying the data transmission unit of a reception condition of the transmission data to the transmission path at a predetermined timing which is different for every data receiving unit. Thus, the synchronous signal sending circuit sends out a synchronous signal at a predetermined timing following the sending of the transmission data.

In the respective data receiving units, the correction circuit corrects the phase of the reception clock signal on the basis of the change of the signal level of the synchronous signal, and the response sending circuit sends out a response signal at a predetermined timing on the basis of the reception clock signal. Therefore, even though a large number of data receiving units for sending out the response signal exist and the response signal must be sent out after a long time has elapsed since the sending of the transmission data has been completed, the response signal can be sent out at a correct timing on the basis of the reception clock which is periodically corrected in accordance with the synchronous signal.

Still another aspect of the invention provides a data communication unit of a polling system having a data transmission unit and a plurality of data receiving units in which the data transmitting unit sends an inquiry data to each of the data receiving units, and each of the data receiving units outputs response data corresponding to the inquiry data, the data transmitting unit including a data encoding circuit for encoding data to be transmitted into a predetermined transmission code by using a predetermined transmission clock signal to generate transmission data, a data transmitting circuit for transmitting the transmission data generated by the data encoding circuit to a transmission path, and a reference pulse adding circuit for adding a reference pulse having a pulse width corresponding to the period of the transmission clock to a head of the transmission data, the data receiving unit including a data receiving circuit for receiving, through a transmission path, transmission data which has been encoded into a predetermined transmission code by using a predetermined transmission clock signal and includes a reference pulse having a pulse width corresponding to a period of the transmission clock signal, a clock for generating a received clock signal in synchronization with the transmission data, and a data decoding circuit for decoding the transmission data received by the data receiving circuit by using the received clock signal generated by the clock generating circuit, where the clock generating circuit includes an oscillator generating at least a reference clock having a period which is shorter than that of the transmission clock signal, a counter circuit for counting an interval between points of change of the transmission data received by the data receiving circuit according to the reference clock signal, a reference pulse detector circuit for detecting the reference pulse on the basis of a count value from the counter circuit, and a received clock signal generating circuit for generating a received clock signal in synchronization with the transmission data by frequency-dividing the reference clock signal on the basis of the count value when the counter circuit counts the pulse width of the reference pulse, where the data transmitting unit further includes an identification information giving circuit for generating the inquiry data consisting of predetermined identification information for identifying each of the data receiving units, which has been given to the transmission data, and where the data receiving unit further includes a time data generating circuit for generating time data representative of current time on the basis of the received clock signal generated by the clock, a response data generating circuit which encodes the time data representative of time when a predetermined transmission data and the transmission data have been generated into a transmission code by using the received clock signal generated by the clock to generate the response data, a response data sending circuit for sending the response data following the transmission data upon the detection of the inquiry data which designates the data communication unit itself. Thus, the identification information giving circuit of the data communication unit generates inquiry data consisting of identification information for identifying each of the data receiving units, which has been given to the transmission data, and the data communication unit sends out the inquiry data to the data receiving unit.

In the data receiving unit, the time data generating circuit generates time data representative of a current time on the basis of the reception clock signal generated by the clock generating circuit, and the response data generating circuit encodes the transmission data and the time data representative of a time when the transmission data has been generated by using the reception clock signal to generate the response data. The response data sending means sends the response data to the transmission path, following the inquiry data upon the detection of the inquiry data which designates the data communication unit itself.

Therefore, a time when the transmission data sent out by the data sending circuit is generated can be precisely known. For that reason, when the change of transmission data with respect to time is important information, for example, when the transmission data is information representative of a speed of a vehicle or the like, acceleration can be calculated using the time information, and when those data are used for control, more precise control can be performed.

Also, for example, when an effective date exists in data, that is, when control of real time is required and control is delayed with respect to remarkably old data, it can be determined whether it is useable data or not on the basis of the time data, and control adapted to the present state can be executed.

Also, the data receiving unit may include a semiconductor sensor, and a transmission data circuit for producing the transmission data on the basis of a detection value of the semiconductor sensor. Thus, the semiconductor sensor detects a physical quantity of an object, and the transmission data circuit produces transmission data on the basis of a detection value of the semiconductor sensor.

Therefore, according to the present invention, the semiconductor sensor can be implemented in an IC, and other components of the data receiving circuit can be formed into an IC likewise. Hence, all the data receiving units can be integrated into one chip so that the data receiving unit having a sensor function can be miniaturized.

Moreover, the data transmitting unit may include a first sending prohibiting circuit for prohibiting the sending of the succeeding inquiry data for only a time required for sending the response data by the data receiving unit after sending the inquiry data and a second sending prohibiting circuit for prohibiting the sending of the succeeding inquiry data further for the required time when sending the inquiry data to which a predetermined identification information has been given, where the data receiving unit further includes a response data sending permitting circuit for permitting the sending of the response data from the response data sending circuit after a waiting state for the required time when a predetermined identification data has been given to the inquiry data.

Thus, in the data transmitting unit, the first sending prohibiting circuit prohibits the sending of the succeeding inquiry data for only a time required for sending the response data after sending the inquiry data, and the second sending prohibiting circuit prohibits the sending of the transmission data further for the required time when sending the inquiry data to which a predetermined identification information has been given.

In the data receiving unit, when predetermined identification information has been given to inquiry data, the response data sending permitting circuit permits the sending of the response data after a waiting state for the required time since inquiry data has been received. Therefore, even in the data receiving unit which is not polled by the data transmission unit (that is, inquiry data designating the subject unit is not sent out from the data transmission unit), the second sending prohibiting circuit can send out the response data by utilizing a duration of prohibiting the sending of the inquiry data.

In other words, in the data receiving unit which is assembled into the data communication unit, response data can be sent out in accordance with inquiry data from the data transmitting unit following the inquiry data. However, because the data receiving unit newly assembled is not polled by the data transmission unit, it is initially impossible to send the response data. However, the response data can be sent out even in the data receiving unit which is not polled by providing an area where the data receiving unit which is not polled can send out the response data after the sending of inquiry data to which predetermined identification information has been added.

Also, the data receiving unit is designed to be previously excessively polled in preparation for data receiving units which will be added later. In this case, useless polling is made for data receiving units which are not yet been connected. This leads to a problem that the efficiency of transmission is lowered.

On the other hand, since the data receiving unit which will be added later can communicate by using an area where the data receiving unit which is not polled can send out the response data, for example, the data receiving unit provides a circuit for sending out data which requests the start of the polling of the subject unit to the data transmitting unit, and the data transmitting unit provides a circuit for starting new polling in response to that request, so that high-efficiency communication can be conducted in accordance with the operating state of the data receiving unit.

BRIEF DESCRIPTION OF THE DRAWINGS

The nature, utility and principle of the invention will be more clearly understood from the following detailed description and the appended claims when read in conjunction with the accompanying drawings, in which:

FIGS. 11A–11L are graphs showing the operation of the communication speed learning circuit according to the first embodiment;

FIGS. 12A–12H are graphs showing the operation of the frequency dividing circuit according to the first embodiment;

FIGS. 14A–14J are graphs showing the structure of transmission data and the respective operation of a master and slave according to the first embodiment in the case where a response area for notifying the master of a data receiving state is disposed for each slave;

FIGS. 25A and 25B are block diagrams showing the structure of a slave according to the second embodiment;

DETAILED DESCRIPTION OF THE PREFERRED EMBODIMENTS

Hereinafter, a description will be given of embodiments of the present invention with reference to the accompanying drawings.

Figure 2:
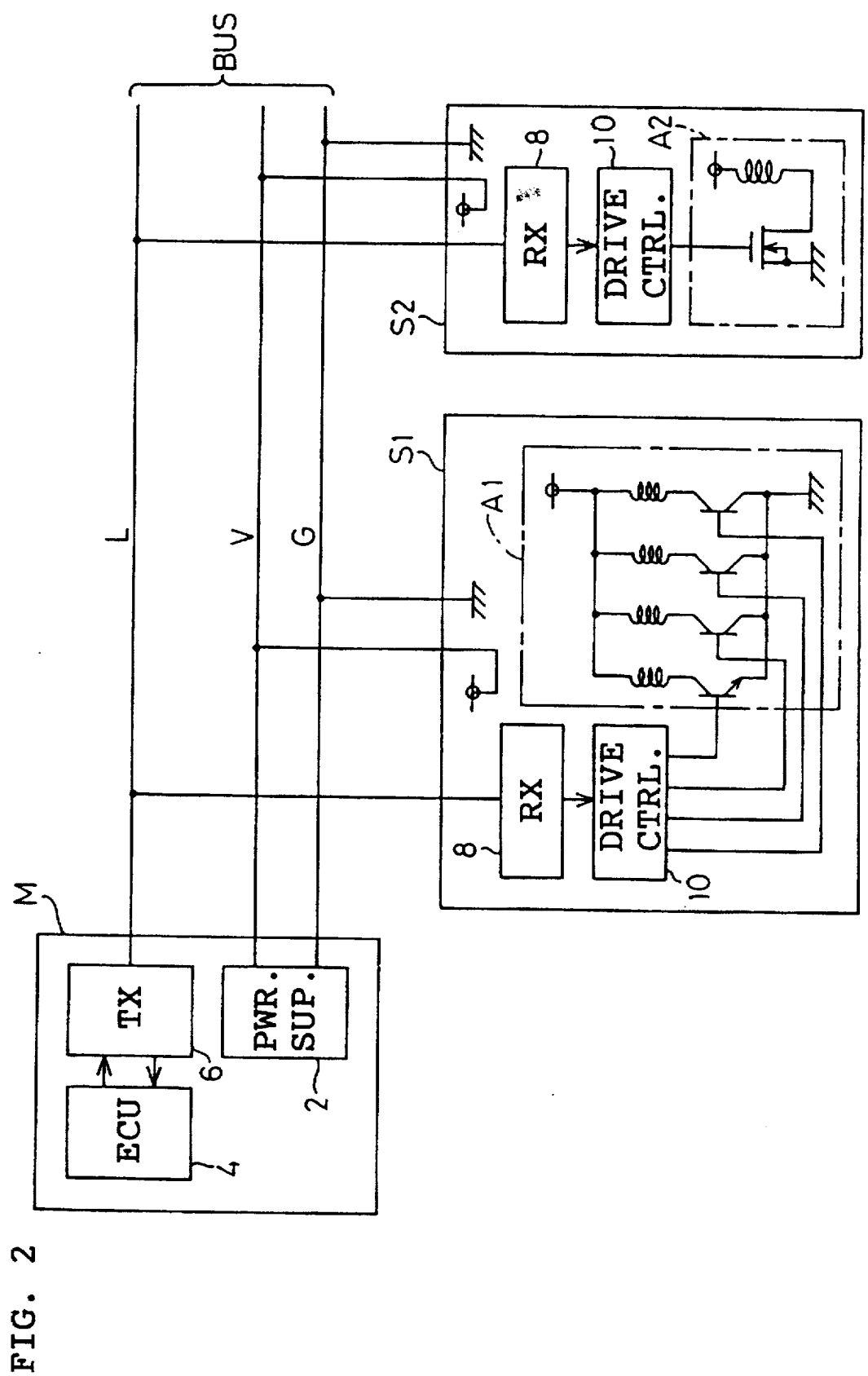
FIG. 2 is a block diagram showing the entire structure of a vehicle communication system in accordance with a first embodiment of the present invention.

FIG. 2 is a block diagram showing the entire structure of a vehicle communication system in accordance with a first embodiment of the present invention.

As shown in FIG. 2, the vehicle communication system of this embodiment includes a master node (hereinafter, referred to as "master") M on which an electronic control unit (hereinafter, referred to as "ECU") for conducting the control of a variety of equipment mounted on a vehicle is mounted, a plurality of slave nodes (hereinafter, referred to simply as "slaves") on which actuators A1, A2 ... such as motors or electromagnetic valves which are controlled by the ECU 4, are mounted, respectively, and a transmission line BUS which connects the master M and the respective slaves S1, S2, etc.

The transmission line BUS includes a signal line L which delivers a control signal between the master M and the slaves S1, S2 ... through serial communication, a power line V which supplies power from the master M to the respective slaves S1, S2 ..., and a ground line G which determines the reference potentials of the signal line L and power line V.

Serial bidirectional communication using an NRZ (non-return to zero) code as a transmission code is conducted on the signal line L. The signal level becomes a high level (H level) when no node allows transmission, and a low level (L level) when transmission is conducted.

Figure 3:
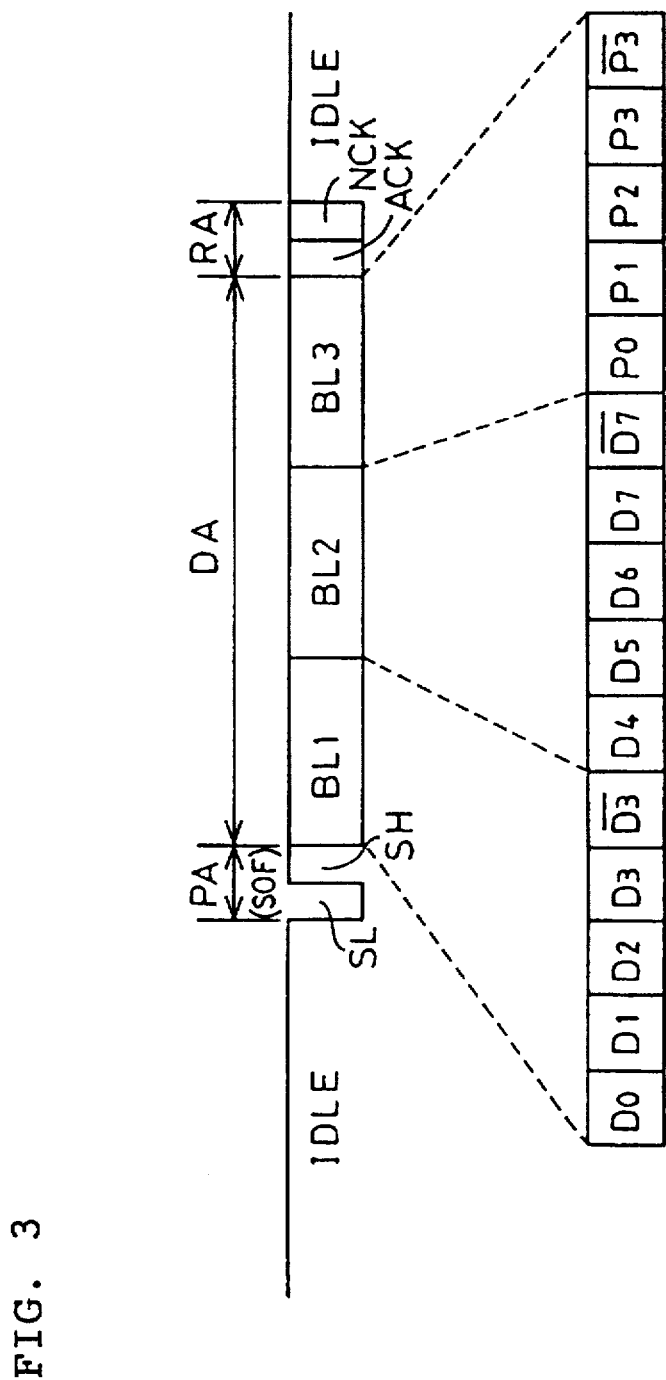
FIG. 3 is an explanatory diagram showing the structure of transmission data which is delivered through a communication path L1 in accordance with this embodiment.

FIG. 3 is an explanatory diagram showing the frame format of transmission data which is delivered through a communication line L1 between the master M and the slaves S1, S2, ..... As shown in FIG. 3, in order for the slaves S1, S2 ... to detect a frame and learn the communication speed, the frame format consists of a preceding area PA disposed at the top of the frame, a data area DA for storing transmission data from the master M to the slaves S1, S2 ... and a response area RA for notifying the master M of the presence of an error in the data area DA from the slaves S1, S2 .... No-signal states IDLEs exist before and after the frame.

The preceding area PA consists of an SOF code (start of frame) which includes a section SL of an L-level having one-bit length and a section SH of an H-level having one bit length.

The data area DA consists of three basic blocks BLn (n=1–3) having 5 bits as one unit. Each of the basic blocks BLn includes data of 4 bits and a synchronous bit which is produced by inverting data of the fourth bit. With the provision of such a synchronous bit, even though any data is transmitted, the same signal level does not persist for six bit lengths or more within the frame, and the same signal level occurs for six bit lengths or more only in the no-signal state IDLE.

Transmission data D0 to D3 and D4 to D7 are set to the first two basic blocks BL1 and BL2, respectively, and error check codes P0 to P3 which will be described later are set to the last basic block BL3.

Four bits of the transmission data D0 to D3 are used for control of the slave S1, and four bits of the transmission data D4 to D7 are used for control of the slave S2.

The response area RA consists of an ACK bit which is set to the H-level by the slaves S1, S2 . . . when the slaves S1, S2 . . . receive the data area DA without any error, and an NCK bit which is set to the H-level by the slaves S1, S2 . . . when an error exists in the received data area DA.

As shown in FIG. 2, the master M includes, in addition to the foregoing ECU 4, a power supply circuit 2 for supplying power to the respective sections within the master M and also to the respective slaves S1, S2 . . . through a power supply line V, and a transmitting circuit 6 for receiving the ACK bit or NCK bit sent out from the slaves S1, S2 . . . after sending out transmission data. The ECU 4 may be a microprocessor which may include a CPU, a ROM, a RAM and the like. The ECU 4 monitors the states of the respective parts of a vehicle such as a vehicle velocity and an engine speed in accordance with inputs from a variety of sensors not shown, and produces control signals for driving the various actuators which are mounted on the slaves S1, S2 . . . on the basis of the states thus monitored.

The slaves S1, S2 . . . include, in addition to the foregoing actuators A1, A2 . . . , a receiving circuit 8 for receiving transmission data from the master M through a signal line L and for sending out the ACK bit or NCK bit in order to notify the master M of whether the transmission data can be received or not, and a drive control circuit 10 for decoding the contents of data received by the receiving circuit 8 to output a drive signal for driving the actuators A1, A2 . . . . In the example, the actuator A1 of the slave S1 is constituted by a four-phase step motor for driving a throttle valve used for a traction control, and the actuator A2 of the slave S2 is constituted by an electromagnetic solenoid for controlling a brake hydraulic pressure in a wheel cylinder by changing over a hydraulic pressure circuit.

With the foregoing structure, the control signal for driving the actuator which is produced by the ECU 4 is received by the receiving circuit 8 of the respective slaves S1, S2 . . . through the transmitting circuit 6 and the signal line L. The drive control circuit 10 produces a drive signal in accordance with the received control signal to operate the actuators A1 and A2. In this manner, traction control as well as skid control is conducted.

Figure 4:
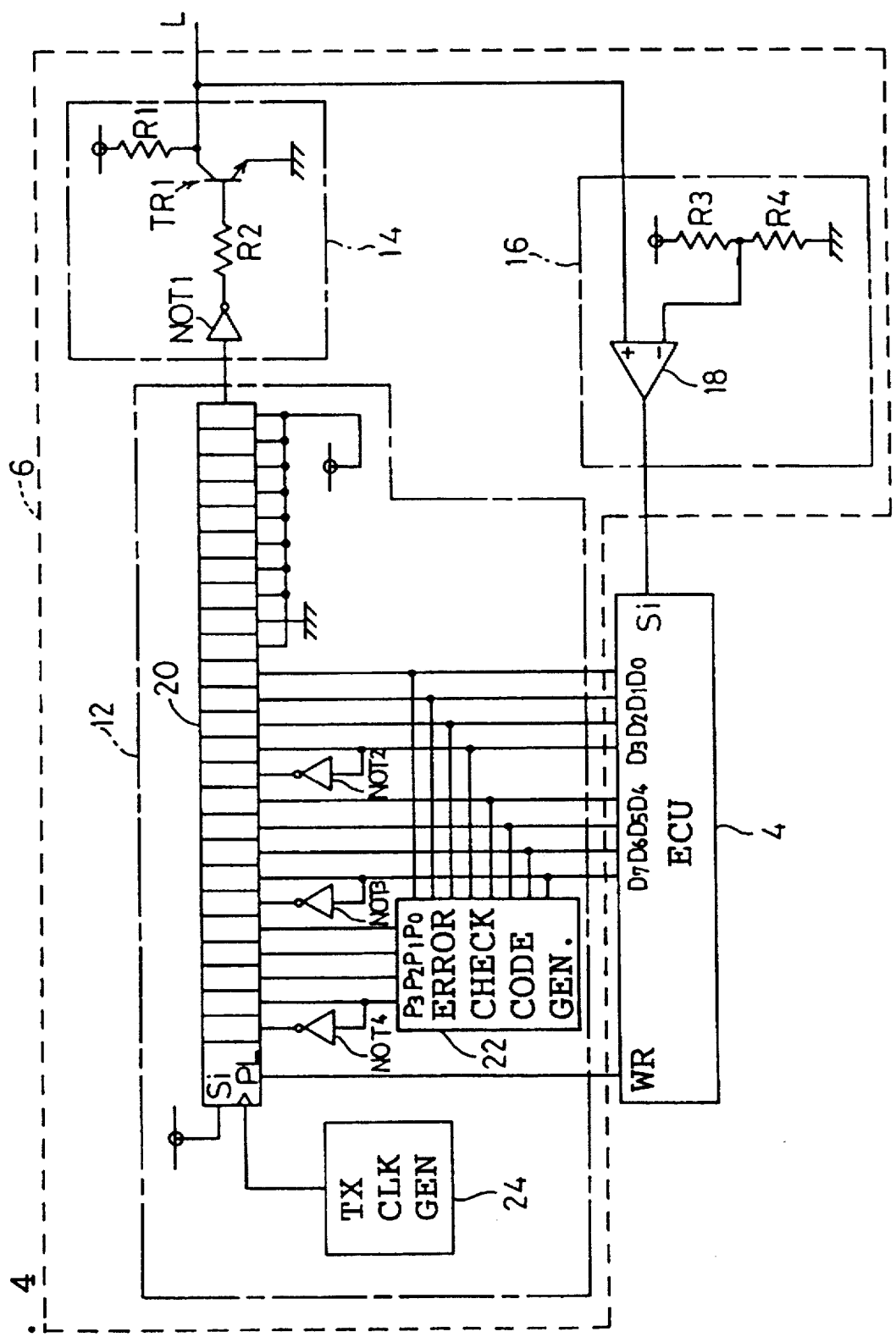
FIG. 4 is a block diagram showing the structure of a transmitting circuit 6 according to the first embodiment.

A detailed description will now be given for the transmitting circuit 6 of the master M and the receiving circuits 8 of the slaves S1, S2 . . . . The transmitting circuit 6, as shown in FIG. 4, includes a frame generating section 12 for generating transmission data to be sent out to the signal line L in accordance with the transmission data D0 to D7 outputted by the ECU 4, a driver section 14 for sending out the transmission data generated by the frame generating section 12 to the signal line L, and a receiver section 16 for receiving a signal sent out from the slaves S1, S2 . . . through the signal line L.

The frame generating section 12 corresponds to a data encoding section and a reference pulse adding circuit of the present invention, and the driver section 14 corresponds to a data transmitting section.

The driver section 14 includes a transistor TR1 having a collector connected to the signal line L and an emitter grounded, a collector resistor R1 for holding the signal line L to an H-level when the collector of the transistor TR1 is connected to a power supply V and the transistor TR1 is nonconductive, a base resistor R2 which supplies a base current to the transistor TR1, and an inverting circuit NOT1 for inverting transmission data outputted by the frame generating section 12. With such a structure, since the transmission data outputted from the frame generating section 12 is inverted twice by the inverting circuit NOT1 and transistor TR1, a signal having the same polarity as that of transmission data outputted by the frame generating section 12 is outputted on the signal line L.

The receiver section 16 includes voltage dividing resistors R3 and R4 which divide a supply voltage to generate a reference voltage and a voltage comparator 18 having a non-inverting input connected to the signal line L, an inverting input connected to a node at which the voltage divider resistors R3 and R4 are connected to each other, and an output connected to a serial input terminal Si. The receiver section 16 compares the signal level of the communication line L with the reference voltage generated by the voltage divider resistors R3 and R4 to shape a waveform. The receiver section 16 supplies the transmission data having the shaped waveform to the ECU 4.

The frame generating section 12, which is a main section of the transmitting circuit 6, includes a shift register 20 having the same number of stages as the frame length (in this example, 25 bits) of transmission data transmitted from the master M, an error check code generating circuit 22 for generating error check codes P0 to P3 from the transmission data D0 to D7 outputted by the ECU 4, and a transmission clock generating circuit 24 which operates the shift register 20 for generating a transmission clock for sending out transmission data at a predetermined transmission rate.

The transmission clock generating circuit 24 includes an oscillating circuit and a frequency dividing circuit and is designed to generate a transmission clock signal having a frequency of about 40 kHz. The transmission clock may be generated by frequency dividing the clock for driving the CPU which is included in the ECU 4.

Figure 5:
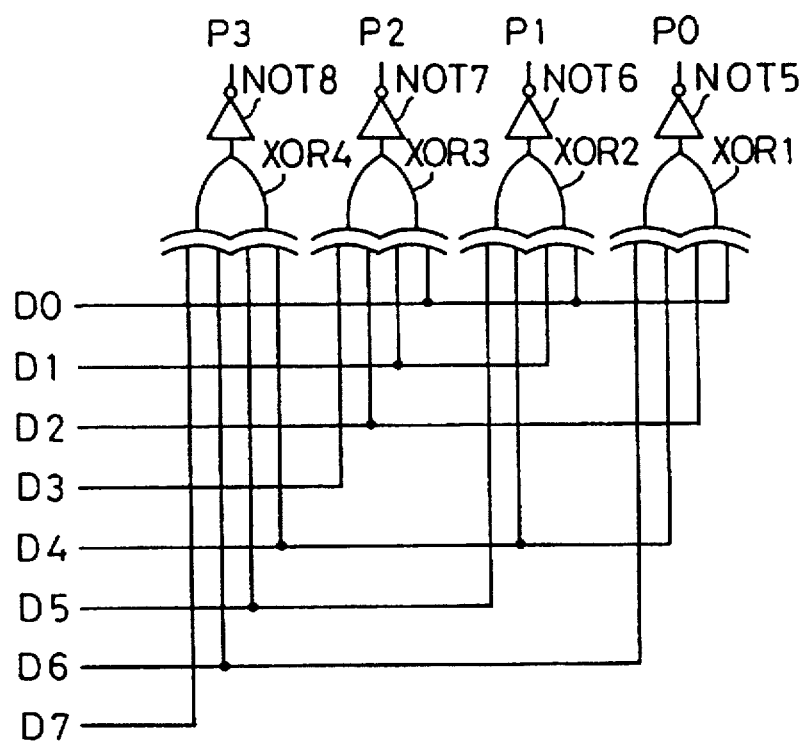
FIG. 5 is a circuit diagram showing the details of an error check code generating circuit according to the first embodiment.

The error check code generating circuit 22, as shown in FIG. 5, includes an exclusive OR circuit XOR1 which inputs transmission data D0, D2, D4 and D6, an exclusive OR circuit XOR2 which inputs transmission data D0, D1, D4 and D5, an exclusive OR circuit XOR3 which inputs transmission data D0, D1, D2 and D3, an exclusive OR circuit XOR4 which inputs transmission data D4, D5, D6 and D7, and inverting circuits NOT5 to NOT8 which invert the outputs of the exclusive OR circuits XOR1 to XOR4 to generate error check codes P0 to P3.

The exclusive OR circuits XOR1 to XOR4 having multiple inputs output "1" when the number of high level inputs is odd. Therefore, the error check codes P0 to P3 go low if an odd number of inputs are high. Conversely, if an even number of inputs are high, the error check codes P0 to P3 become high.

The error check code generating circuit 22 is designed to implement the following expressions (1) to (4), and the error check codes P0 to P3 generate the parity code of the respective inputs.

$$P0 = \text{NOT } (D0 \oplus D2 \oplus D4 \oplus D6) \quad (1)$$

$$P1 = \text{NOT } (D0 \oplus D1 \oplus D4 \oplus D5) \quad (2)$$

$$P2 = \text{NOT } (D0 \oplus D1 \oplus D2 \oplus D3) \quad (3)$$

P3=NOT (D4⊕D5⊕D6⊕D7) (4)

where ⊕ is an exclusive OR operation.

The shift register 20 has a parallel data load terminal PL connected to a write signal output terminal WP of the ECU 4 so that data presented to the parallel input of the shift register 20 is loaded in the shift register 20 upon the output of a write signal from the ECU 4.

The parallel input of the shift register 20 is connected to the power supply V so that the first 8 bits have the same level as that of the no-signal state IDLE of the signal line L with the side connected to the driver section 14 as the shift output. Subsequently, pursuant to the frame format of transmission data shown in FIG. 3, 2 bits following the first 8 bits are connected to the ground G and the power supply V, respectively to be high and low levels representative of the SOF code. The subsequent 4 bits are connected to the transmission data D0 to D3 outputted by the ECU 4 in order, and the next bit is connected to the inverting circuit NOT2 which inverts the transmission data D3 as the synchronous bit. The next 4 bits are connected to transmission data D4 to D7 outputted by the ECU 4 in order, and the next bit is connected to the inverting circuit NOT3 which inverts the transmission data D7 as the synchronous bit. The following 4 bits are connected to the error check codes P0 to P3 outputted by the error check code generating circuit 22 in order, and the final bit is connected to the inverting circuit NOT4 which inverts the error check code P3 as the synchronous bit.

A serial input Si of the shift register 20 is connected to the power supply V, and a high level signal is sequentially added to the final portion during the shift operation.

Now, a description will be given of the operation of the transmitting circuit 6 described above. First, the ECU 4 sets the transmission data D0 to D7 to send out a write signal if there is data to be transmitted to the slaves S1, S2 .... Then, in the transmitting circuit 6, the shift register 20, which inputs the write signal, takes in the data presented to the parallel input including the transmission data D0 to D7. Thereafter, the contents of the shift register 20 are sequentially shifted in accordance with the transmission clock, and data outputted from the serial output is outputted to the signal line L through the driver section 14.

If there is no data to be transmitted, the shift register 20 sequentially shifts the high level inputted from the serial input and outputs the high level representative of the no-signal state to the signal line L through the driver section 14.

Since the transmission clock oscillates at about 40 kHz and the transmission code uses NRZ, the communication rate on the signal line L is about 40 kbps.

Since the slaves S1, S2 ... received by the transmission data output the ACK bit or NCK bit to the last of the transmission data, the receiver section 16 receives it and inputs it to the serial input of the ECU 4. The ECU 4 takes in this signal and confirms whether transmission has succeeded or not, and if transmission has failed, then the ECU 4 retransmits the transmission data.

Now, a description will be given of the structure of the receiving circuit 8 which is mounted on each of the slaves S1, S2 ... with reference to the block diagram shown in FIG. 1.

Figure 1:
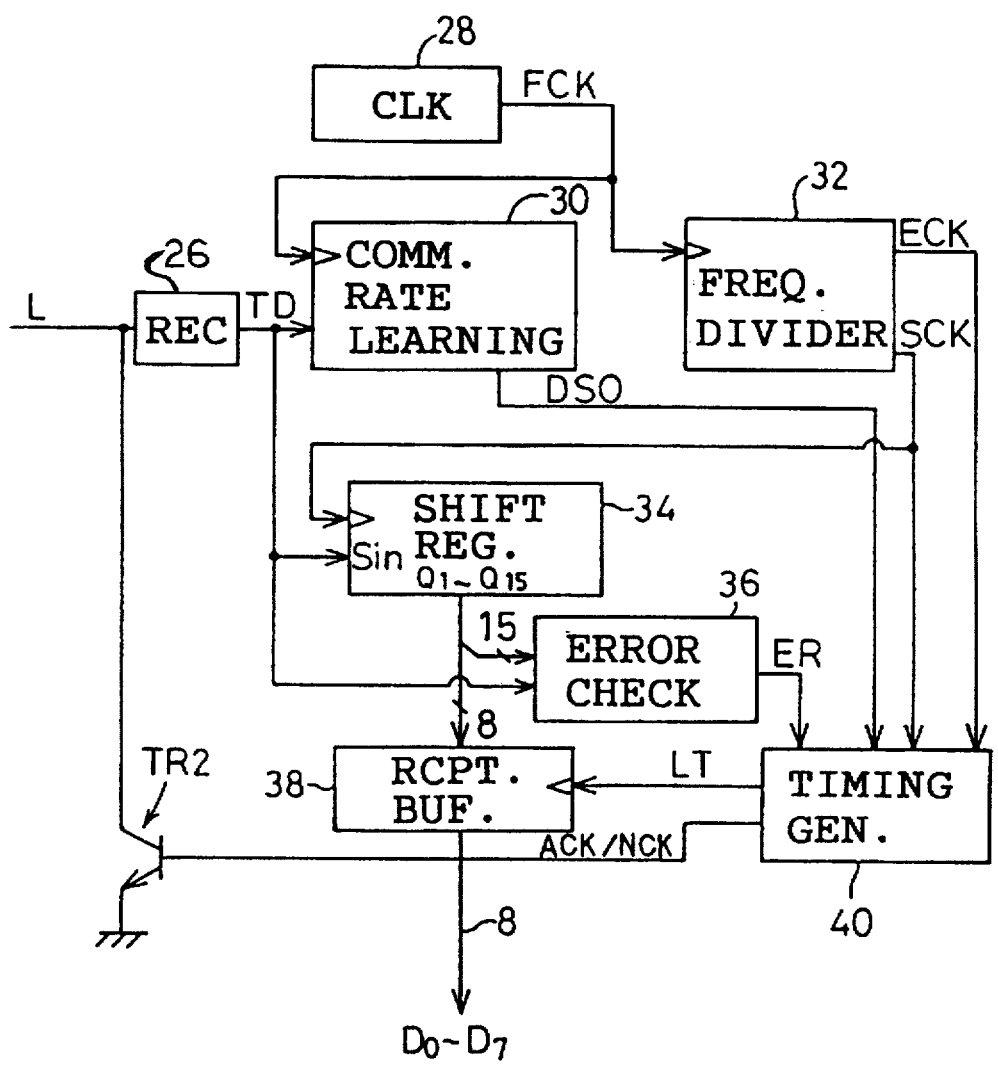
FIG. 1 is a block diagram showing the structure of a receiving circuit according to the present invention.

As shown in FIG. 1, the receiving circuit 8 is connected to the signal line L, and includes a receiver 26 which receives transmission data sent out from the master M, an oscillator 28 for generating the reference clock FCK which has a frequency at least four times higher than the communication rate, a communication rate learning circuit 30 which detects the SOF code added to the head of transmission data and counts the section SL having a low level in accordance with the reference clock FCK to calculate how many times the reference clock FCK frequency is higher than the communication rate frequency, and a frequency dividing circuit 32 which frequency-divides the reference clock FCK on the basis of the count value counted by the communication rate learning circuit 30, to produce an edge clock ECK representative of the bit boundary of transmission data as well as a sample clock SCK for data sampling, which rises at the nearly middle portion of the respective bits of transmission data. The receiving circuit 8 also includes a shift register 34 for converting the received transmission data into parallel data using the sample clock SCK outputted by the frequency dividing circuit 32, an error check circuit 36 for checking whether an error occurs in the data area DA of transmission data on the basis of the error check codes P0 to P3 contained in the transmission data, a reception buffer 38 which is includes a flip-flop or latch for storing reception data D0 to D7 contained in the transmission data, and a transistor TR2 acting as a driver for sending out the ACK bit or NCK bit to the signal line L. The receiving circuit 8 further includes a timing generating circuit 40 which confirms the frame length of the received transmission data on the basis of the SOF code detection signal DSO outputted when the communication rate learning circuit 30 detects the SOF code as well as the sample clock SCK and the edge clock ECK outputted by the frequency dividing circuit 32. The timing generating circuit 40 outputs the ACK/NCK signal for transmitting the ACK bit or NCK bit to the signal line L through the transistor TR2 on the basis of the error check result of the error check circuit 36. As a result of the error check, if there is no error, the timing generating circuit 40 sends out a latch signal LT which allows data to be stored in the reception buffer 38.

Figure 6:
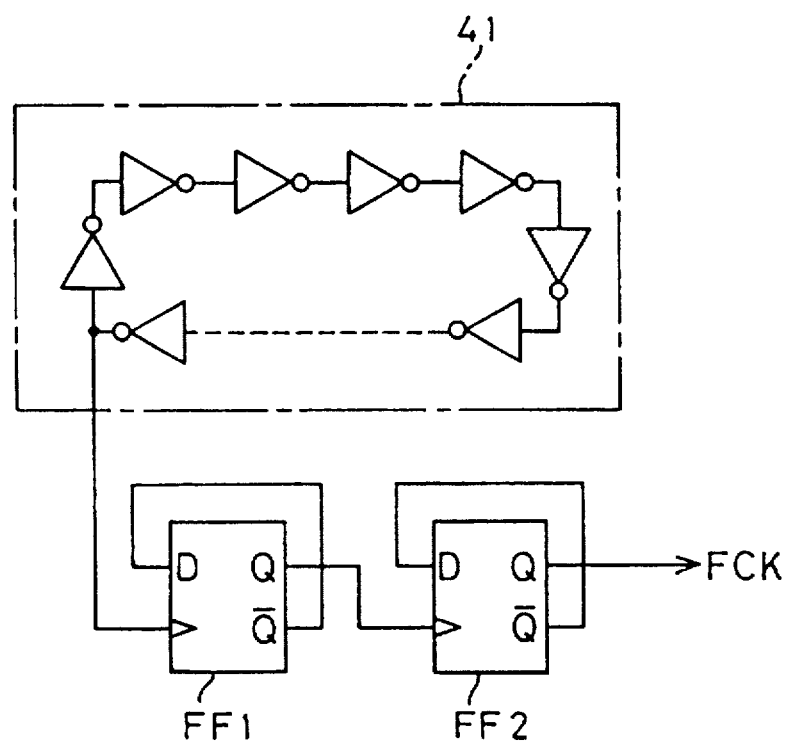
FIG. 6 is a circuit diagram showing the details of an oscillating circuit according to the first embodiment.

In this example, the oscillator 28, as shown in FIG. 6, has an odd number of inverting circuits coupled together in a ring-like shape. The oscillator 28 includes a ring oscillator 41 for sequentially delaying the pulse signal and circulating it by the inversions of the respective inverting circuits, and flip flop circuits FF1 and FF2 which frequency divide the output of the ring oscillator 41. The number of inverting circuits in the ring oscillator 41 is adjusted so that the reference clock FCK which is an output of the oscillator 28 is set within a range of 640 kHz to 10.24 MHz. If no frequency division is required, the flip flop circuits FF1 and FF2 may be omitted. In this example, the reference clock FCK oscillates at a frequency of about 2.5 MHZ.

Figure 7:
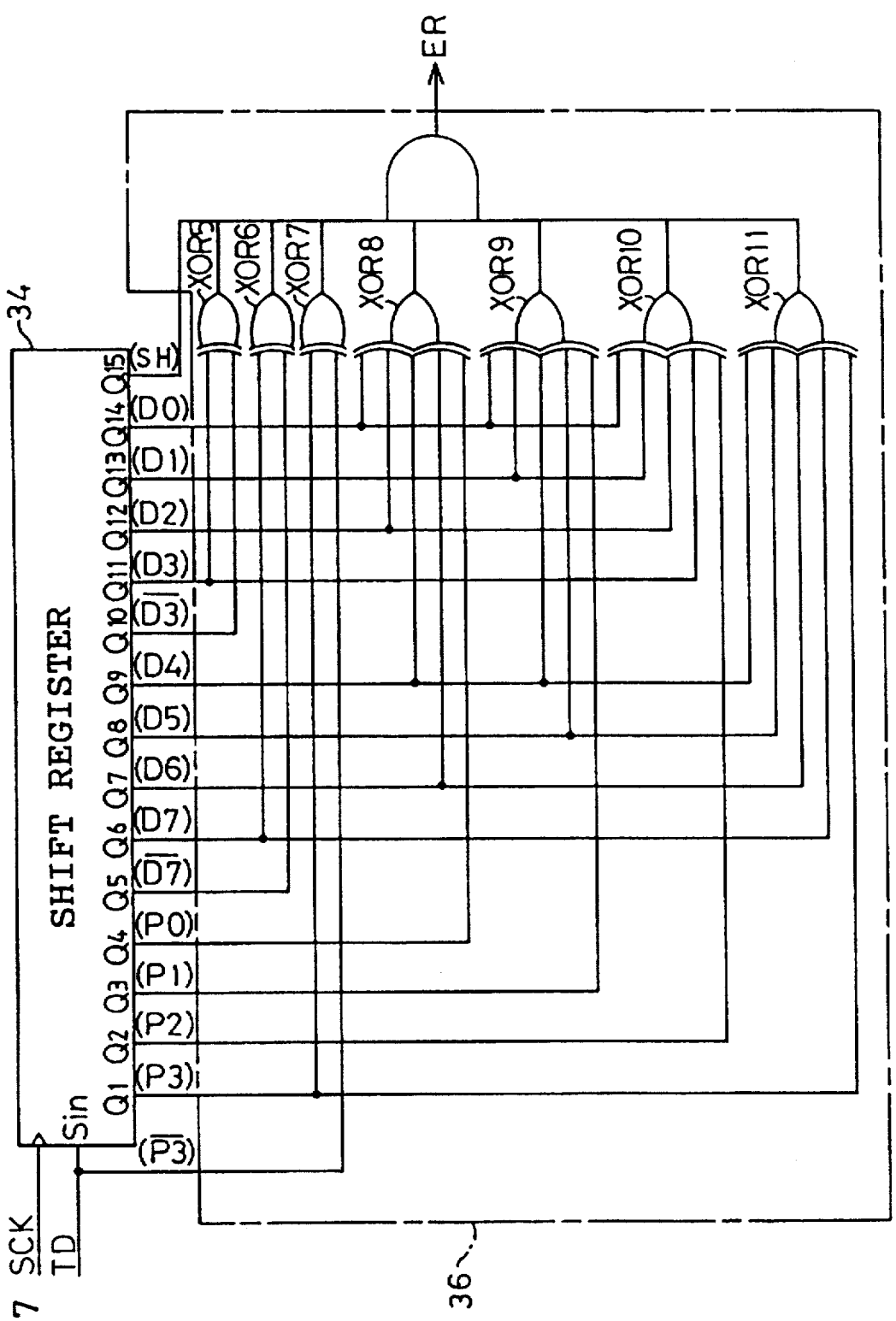
FIG. 7 is a circuit diagram showing the details of an error check circuit according to the first embodiment.

The error check circuit 36, as shown in FIG. 7, includes an exclusive OR circuit XOR5 which inputs the reception data D3 and the synchronous bit inverse to that reception data D3, an exclusive OR circuit XOR6 which inputs the reception data D7 and the synchronous bit inverse to that reception data D7, an exclusive OR circuit XOR7 which inputs the error check code P3 and the synchronous bit inverse to that error check code P3, an exclusive OR circuit XOR8 which inputs the reception data D0, D2, D4 and D6 and the error check code P0, an exclusive OR circuit XOR9 which inputs the reception data D0, D1, D4 and D5 and the error check code P1, an exclusive OR circuit XOR10 which inputs the reception data D0, D1, D2 and D3 and the error check code P2, an exclusive OR circuit XOR11 which inputs the reception data D4, D5, D6 and D7 and the error check code P3, and an AND circuit AND1 which inputs those exclusive OR circuits XOR5 to XOR11 and the section SH of the high level of the SOF code, and outputs a high level signal when all of them are high. The output of the exclusive OR circuit AND1 is supplied to the timing generating circuit 40 as the error check signal ER.

The exclusive OR circuits XOR5 to XOR7 check the error of the synchronous bit, and generate a high output as a normal state if the synchronous bit is a value obtained by inverting the bit which is immediately before the synchronous bit.

The exclusive OR circuits XOR8 to XOR11 check the reception data D0 to D7 and the parity error of the error check codes P0 to P3, and generate a high level output if it is normal.

In other words, the parity of the respective bits of the reception data D0 to D7 represented by the right side of expressions (1) to (4) is calculated, and if the parity coincides with the value of the error check codes P0 to P3 calculated and added when transmitting, the exclusive OR circuits XOR8 to XOR11 generate high level outputs.

Because the shift register 34 conducts the shift operation using the sample clock SCK which rises at the center of the bit of transmission data, the error check signal ER is a valid output value only during a period after the inverse signal of the error check code P3 occurs on the signal line L until the shift operation is completed by the sample clock SCK (FIGS. 8A–8I).

The timing generating circuit 40 inputs the error check signal ER outputted by the error check circuit 36, the SOF detection signal DSO outputted by the communication rate learning circuit 30, the edge clock ECK outputted by the frequency dividing circuit 32 and the sample clock SCK to generate a latch signal LT for storing the reception data D0 to D7 in the reception buffer 38, and the ACK/NCK signal for transmitting the ACK bit or NCK bit which notifies the master M of whether the transmission data could be received. The timing generating circuit 40 can be implemented using a simple sequential circuit, and therefore the concrete structure of the circuit will be omitted. The operation of the timing generating circuit 40 will be described on the basis of the timing diagram shown in FIG. 8.

First, upon the input of the rising of the SOF detection signal DSO, the timing generating circuit 40 counts the sample clock SCK and confirms the error check signal ER at the time of receiving the sixteenth pulse, that is, the final bit of the data area DA. If there is no error in the received transmission data and the error check signal ER is high, the timing generating circuit 40 outputs the sample clock SCK of the sixteenth pulse as is to the reception buffer 38 as the reception latch signal LT, and simultaneously outputs a pulse having a duration of one bit-length from the next edge clock ECK to the transistor TR2 as the ACK/NCK signal. When there is an error in the received transmission data and it is confirmed that the error check signal ER is at the sixteenth pulse of the sample clock SCK from the rising of the SOF detection signal DSO, if the error check signal ER is low, the latch signal LT is held to the low level as it is. Then, after the sample clock SCK of the sixteenth pulse, the high level pulse of one bit-length is outputted from the edge clock ECK of the second pulse as the ACK/NCK signal.

When receiving the latch signal LT, that is, when receiving the transmission data error-free, the reception buffer 38 stores only the necessary reception data D0 to D7 from the parallel output of the shift register 34 and outputs it.

Figure 9:
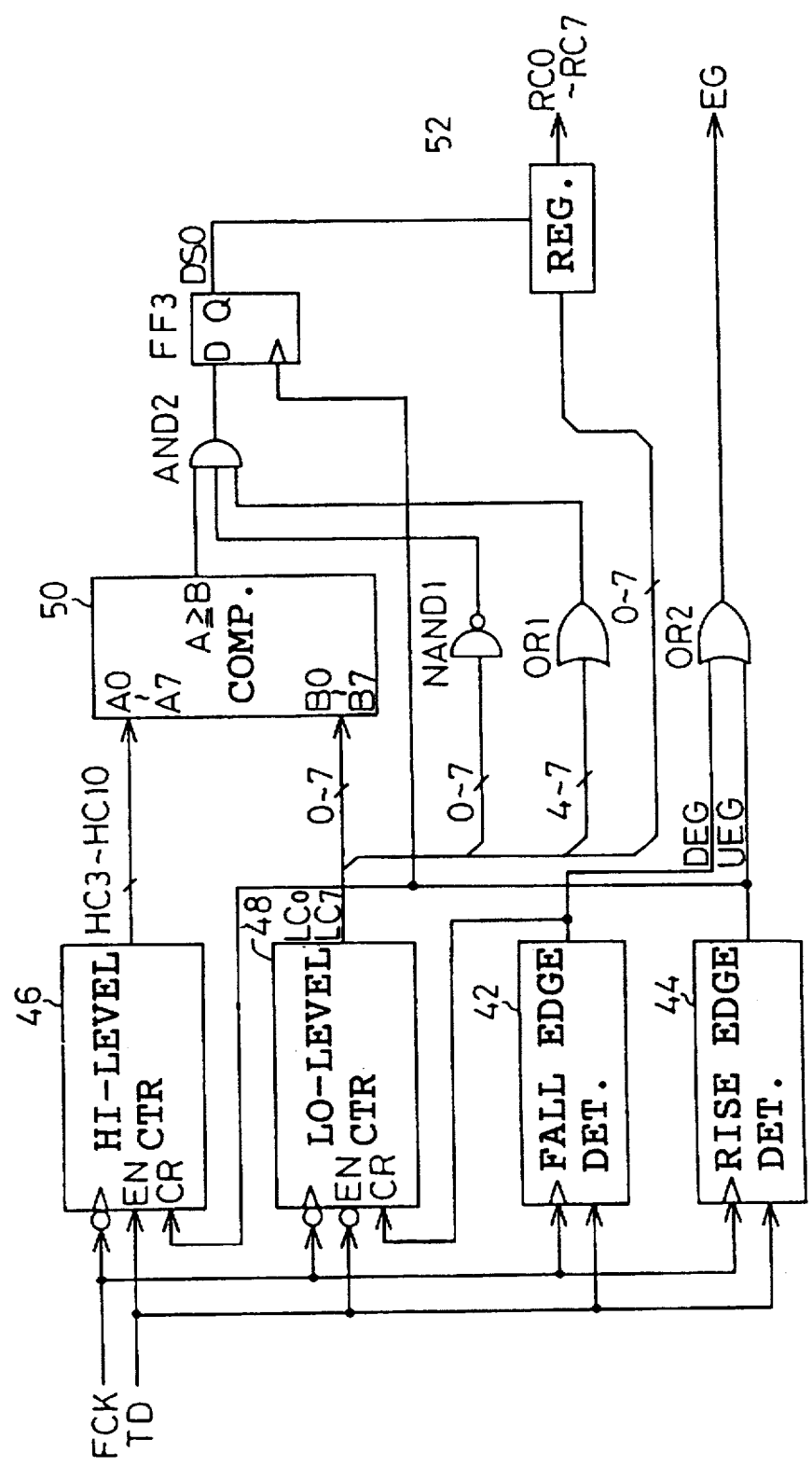
FIG. 9 is a circuit diagram showing the details of a communication speed learning circuit according to the first embodiment.

Now, a description will be given with reference to FIGS. 9 and 10 of the communication rate learning circuit 30 and the frequency dividing circuit 32 which are main portions of the receiving circuit 8. First, the communication rate learning circuit 30, as shown in FIG. 9, includes a falling edge detecting circuit 42, a rising edge detecting circuit 44, a high-level counter 46, a low-level counter 48, a comparator 50, a NAND circuit NAND1, an OR circuit OR1, an AND circuit AND2, a flip flop circuit FF3, a register 52, and an OR circuit OR2. The falling edge detecting circuit 42 outputs the falling edge detection signal DEG which is high only during one period of the reference clock FCK when detecting the falling edge of transmission data TD which is received through the receiver 26. The rising edge detecting circuit 44 which outputs the rising edge detection signal UEG which is high only during one period of the reference clock FCK when detecting the rising edge of transmission data TD similarly. The high-level counter 46 counts the reference clock FCK when the signal line L is high by clearing the count value by the rising edge detection signal DEG, and stops the count when the signal line L goes low to hold the count values HC0 to HC10 of 11 bits. The low-level counter 48 counts the reference clock FCK when the signal line L is low by clearing the count value using the falling edge detection signal DEG, and stops the count when the signal line L goes high to hold the count values LC0 to LC7 of 8 bits. When the count values HC3 to HC10 of thee most significant 8 bits of the high level counter 46 is larger than the count values LC0 to LC7 of the low level counter 48, that is, when the count value of the high level counter 46 is eight times as large as the count value of the low level counter 48 or more, the comparator 50 outputs the H-level signal. When all the outputs of the low level counter 48 are high, that is, the low level counter 48 overflows, the NAND circuit NAND1 outputs the L-level signal. When any one of the higher significant 4 bits LC4 to LC7 of the outputs of the low level counter 48 is H-level, that is, the count value of the low level counter 48 is 16 or more, the OR circuit OR1 outputs the high level signal. When all the outputs of the comparator 50, the NAND circuit NAND1 and the OR circuit OR1 are high, the AND circuit AND2 outputs a high level signal. The flip flop circuit FF3 holds the output of the AND circuit AND2 at the timing of the rising edge detection signal UEG and outputs it as the SOF detection signal DSO. The register 52 holds the count values LC0 to LC7 of the low level counter 48 at a timing at which the SOF detection signal DSO rises. The OR circuit OR2 outputs the H-level signal when any one of the falling edge detection signal DEG and the rising edge detection signal UEG is high.

The output of the flip flop circuit FF3 is supplied to the timing generating circuit 40 as the SOF detection signal DSO, and the output of the register 52 is supplied to the frequency dividing circuit 32 as frequency division data RC0 to RC7. The output of the OR circuit OR2 is supplied to the frequency dividing circuit 32 as an edge signal ED.

The high level counter 46 and the low level counter 48 stop the count operation when the count value becomes maximum and then hold the maximum count value.

In the communication rate learning circuit 30 described above, the high level counter 46 and the low level counter 48 sequentially count the duration of the high and low levels of the transmission data TD in accordance with the reference clock FCK, and when the comparator 50 determines that the count value of the high level is eight times as large as the count value of the low level or more, then the SOF detection signal DSO is outputted assuming that the low level is the low level section SL of the SOF code representative of the head of the transmission data TD. The register 52 holds the count value as a result of counting the section SL.

The case where the high level is eight times as high as the L-level occurs only when the SOF code is present after the no-signal state IDLE in which no transmission data is sent out since the synchronous bit is inserted into the transmission data so that the same level cannot be continued longer than 5 bits. Further, even though the data goes low for a short period of time due to noise or the like, the low level is not recognized as a signal by the OR circuit OR1 unless the width is 16 clock periods or more. As a result, a malfunction is prevented.

Also, because the section SL is one bit wide, the frequency division data RC0 to RC7 obtained by counting the section SL held by the register 52 represent the number of times the reference clock FCK oscillates as high as the transmission clock or the communication rate.

Figure 10:
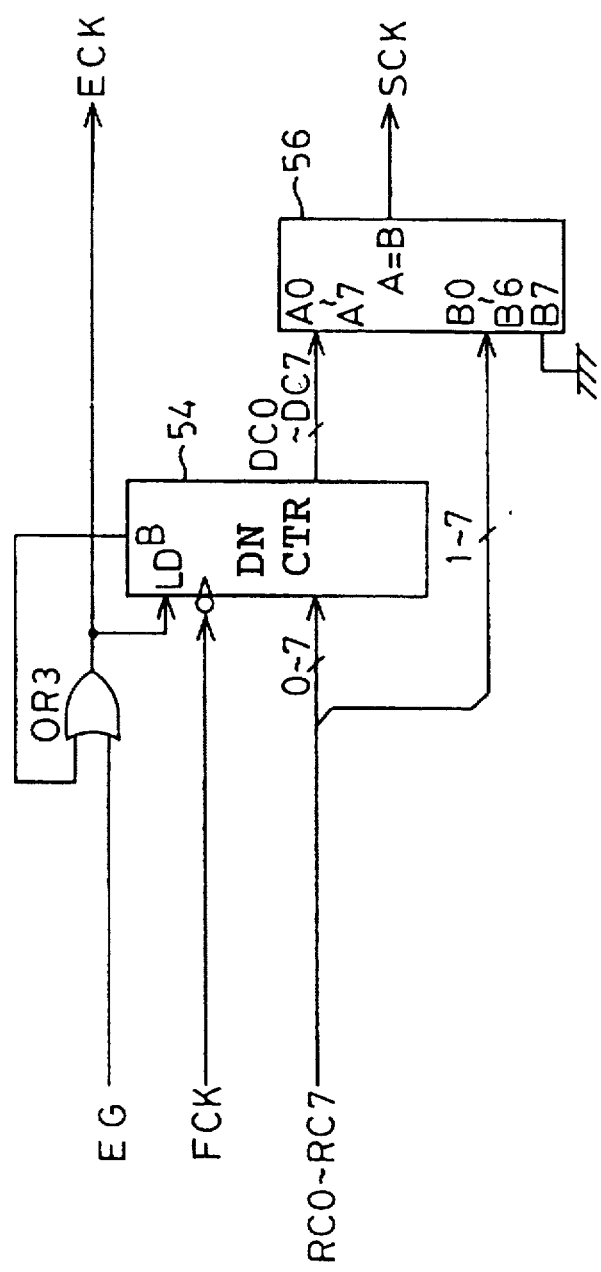
FIG. 10 is a circuit diagram showing the details of a frequency dividing circuit according to the first embodiment.

The frequency dividing circuit 32, as shown in FIG. 10, includes a down counter 54, a comparator 56 and an OR circuit OR3. The down counter 54 operates when the reference clock FCK falls and resets the frequency division data RC0 to RC7 as the count value when the edge clock ECK which will be described later is inputted to the load terminal LD. The comparator 56 outputs a signal of H-level when half the value represented by the frequency division data RC0 to RC7 (that is, a value represented by RC1 to RC7) coincides with the count values DC0 to DC7 of the down counter 54. The OR circuit OR3 inputs a borrow signal B outputted from the down counter 54 when the count values DC0 to DC7 become zero, and it also inputs the edge signal ED representative of the point of change of the signal level of the transmission data, so that the OR circuit OR3 can output the edge clock ECK which is the H-level when any one of the signals B and ED is H-level.

The output of the comparator 56 is supplied to the shift register 34 and the timing generating circuit 40 as the sample clock SCK for sampling the respective bits of the received transmission data, and the edge clock ECK is also supplied to the timing generating circuit 40.

With the frequency dividing circuit 32 described above, the down counter 54 sets the frequency division data RC0 to RC7 detected and held by the communication rate learning circuit 30 as a count value, and counts it down in accordance with the reference clock FCK. The down counter 54 generates the borrow signal B when the count value becomes zero. The down counter 54 resets the frequency-division data RC0 to RC7 as a count value in accordance with the borrow signal B and repeats the down-count operation. Since a time necessary for counting the frequency division data corresponds to one-bit length of the transmission data, the borrow signal B represents the bit boundary of transmission data.

Upon the input of the edge signal EG representative of the change in signal level of the transmission data, the down counter 54 resets the frequency division data RC0 to RC7. In other words, the one-bit length of transmission data is not always an exact integral multiple of the reference clock FCK. When the frequency division data is counted to zero by the down counter 54, an error within one period of the reference clock FCK occurs between the actual one-bit length and the counted one-bit length of the transmission data. Therefore, the borrow signal B is shifted from the actual bit boundary position every the counting is repeated. However, when the point of change of transmission data, that is, the actual bit boundary position appears, the start of counting is made to coincide with the actual bit boundary position, so that the start of counting coincides with the phase of transmission data. The edge pulse EG is outputted as the edge clock ECK representing the bit boundary of transmission data together with the borrow signal B.

In other words, the down counter 54 executes the frequency division of the reference clock FCK depending on only the frequency division data RC0 to RC7 when no change of the signal level exists in the transmission data. When there is an actual bit boundary, the down counter 54 executes the frequency division while making the phase identical with the bit boundary.

As a result of comparing the count value of the down counter 54 with half the value of frequency division data, when these values coincide with each other, the comparator 56 produces a high level pulse as a sample clock SCK. In other words, because half the count value corresponds to substantially the center of the transmission data, it becomes a clock suitable for the sampling of transmission data.

Hereinafter, a description will be given of the detailed operation of the respective components of the communication rate learning circuit 30 and the frequency dividing circuit 32 when transmission data is received, with reference to timing charts shown in FIGS. 11 and 13.

FIG. 11 shows the operation of the circuits from the state immediately before the occurrence of the SOF code until the middle portion of the section SH of the H-level.

As shown in FIG. 11, when the signal line L is in the no-signal state IDLE, because the signal line L is held at a high level, the high level counter 46 counts up through count values HC0 to HC10 in synchronization with the falling of the reference clock FCK. In this situation, the low-level counter 48 stops while holding the count values LC0 to LC7 (in this case, 255) obtained by counting the low level which appeared prior to the current high level.

Upon the completion of the no-signal state IDLE, when the signal line L changes to the low level, the high-level counter 46 stops its operation and holds the count values HC0 to HC10 (63 in this example) at that time. Simultaneously, although the low-level counter 48 is intended to start the count operation, the count value is cleared by the falling edge detection signal DEG which is outputted from the falling edge detecting circuit 42. Then, after the falling edge signal DEG returns to the low level, the low-level counter 48 starts the count operation in synchronization with the falling of the reference clock FCK after the falling edge signal DEG returns to the low level.

At this time, because the count value (63) of the high-level counter 46 is eight times as large as the count value (0) of the low-level counter 48 or more, the output of the comparator 50 goes high. Also, the output of the NAND circuit NAND1 which detects the overflow of the low-level counter 48 goes high, and when the duration of the low level is less than or equal to a predetermined value, the OR circuit OR1 which is disposed to remove that overflow outputs a low level signal.

Thereafter, when the signal line L changes to a high level, the low-level counter 48 holds the count value (63 in this example) and stops the count operation. After being cleared to zero by the rising edge detection signal UEG, the high-level counter 46 starts the count operation.

While the low level of the signal line L is maintained, the count values LC0 to LC7 of the low-level counter 48 are counted up, and when the count values reach 16, the output of the OR circuit OR1 changes to a high level.

As a result, because all of the outputs of the comparator 50, the NAND circuit NAND1 and the OR circuit OR1 are high, the output of the AND circuit AND1 which inputs those outputs also goes high. In the case where the low level of the signal line L is further maintained so that the count value of the low-level counter 48 becomes ⅛ or more of the count value held by the high-level counter 46, whereby the output of the comparator 50 goes low, or in the case where the low-level counter 48 overflows so that the output of the NAND circuit NAND1 goes low, the output of the AND circuit AND1 returns to the low level. However, in FIG. 11, because the count value of the low-level counter 48 is 63 at the time of changing the signal line L to the high level, the output of the AND circuit AND1 is held at the high level.

The fact that the output of the AND circuit AND1 is at the high level at the time the signal line L changes to the high level means that the low level of the signal line is in the low level section of the SOF code. The output of the AND circuit AND1 is held by the flip-flop circuit FF3 at a timing of the rising edge signal UEG, and outputted as the SOF.

Also, the count value (63) of the low-level counter 48 which counted the section LS at the rising timing of the SOF code detection signal DSO is held in the register 52 as the frequency division data RC0 to RC7. Because the section LS corresponds to one-bit length of transmission data, it is found from the count value held by the register 52 that the reference clock FCK oscillates at a frequency about 63 times higher than the communication rate of transmission data.

FIG. 12 is a timing chart illustrating the operation of the data receiving unit from the high level section SH of the SOF code to the middle of the data area DA.

The frequency division data RC0 to RC7 set by the communication rate learning circuit 30 are set in the down counter 54 as the count values DC0 to DC7 at the falling timing of the reference clock FCK in accordance with the edge signal ED obtained by detecting the rising of the SOF code.

Thereafter, the count values DC0 to DC7 are decremented in accordance with the reference clock FCK. When the first section D0 of the data area DA subsequent to the section SH is high, the signal level of transmission data is not changed in the bit boundary between the sections SH and D0. For that reason, when the down counter 54 continues to count until the count value becomes zero, it generates the borrow signal B, and resets the frequency division data RC0 to RC7 stored in the register 52 as the count values DC0 to DC7. The borrow signal B at this time is outputted as the edge clock ECK representing the bit boundary between the sections SH and D0.

Also, in the case where the signal level is changed in the bit boundary of transmission data (the boundary between the sections D0 and D1 in this example), when one-bit length obtained by counting down the frequency division data RC0 to RC7, that is, an interval at which the borrow signal B occurs is shorter than one-bit length of the actual transmission data, the edge signal ED representing the actual bit boundary occurs successively after the down counter 54 generates the borrow signal B. This causes the count value set by the borrow signal B to be reset immediately. As a result, the start of counting by the down counter 54 coincides with the actual bit boundary, that is, the phase of a clock coincides with transmission data.

Conversely, although not shown in FIG. 12, in the case where an interval at which a borrow signal occurs is longer than one-bit length, an edge signal ED appears before the count value becomes zero. For that reason, when the signal level of transmission data is changed, the count value is reset in accordance with the edge signal ED without the occurrence of a borrow signal B so that the phase of a clock coincides with transmission data.

When the count value reaches half (that is, 31 in this example) of the frequency division data RC0 to RC7 stored in the register 52 during the counting operation, the comparator 56 outputs a sample clock SCK. This pulse always appears in the middle position of the bit of transmission data, and transmission data is sampled by the shift register 34 in accordance with the sample clock SCK.

As described above in detail, in the vehicle data communication system in accordance with this embodiment, each of the receiving circuits 8 provided in the slaves S1, S2, ... , detects the SOF signal constituted by the low level section SL of one bit positioned at the head of transmission data and high level section SH of one bit, and counts the pulse width of the low level section SL in accordance with the reference clock FCK to calculate the number of times one bit of transmission data is larger than the period of the reference clock FCK. On the basis of this calculation, the receiving circuit 8 frequency-divides the reference clock RCK, thereby generating the sample clock SCK and so on for sampling the received transmission data.

In other words, the receiving circuit 8 learns one-bit length from the SOF code of transmission data and frequency-divides the reference clock FCK to thereby generate a clock having a period of the learned one-bit length.

Therefore, according to the present invention, since information necessary for generating a clock for reception is obtained by detecting the SOF code and counting its pulse width in accordance with the reference clock FCK, the sample clock SCK for reception which samples the received transmission data can be produced in an extremely short time.

Further, since it is unnecessary that a clock for receiving transmission data in the receiving circuit 8 is made in synchronization with a clock for transmission, the adjustment of the unit can be simplified.

Further, in the receiving circuit 8, the oscillator 28 may oscillate at the frequency of the reference clock FCK with a period satisfactorily shorter than one-bit length of transmission data. Not only the clock is not limited to a specified frequency, but also even though the oscillation frequency fluctuates due to temperature or the like, the oscillator 28 learns one-bit length every time transmission data is received. Therefore, transmission data can be correctly received so far as the oscillation frequency does not fluctuate so much during receiving one frame. As a result, no oscillating circuit with a high degree and with an excellent stability is required, and the unit can be implemented inexpensively.

Also, in the receiving circuit 8, the communication rate learning circuit 30 includes the counters 46 and 48 which count the duration of the high level and low level of the communication line L in accordance with the reference clock FCK, respectively. When the ratio of the respective count values is eight or more, it is determined that the low level at that time is the low level section SL of the SOF code.

Therefore, in the receiving circuit 8, even though the communication rate of transmission data is not previously known, the SOF code can be reliably detected.

In other words, the transmission data delivered through the signal line L has the synchronous bit inserted therein in such a manner that the same level does not continue for six bits or more. Even if the low level of one bit appears after the high level of five bits are continuous at the worst, its ratio is 5 and does not exceed 6. In other words, the case where the ratio of count values between the high level and the low level subsequent to this H-level is six times or more occurs only when the receiving circuit 8 receives the L-level section SL of the SOF code representing the head of the transmission data after the no-signal state IDLE where no transmission data is sent out. Hence, the SOF code can be reliably detected by counting the H-level and L-level of the signal line L and obtaining its ratio.

Furthermore, when the count value of the L-level does not reach 16, the SOF code detection signal DSO is not outputted. Even though the low level of a short period occurs on the communication line L due to influence of noise or the like, a malfunction can be reliably prevented without erroneously detecting the low level as an SOF code.

Further, in the receiving circuit 8 of this embodiment, the frequency dividing circuit 32 learns due to the communication rate learning circuit 30 and frequency-divides the reference clock FCK on the basis of the frequency division data RC0 to RC7 representative of the number of clocks of the reference clock FCK corresponding to one bit of transmission data, thereby generating the edge clock ECK and the sample clock SCK. Moreover, when the signal level of transmission data is changed, then the start of frequency division coincides with the point of change of the signal level, i.e., the bit boundary of transmission data.

Therefore, the edge clock ECK and the sample clock SCK which are in synchronization with the phase of transmission data can be generated, and the transmission data can be precisely sampled.

In other words, as long as one-bit length of transmission data does not precisely coincide with an integral multiple of the reference clock FCK, the edge clock ECK and sample clock SCK generated by frequency division cause an error (phase shift) within one period of the reference clock FCK even bit of transmission data. When the signal level of transmission data is not changed, this error is accumulated. However, since the sampling of transmission data using the sample clock SCK is conducted at the 31st clock which is in the center of the one-bit length that is formed by 63 periods of the reference clock FCK, i.e., in substantially the center of the bit, sampling is not in error as long as errors of ½ bit or more of transmission data, that is, errors for 31 periods or more of the reference clock FCK, are not accumulated. In the format of transmission data used in this embodiment, there is a case where the same level of 5-bit length is continuous, and the errors for 5 periods of the reference clock occur at a maximum. However, even though the phase is shifted by 5 periods of the reference clock, there is no case where the bit is erroneously sampled, and accurate sampling can be conducted.

Further, even though one bit of transmission data is a minimum value (16 periods of the reference clock FCK) permitted as the low level signal, a case where the errors of half a bit length or more occur is when 8 bits or more of transmission data continuously have the same level, and the sampling of transmission data is not in error because the point of change of a signal always exists at least within 6 bits as long as the transmission format used in this embodiment is used.

Furthermore, in this embodiment, the oscillating circuit 28 outputs the reference clock signal FCK having a frequency of about 2.5 MHz, and transmission data transmitted at about 40 kbps is sampled by a clock which is obtained by dividing the reference clock FCK by 63. However, even though the oscillation frequency is ¼ because the accuracy of the oscillating circuit 28 is lowered by the change of temperature, change with time or variations due to manufacturing, sampling can be conducted with accuracy without any bit shifting as described above.

Also, in this embodiment, the communication rate learning circuit 30 does not recognize the low level signal when the pulse width is equal to or less than 15 periods of the reference clock, and if there is a pulse width equal to or more than 255 periods of the reference clock, the low-level counter overflows and cannot learn the communication rate. For that reason, the oscillator 28 must generate the reference clock FCK to oscillate at a speed of 16 to 254 times as high as the communication rate of the transmitted transmission data. In this embodiment, the oscillator 28 is implemented by a ring oscillator consisting of a plurality of inverting circuits having an oscillation frequency which is largely changed due to the manufacturing variations of ICs, the environmental temperature in use, changes due to aging, and so on. However, since the communication rate of transmission data is about 40 kbps, the reference clock FCK may be set within the range of 640 kHz to about 10 MHz. Even if the oscillation frequency fluctuates, it is easy to manufacture the oscillator 28 so that it oscillates within this range.

Also, the receiving circuit 8 of the present invention can be integrated onto the same chip as a power transistor or other control IC because it can be implemented with a small-sized circuit. If semiconductor chips which require no expensive parts and can receive serial communication are assembled into a motor or sensor, the structure of the unit is simplified, and the unit can be constituted inexpensively.

Next, the transmitting circuit 6 of this embodiment is designed so that the same high level as that of the no-signal state IDLE is sent out by 8 bits. Therefore, according to the transmitting circuit 6 of this embodiment, when transmission data is continuously transmitted, since the high level of 8 bits is always inserted immediately before the SOF code, the communication rate learning circuit 30 of the receiving circuit 8 can reliably detect the SOF code and also can reliably learn the communication rate.

In this embodiment, the transmission line BUS for connecting the master M and the slaves S1, S2 . . . is comprised of a communication line L, a power supply line V and a ground line G. Therefore, for example, when the 4-phase step motor of the actuator A1 which is mounted on the slave S1 is driven, in the conventional system in which the 4-phase step motor is directly controlled by a signal line from the ECU, five lines in total, that is, at least 4 signal lines and one ground line, are required. On the other hand, according to this embodiment, two signal lines can be omitted, and wiring and so on between the ECU 4 and the actuators A1, A2, . . . can be remarkably simplified.

In the foregoing embodiment, the NRZ code is used as a transmission code of transmission data, and a format in which a synchronous bit having a level inverse to that of a bit immediately before the synchronous bit is inserted every four bits is used in the data area DA. However, as shown in FIG. 13A, a format in which an inverse bit (commonly known as a stuff bit) of one bit is inserted only when the same level is continued for a predetermined number of bits (5 bits in this example) may be used.

In this case, if the same level is not continued for 5 bits or more, since a stuff bit is not inserted, the frame length of transmission data can be shortened.

Figures 13A, 13B, 13C:
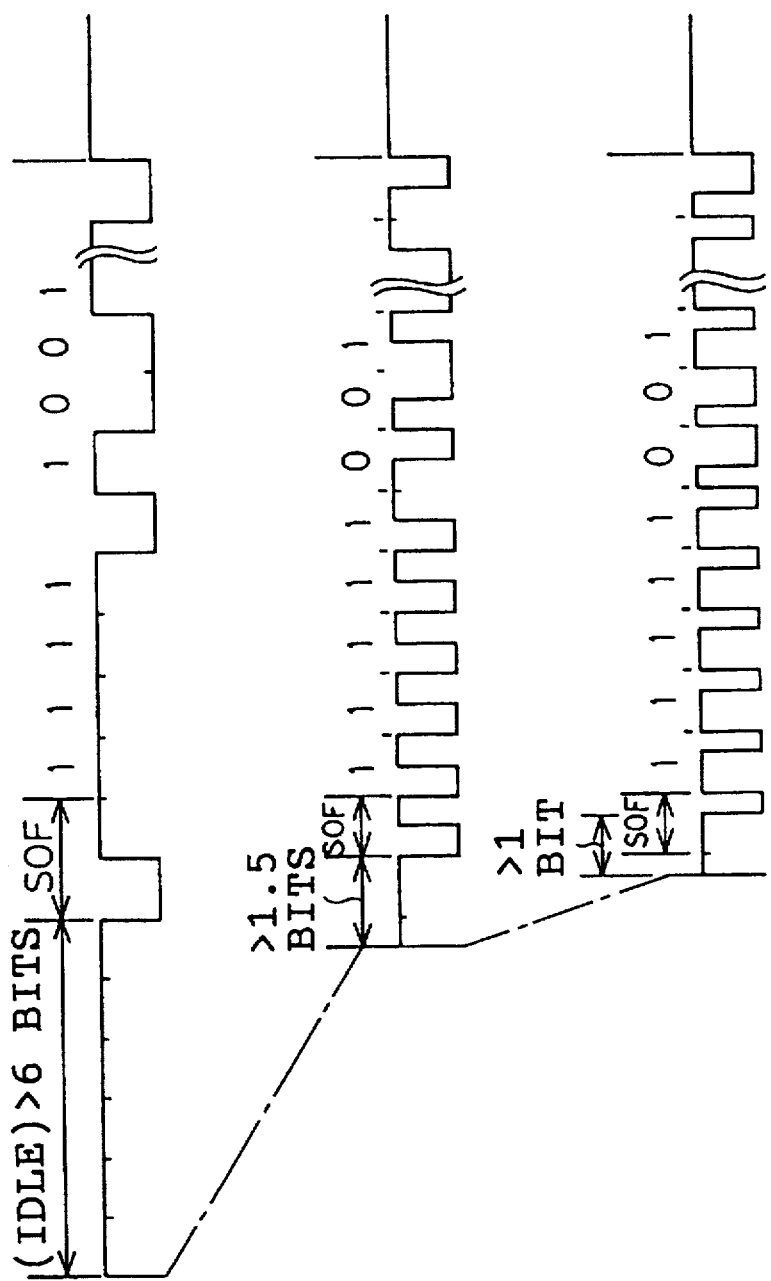
FIGS. 13A–13C are graphs illustrating other transmission codes.

Also, as shown in FIG. 13B, a biphase code may be used as a transmission code. This is a code having a signal level which always changes in one bit such that a code which changes from a low level to a high level in the middle of one bit is 1 whereas a code which changes from a high level to a low level in the middle of one bit is 0. In encoding, although a clock having a speed twice as high as that of the NRZ code is required, because the same level in the encoded transmission data is not maintained longer than one-bit length (2 clocks) at a maximum, it can be determined that a state in which the same level is maintained for 1.5 bits (3 clocks) or more is the no-signal state IDLE.

Therefore, since an interval of the frame of transmission data can be narrowed and transmitted, the coefficient of transmission can be improved. Also, in this case, the signal level always changes in one bit. This makes it unnecessary to insert a code for correcting the phase of the reception-side clock such as a synchronous bit or a stuff bit into data.

Further, as shown in FIG. 13C, a PWM (pulse width modulation) code may be used as a transmission code. This is a code which makes a pulse width in association with data, for example, such that a pulse having a ⅔ width represents a 1 whereas a pulse having a ⅓ width represents a 0. In encoding, although a clock having a speed three times as high as that of the NRZ code is required, because the same level in the encoded transmission data is not maintained longer than ⅔ bits (2 clocks) at a maximum, it can be determined that a state in which the same level is maintained one bit (3 clocks) is the no-signal state IDLE.

Therefore, compared with a case where the biphase code is used, an interval of the frame can be further narrowed and transmitted. Moreover, because the signal level always changes in the boundary between bits, it is unnecessary to insert a code for correcting the phase of the reception-side clock into data, as in the biphase code.

Further, in the foregoing embodiment, the data area DA is comprised of three basic blocks BL1 to BL3. However, the number of basic blocks BLn is not limited, and the optimum length may be selected for each particular system. Moreover, the size of the basic block BLn, that is, an interval at which a synchronous bit is inserted into data may be appropriately set in accordance with the accuracy of the oscillator 28. In the case where the accuracy of the oscillator 28 is lowered, in particular, in the case where the oscillation frequency rapidly changes due to a change of temperature or the like, the basic block BLn may be set to be shorter, for example, to a 3-bit length. Conversely, if the accuracy of the oscillator 28 is relatively high, it may be set to be more than a 6-bit length.

Furthermore, in the foregoing embodiment, the respective slaves S1, S2, . . . are assigned to each of the basic blocks BL1 and BL2 of the data area DA. However, addresses for designating the slaves S1, S2 . . . are assigned to parts of data D0 to D7, or the slaves S1, S2 . . . may be associated with every bit.

Still further, in the foregoing embodiment, in the communication rate learning circuit 30, in the case where the count value obtained by counting the high level of the communication line L is eight times as large as the count value obtained by counting the low level subsequent to that high level, that is, when the low level of one-bit length is received after the high level is continued for an 8-bit length or longer, the L-level at that time is detected as the L-level section SL of the SOF code. However, if the accuracy of the oscillator 28 is relatively high, the length of the high level used for the detection process may be longer than the maximum number of bits by which the same level is continued within transmission data. That is, in the foregoing embodiment, it may be 6 times as large as that of the low level.

Further, in the foregoing embodiment, the oscillator 28 is implemented using the ring oscillator. However, it goes without saying that a quartz oscillator or a ceramic oscillator may be used. In this case, because the reference clock of the reception side is more accurate, those oscillators can be used even if the fluctuation of the transmission-side clock is somewhat large.

Also, in the case where transmission data first transmitted from the master M after power is turned on may not be always received at the side of the slave S1, S2 . . . , a specified pattern such as an SOF code may not be detected, but the following technique may be used. That is, intervals between the points of change in the signal level of the communication line L are measured at several times, and the shortest interval of the measured intervals is counted as one-bit length in accordance with the reference clock FCK, and the count value may be used as frequency division data for frequency-dividing the reference clock FCK.

In the foregoing embodiment, when the slaves S1, S2 . . . receive transmission data, the response area RA for notifying the master M of the reception state consists of the ACK bit and the NCK bit, and is commonly used in the respective slaves. However, an exclusive area may be used for each of the slaves S1, S2 . . . if needed.

In this case, the frame format of transmission data as well as the operation of the master M and the slaves S1, S2 . . . will be described with reference to FIG. 14. In this example, eight slaves S1 to S8 are connected to the signal line L.

A response area RS of transmission data on the signal line L consists of response bits A1 to A8 which are exclusively assigned to the respective slaves S1 to S8, and synchronous signals SY consisting of one bit of the low level and one bit of the high level, which are inserted between the response bits A3 and A4 and between the response bits A6 and A7, respectively. An end signal EOF consisting of one bit of the high level which represents the end of data sent out by the master M is inserted between the data area DA and the response area RA.

After sending out the preceding area PA, the data area DA and the end signal EOF, the master M sends out a synchronous signal SY twice at 3 bit intervals.

Upon receiving the data area DA, the slaves S1 to S8 send out an SCK/NCK signal (for example, low level if normally receivable) at the timing of the response bits A1 to A8 which have been previously assigned, in accordance with the presence/absence of an error.

In the master M, the sending of the synchronous signal SY can be implemented simply, for example, by expanding the shift register shown in FIG. 4 by the amount of the end signal EOF and response area RA. Also, in the slaves S1 to S8, the sending of the ACK/NCK signal can be easily produced by the combination of the logical circuits due to the timing generating circuit 40 because it differs from the ACK/NCK signal of the foregoing embodiment only in its sending timing.

In this way, since the response bits A1 to A8 are assigned to each of the slaves S1 to S8, in the master M, the slaves S1 to S8 which could not normally receive the transmission data can be specified, thereby enabling the system to accurately cope with such a situation.

Also, since the synchronous signal SY is inserted into the response area PA, in the respective slaves S1 to S8, the synchronization of bits can be corrected at least at the point of change of that synchronous signal SY. Therefore, even if an oscillating source having a low stability is used in the slaves S1 to S8, the slaves S1 to S8 can correctly recognize the timing of the respectively assigned response bits A1 to A8, and can reliably inform the master M of the reception state of transmission data.

Figure 15:
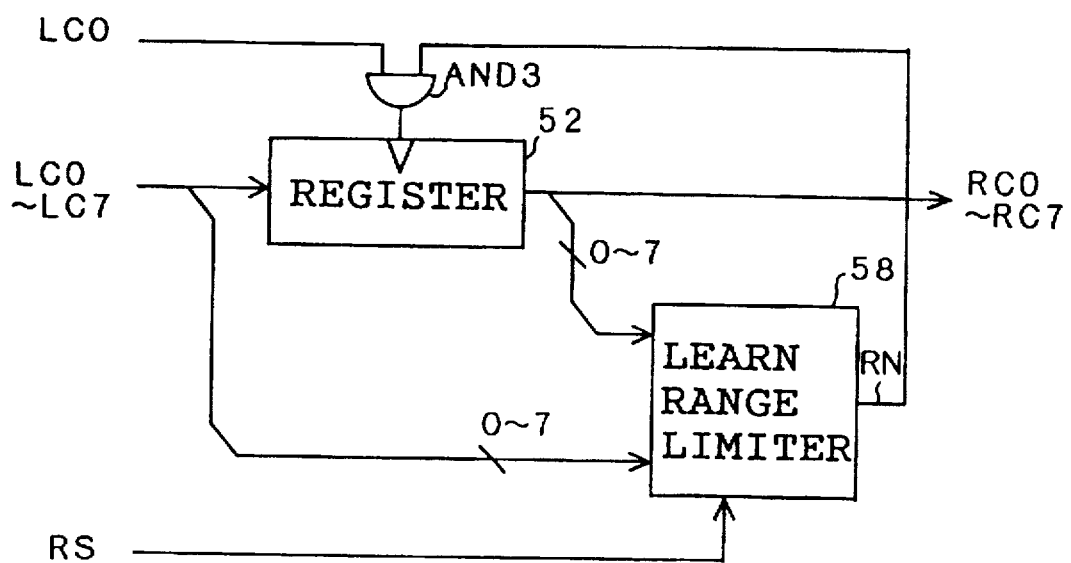
FIG. 15 is a circuit diagram showing the structure in which a learning range limiting circuit is added to the communication speed learning circuit in the first embodiment.

In the foregoing embodiment, the register 52 inputs the count values LC0 to LC7 which are obtained by counting the section SL in accordance with the SOF detection signal DSO unconditionally. In environments where there is much noise, when noise enters the line of the SOF detection signal DSO, the value of the register 52 is accidentally renewed even if no SOF code is actually detected. This causes a reception clock to be generated on the basis of the error frequency division data RC0 to RC7 which are stored in the register 52. In order to prevent such a situation, the peripheral circuit of the register 52 may be implemented as shown in FIG. 15.

In other words, the peripheral circuit of the register 52 may be implemented as follows. A learning range limiter circuit 58 which outputs a renewal permitting signal RN which goes high when the count values LC0 to LC7 are within a predetermined range with the frequency division data RC0 to RC7 stored in the register 52 as a reference, and an AND circuit AND3 which outputs a high level signal when both the renewal permitting signal RN and the SOF detection signal DSO are at a high level are added. The register 52 holds the count values LC0 to LC7 at the timing at which the output of the AND circuit AND3 rises instead of the SOF detection signal DSO. A learning range selection signal RS for controlling a predetermined range is provided to the learning range limiter circuit 58 from the timing generating circuit 40.

Figure 16:
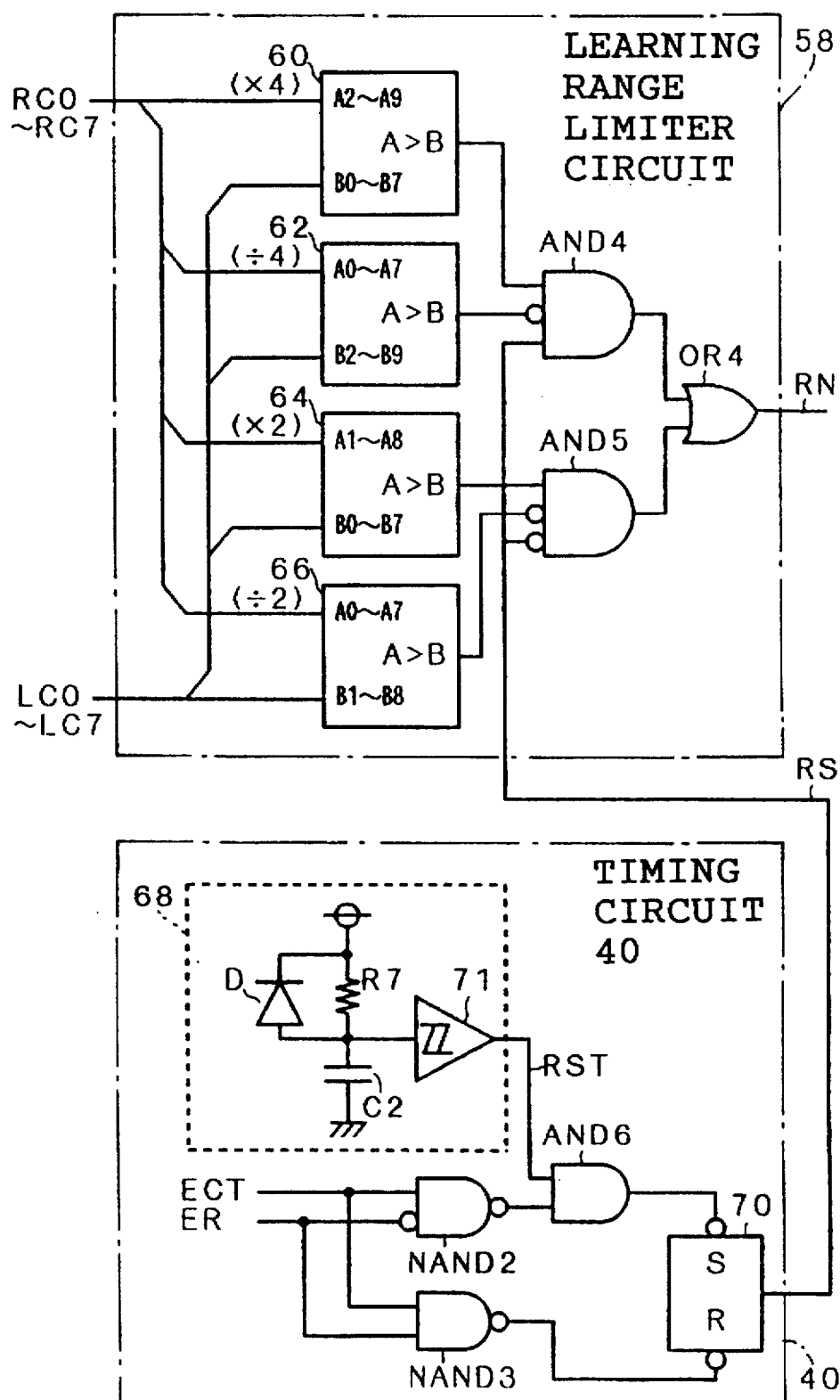
FIG. 16 is a circuit diagram showing the details of the learning range limiting circuit in the first embodiment.

As shown in FIG. 16, the learning range limiter circuit 58 includes a comparator 60, a comparator 62, a comparator 64, a comparator 66, an AND circuit AND4, an AND circuit AND5 and an OR circuit OR4. The comparator 60 compares a value four times as large as the frequency division data RC0 to RC7 (shifted 2 bits toward the most significant side) with the count values LC0 to LC7 and outputs a high level signal when the former is larger than the latter. The comparator 62 compares the frequency division data RC0 to RC7 with a value four times as large as the count values LC0 to LC7 (shifted 2 bits toward the most significant side) and outputs a high level signal when the former is larger than the latter. The comparator 64 compares a value twice as large as the frequency division data RC0 to RC7 (shifted 1 bit toward the most significant side) with the count values LC0 to LC7 and outputs a high level signal when the former is larger than the latter. The comparator 66 compares the frequency division data RC0 to RC7 with a value of twice as large as the count values LC0 to LC7 (shifted 1 bit toward the most significant side) and outputs a high level signal when the former is larger than the latter. The AND circuit AND4 outputs a high level signal when the output of the comparator 60 is high, the output of the comparator 62 is low, and the learning range selection signal RS is high. The AND circuit AND5 outputs a high level signal when the output of the comparator 64 is high, the output of the comparator 66 is low, and the learning range selection signal RS is low. The OR circuit OR4 outputs a high level signal when at least one of the outputs of the AND circuits AND4 and AND5 is high.

In the leaning range limiter circuit 58 thus described, in the case where the learning range selection signal RS is high, a renewal permitting signal RN is outputted when the count values LC0 to LC7 are ¼ to 4 times as large as the frequency division data RC0 to RC7 in accordance with the comparison results of the comparators 60 and 62. When the learning range selection signal RS is low, a renewal permitting signal RN is outputted when the count values LC0 to LC7 are ½ to 2 times as large as the frequency division data RC0 to RC7 in accordance with the comparison results of the comparators 64 and 66.

In this example, the learning range selection signal RS is a signal generated by the timing generating circuit 40. The timing generating circuit 40 includes a reset circuit 68, a NAND circuit NAND2, a NAND circuit NAND3, an AND circuit AND6, and an RS flip flop (hereinafter, referred to as "RSFF") circuit 70. The reset circuit 68 outputs a low level reset signal RST only for a predetermined period of time after power is turned on. The NAND circuit NAND2 outputs a low-level signal when the error check signal ER outputted from the error check circuit 36 is low (that is, no error) and the error check timing signal ECT outputted when all the shift registers 34 receive reception data is high. The NAND circuit NAND3 outputs a low level signal (the same as an inverted level of the latch signal LT in the foregoing embodiment) when both the error check signal ER and the error check timing signal ECT are high. The AND circuit AND6 outputs a low level signal when at least one of the output RST of the reset circuit 68 and the output of the NAND circuit NAND2 is low. The RSFF circuit 70 has a reset input S connected to the output of the AND circuit AND6 and a reset input R connected to the output of the NAND circuit NAND3, and outputs the learning range selection signal RS. The reset circuit 68 includes a resistor R7 connected to a power line, a capacitor C2 constituting an integrator in cooperation with the resistor R7, a diode D connected in parallel to the resistor R7 with a cathode being disposed at the power line side, and a Schmitt trigger circuit 71 which inputs an output of the integrated circuit consisting of the resistor R7 and the capacitor C2 and outputs a reset signal RST.

Figure 8:
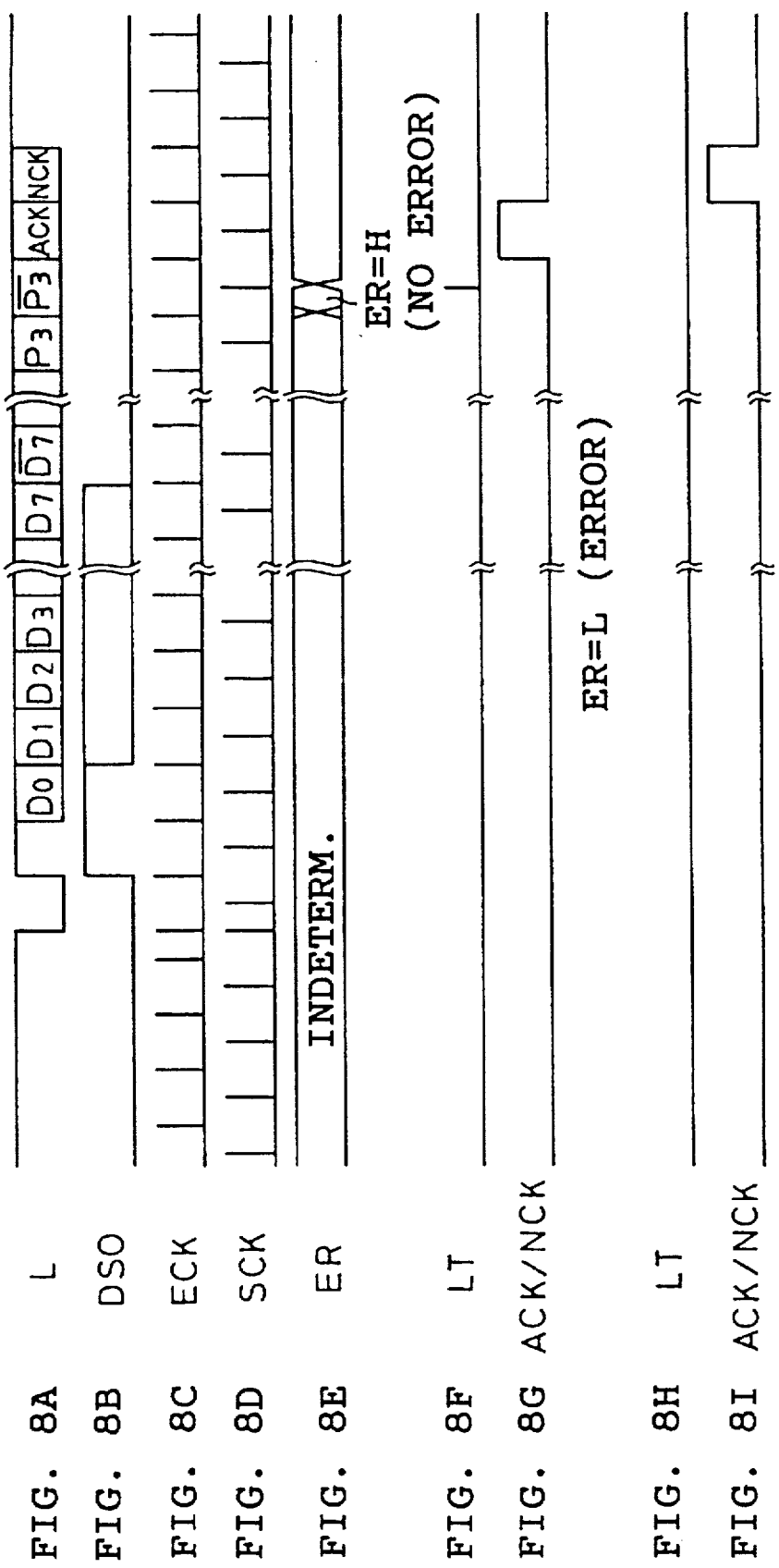
FIGS. 8A–8I are graphs showing the operation of a timing generating circuit according to the first embodiment.

The error check signal ER is entirely identical with the corresponding circuit shown in FIG. 8 which is illustrative of the foregoing embodiment. The error check signal ER outputs a high level signal at a predetermined timing if no error exists in the received transmission data, but outputs a low level signal if an error exists. The error check signal ER is undefined in other cases. The error check timing signal ECT is a signal which is synchronous with the sample clock SCK and goes high when the error check signal ER outputs an error result.

Figure 17:
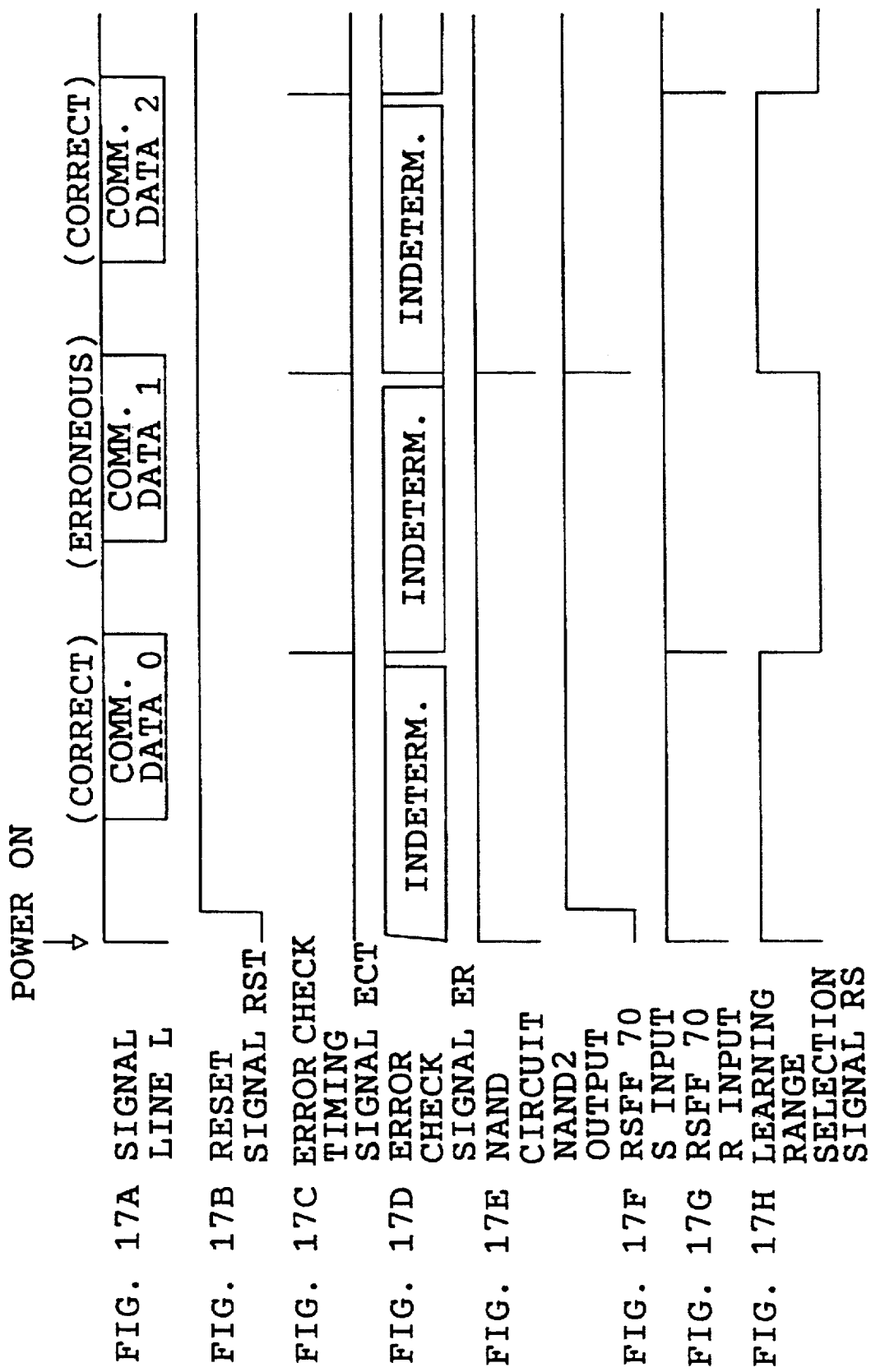
FIGS. 17A–17H are graphs showing the operation of the timing generating circuit for generating a learning range selection signal in the first embodiment.

As shown in the timing chart of FIG. 17, the reset signal RST goes high after staying at the L level only for a predetermined period of time since power was applied. Because the set input S of the RSFF circuit 70 goes low when the reset signal RST is low, the output of the RSFF circuit 70, that is, the learning range selection signal RS, goes high.

As a result, when receiving transmission data #0, the learning range limiter circuit 58 determines whether the count values LC0 to LC7 obtained by counting the width of the low level section SL of the SOF code is within ¼ to 4 times the frequency division data RC0 to RC7. When determining that it is within the learning range, the learning range limiter circuit 58 allows the count values LC0 to LC7 to be stored in the register 52 as new frequency division data RC0 to RC7. The reception clock is produced on the basis of the frequency division data RC0 to RC7 stored in the register 52, and the reception data #9 is received in the learning range limiter circuit 58 in accordance with that reception clock.

If there is no error in the received transmission data #0, the error check signal ER goes high, and the reset input R goes low at the timing of the error check timing signal ECT. Therefore, the learning range selection signal RS goes low. As a result, when receiving transmission data #0, the learning range limiter circuit 58 determines whether the count values LC0 to LC7 are ½ to 2 times as large as the frequency division data RC0 to RC7. When determining that it is within the learning range, the contents stored in the register 52 are renewed, and the reception data is produced in accordance with the new frequency division data RC0 to RC7. When the count values LC0 to LC7 are out of the learning range, the reception clock is produced on the basis of the frequency division data RC0 to RC7 currently stored in the register 52, and the transmission data #1 is received in the learning range limiter circuit 58.

If there is an error in the received transmission data #1, the error check signal ER goes low, and the set signal S goes low at the timing of the error check timing signal ECT. Therefore, the learning range selection signal RS goes high. Thereafter, the reception of transmission data is repeated in the same manner.

As described above, with the use of the learning range limiter circuit 58, even though, for example, noise enters the signal line L and the communication rate learning circuit 30 malfunctions using that noise as the SOF signal so that the SOF detection signal DSO is erroneously outputted, a stabilized reception clock can be produced and stabilized operation of the circuit can be maintained even if the count values LC0 to LC7 are out of the predetermined range, using the frequency data RC0 to RC6 as a reference.

Also, the learning range for determining whether data in the register 52 is renewed or not is narrowed if the previous transmission data is normally received (½ to 2 times as large as frequency division data RC0 to RC7), but broadened if an error occurs (likewise, ¼ to 4 times). Therefore, even though the count values LC0 to LC7 fluctuate a great deal due to some influence, the learning range follows such a fluctuation rapidly to generate a reception clock which is synchronous with the transmission data.

In this example, for simplicity, the circuit has been described so that the learning range is changed over between ¼ to 4 times and ½ to 2 times as large as the frequency division data RC0 to RC7. In the case where the stability of frequency of the oscillator 28 as used is relatively high, the learning range is controlled so as to be further limited, for example, it may be changed over between $1/1.1$ to 1.1 times and ½ to 2 times. Also, with the increased number of stages for change-over, the learning range is made narrower stage by stage every time transmission data can be normally received. On the other hand, when an error is detected, the learning range may be broadened stage by stage or to the largest possible value in a single step.

The signal waveforms of transmission data transmitted on the signal line L and taken by the slaves S1, S2 . . . are different depending on positions to which the slaves S1, S2 . . . are connected because attenuation or distortion occurs in the transmission data during transmitting. As in the foregoing embodiment, if transmission data is outputted from only one master, the respective slaves S1, S2 . . . may be adjusted to optimum threshold values in accordance with their signal waveforms. However, when there are a plurality of nodes which send out transmission data, the signal waveform of transmission data to be received is different depending on the transmitter, and an optimum threshold value for taking that signal in is different. As a result, the adjustment of the threshold value becomes very difficult.

Figure 18:
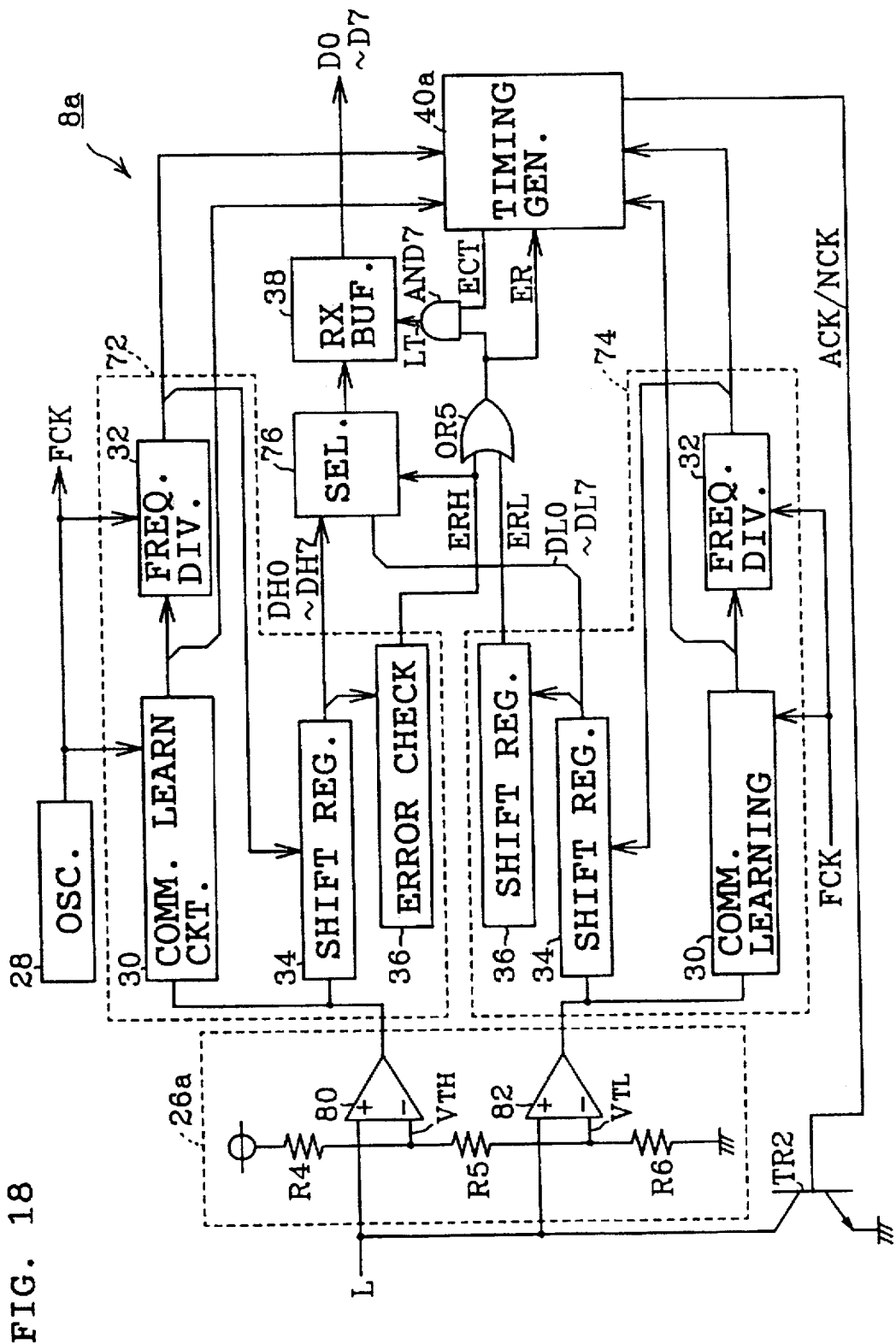
FIG. 18 is a block diagram showing the structure of a receiving circuit having two binary coding circuits according to the first embodiment.

In such a case, a receiving circuit 8a shown in FIG. 18 may be used in the slaves S1, S2 . . . instead of the receiving circuit 8.

In other words, the receiving circuit 8a includes a receiver 26a, a first circuit 72, a second circuit 74, an oscillating circuit 28, a selector 76, a reception buffer 38, a timing generating circuit 40a, an OR circuit OR5, an AND circuit AND7, and a transistor TR2. The receiver 26a takes transmission data from the signal line L to output two types of binary coded data, TDH and TDL. The first and second circuits 72 and 74 are implemented in the same manner as in the foregoing embodiment using a communication rate learning circuit 30, a frequency dividing circuit 32, a shift register 34, and an error check circuit 36. The oscillating circuit 28 is provided commonly to the first and second circuits 72 and 74. The selector 76 selectively outputs any one of reception data DH0 to DH7 and DL0 to DL7 which are outputted from the respective shift registers 34 in the first and second circuits 72 and 74 with an error check signal ERH outputted from the error check circuit 36 in the first circuit 72 as a select signal. The reception buffer 38 takes the output of the selector 76 in accordance with a predetermined latch signal LT. The timing generating circuit 40a outputs an error check timing signal ECT which will be described later, the ACK/NCK signal and so on on the basis of a variety of signals outputted from the first and second circuits 72 and 74 and so on. The OR circuit OR5 outputs a high level signal when at least one of the error check signals ERH and ERL outputted from the respective error check circuits 36 in the first and second circuits 72 and 74 is high. The AND circuit AND7 outputs a high level signal when both of the output of the OR circuit OR5 and the error check timing signal ECT outputted from the timing generating circuit 40a are high. The transistor TR2 transmits the ACK bit or NCK bit to the signal line L in accordance with the ACK/NCK signal.

The receiver 26a includes two voltage comparators 80 and 82 each having a positive input connected to the signal line L, a resistor R4 having one terminal connected to a power supply line, a resistor R6 having one terminal connected to a ground line, and a resistor R5 having both terminals connected to the other terminals of the respective resistors R4 and R6, respectively. The respective nodes of the resistors R4, R5 and the resistors R5 and R6, both are connected in series, are connected to the inverting inputs of the respective voltage comparators 80 and 82.

In the receiver 26a thus described, the voltage comparators 80 and 82 binary-code transmission data on the signal line L in accordance with predetermined threshold values VTH and VTL which are respectively determined by the ratio of divided voltages of the resistors R4, R5 and R6, and take it in. Then, the binary-coded data TDH and TDL are supplied to the first and second circuits 72 and 74, respectively. The detailed operations of the first and second circuits 72 and 74 are entirely identical to that of the foregoing embodiment, and therefore their description will be omitted.

Figure 19:
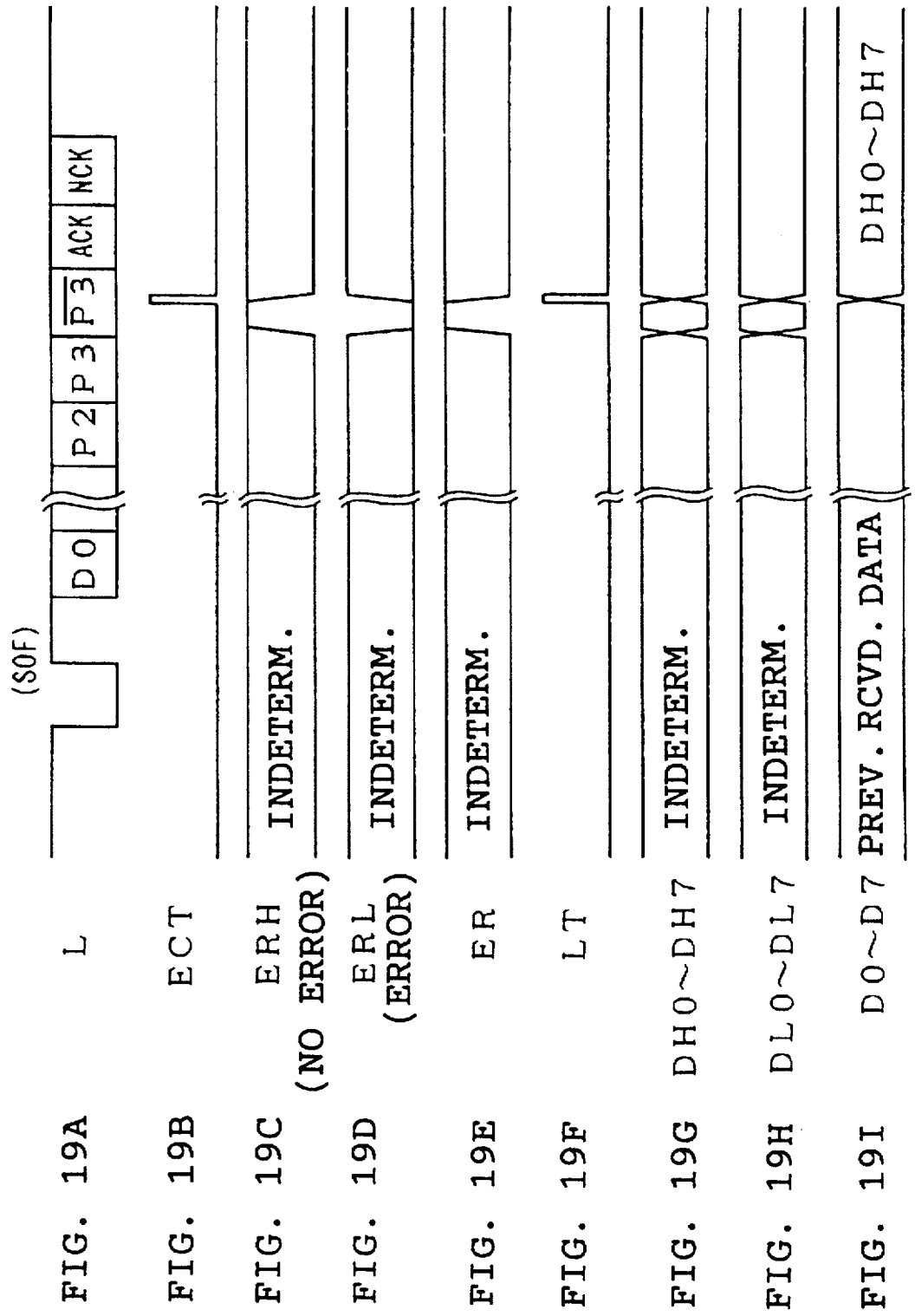
FIGS. 19A–19I are graphs showing the operation of a selector and a reception buffer according to the first embodiment.

Now, the operation of the respective parts in the receiving circuit 8a will be described with reference to FIG. 19 which illustrates a timing chart.

The receiving circuit 8a receives transmission data through the signal line L from the receiver 26a, and all of the respective shift registers 34 in the first and second circuits 72 and 74 receive done frame of data. Then, the error check signals ERH and ERL outputted from the respective error check circuits 36 are generated in accordance with the respective data reception states in such a manner that they are low if there is no error but high if there is an error. In this situation, the reception data DH0 to DH7 and DL0 to DL7 are supplied to the selector 76 from the respective shift registers 34. The selector 76 supplies the reception data DH0 to DH7 to the reception buffer 38 if the error check signal ERH is high, but the reception data DL0 to DL7 if it is low. Then, the error check timing signal ECT is outputted from the timing generating circuit 40a while the respective error check signals ERH and ERL are generated. If at least one of the error check signals ERH and ERL is in a no-error state, the reception data outputted by the selector 76 is stored in the reception buffer 38 in accordance with a data latch signal LT generated at a timing of the error check timing signal ECT.

Figure 20:
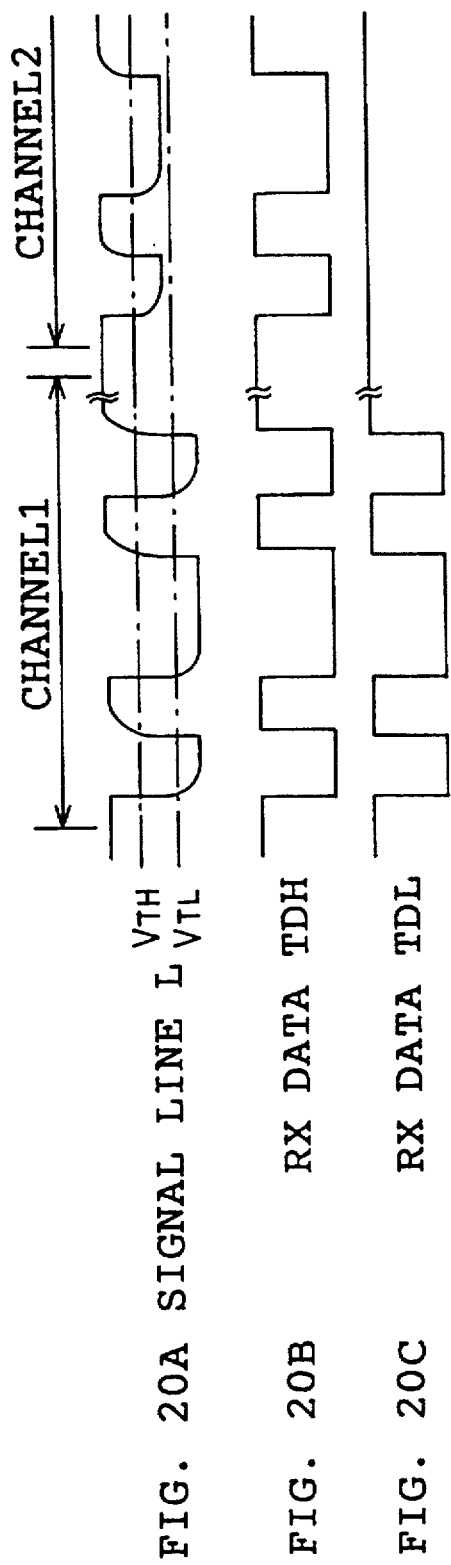
FIGS. 20A–20C are graphs showing the operation of a receiver 26a according to the first embodiment.

FIG. 20 shows a signal waveform of transmission data when the slave Sn equipped with the receiving circuit 8a succeedingly receives the transmission data from a transmission office 1 located in the vicinity of the slave Sn and the transmission data from a transmission office 2 located far therefrom. On the signal line L, the signal waveform from the transmission office 1 has the low level which is nearly the ground level. The signal waveform from the transmission office 2 has a ground potential difference and its low level is higher than the threshold value VTL.

First, when receiving data from the transmission office 1, the voltage comparators 80 and 82 in the receiver 26a normally subject data to binary coding. The pulse width of the respective binary coded data TDH and TDL are slightly different from each other due to distortion of the waveform.

On the other hand, when receiving data from the transmission office 2, because the low level of this signal is higher than VTL, the output TDL of the voltage comparator 82 goes high, and an error is detected by the error check circuit 36 in the second circuit 74. As a result, although the error check signal ERL goes low, that signal is normally received in the first circuit 72.

In this manner, the transmission data is subjected to binary coding by threshold values different from each other simultaneously, and then taken in before it is received in the respective different circuits 72 and 74. The output of the circuit which could receive the data without any error is stored in the reception buffer 38 as reception data. As a result, even in the case where signals different in signal level are transmitted, the transmission data can be received at a threshold level which is always proper, and the receiving circuit 8a withstanding the distortion of a waveform, a ground offset, and so on can be implemented.

In this example, the receiver 26a conducts binary coding operation using two kinds of threshold values. However, a circuit which uses three or more kinds of threshold values and conducts the receiving processes by the same number as that of the threshold values may be used. Also, the receiving circuit 8a need not use quartz as the oscillator 28, and can be implemented using only components such as a ring oscillator which can be formed on an IC even though its frequency stability is relatively low. Therefore, even if the circuits are provided in a multiplex configuration, the unit can be minaturized and manufactured inexpensively.

Subsequently, a description will be given of a vehicle communication system in accordance with a second embodiment of the present invention.

Figure 21:
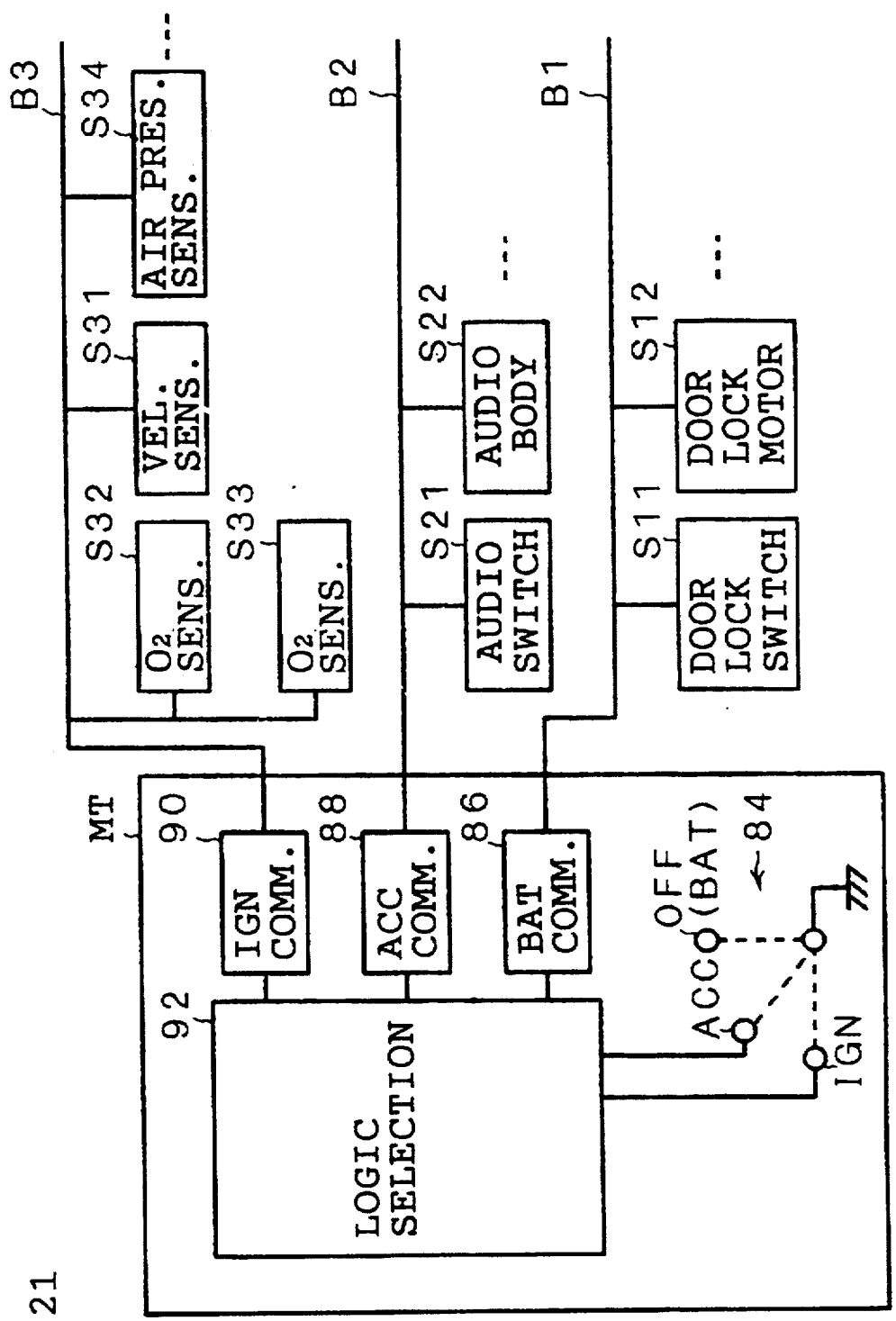
FIG. 21 is a block diagram showing the entire structure of a vehicle communication system in accordance with a second embodiment of the present invention.

In this embodiment, as shown in FIG. 21, three transmission paths B1, B2 and B3 are used, and the system includes a master MT which controls the respective transmission paths B1 to B3, and a plurality of slaves Smn (m=1, 2, 3, n=1, 2 . . . ) connected to the respective transmission paths B1 to B3.

The master MT has three contacts in an off-position (BAT mode), an accessary position (ACC mode), and an ignition position (IGN mode). The master MT includes a key switch 84, a BAT system communication section 86, an ACC system communication section 88, an IGN system communication section 90, and a logical section 92. The key switch 84 changes over a power supply state to the respective sections of the vehicle. The BAT system communication section 86 supplies power to the slave S1n connected to the BAT system transmission path B1, and conducts communication control. The ACC system communication section 88 supplies power to the slave S2n connected to the ACC system transmission path B2, and conducts communication control. The IGN system communication section 90 supplies power to the slave S3n connected to the IGN system transmission path B3, and conducts communication control. The logical section 92 includes a microprocessor having, e.g., a CPU, ROM and RAM, and determines the key position of the key switch 84 to control the respective communication sections 86, 88 and 90.

The logical section 92 starts only the BAT system communication section 86 when the key switch 84 is at the off-position, starts the ACC system communication section 88 in addition to the BAT system communication section 86 when the key switch 84 is at the accessary position, and starts all of the BAT system communication section 86, the ACC system communication section 88 and the IGN system communication section 90 when the key switch 84 is at the ignition position.

The BAT system transmission path B1 is connected with, for example, a door lock switch node S11 which detects the open/closed state of doors, a door lock motor node S12 which drives the door locks and the like. The ACC system transmission path B2 is connected to an audio switch node S21 for controlling audio, an audio body node S22 and so on. The IGN system transmission path B3 is connected with a vehicle velocity sensor node S31, oxygen sensor nodes S32 and S33, an air pressure sensor node S34 and so on.

Figure 22:
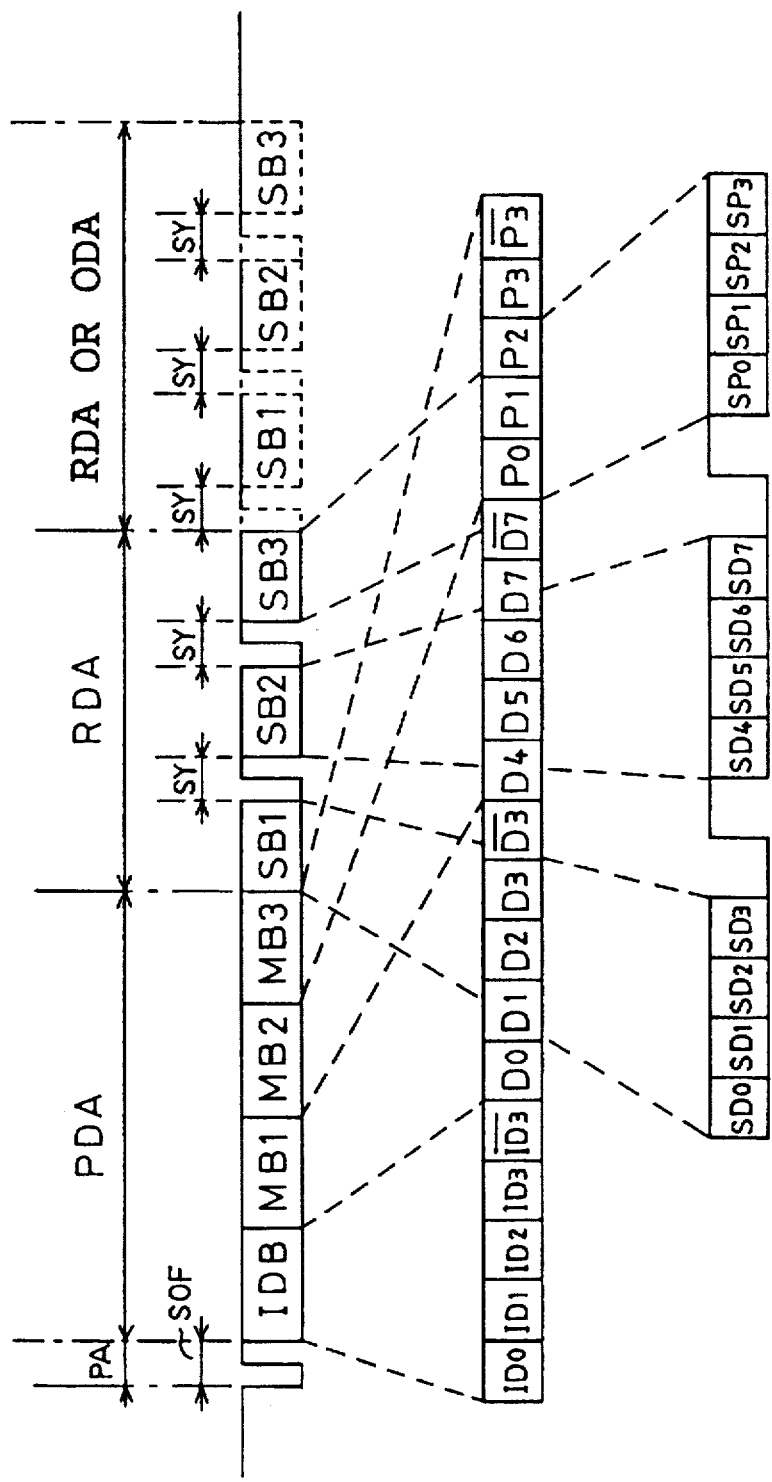
FIG. 22 is an explanatory diagram showing the structure of transmission data in accordance with the second embodiment.

FIG. 22 shows a frame format of transmission data delivered through the transmission paths B1 to B3 between the master MT and the respective slaves Smn.

As shown in FIG. 22, the transmission data consists of a preceding area PA having an SOF code disposed at the head of the frame for detecting the frame and for learning the communication rate, a polling data area PDA for transmitting data from the master MT to the slave Smn, a response data area RDA for transmitting data from the slave Smn to the master MT, and an option data area ODA.

The polling data area PDA consists of an identification data block IDB, data blocks MB1 and MB2, and an error code block MB3. In the identification data block IDB, identification data ID0 to ID3 are set for designating a slave for transmission. In the data blocks MB1 and MB2, transmission data D0 to D7 to be transmitted from the master MT to the slave Smn are set. In the error code block MB3, error check codes P0 to P3 are set for checking the error in the transmission data D0 to D7. The respective blocks are constituted by 5 bits, and an inversion of the fourth bit is inserted in the fifth bit. The data blocks MB1 and MB2 and the error code block MB3 are entirely identical to those in the first embodiment.

The response data area RDA and the option data area ODA consists of data blocks SB1 and SB2, and an error code block SB3. In the data blocks SB1 and SB2, the response data SD0 to SD7 are set, and in the error code block SB3, the error check codes SP0 to SP3 are set for checking the error in the response data SD0 to SD7. The respective blocks are implemented using 4 bits. A synchronous signal SY consisting of a one bit low level and a one bit high level is inserted between the respective blocks SB1, SB2 and SB3. Further, in the case where the response data area RDA or the option data area ODA further follows after the response data area RDA, the synchronous signal SY is also inserted in front of the block SB1 of the area RDA or ODA.

The response data area RDA is used so that the slave Smn designated by the identification data block IDB in the polling data area PDA transmits data to the master MT, and in the case where the same identification data ID0 to ID3 are assigned to a plurality of slaves Smn, a plurality of response data areas RDA are set.

The option data area ODA is set subsequent to the response data area RDA in the case where predetermined identification data ID0 to ID3 are set to the identification data block IDB. The option data area ODA is an area where the transmission data having the identification data ID0 to ID3 for the self slave is not sent out from the master MT, that is, the data transmission of the slave Smn which is not polled is permitted.

In this example, the frame format of transmission data in the respective transmission paths B1 to B3 is identical. However, the format of one or more transmission paths may be different.

Subsequently, the communication procedure enforced by the transmission paths B1 to B3 will be described with an example of the IGN system transmission path B3 with reference to FIG. 23. For simplicity, the IGN system transmission path B3 is previously equipped with only a vehicle velocity sensor S31 (identification data value ID=1), oxygen sensors S32 and S33 (each ID=2), an air pressure sensor S34 (ID=3), and designed so that one option device (no ID) may be attached to the IGN system transmission path B3.

Figure 23:
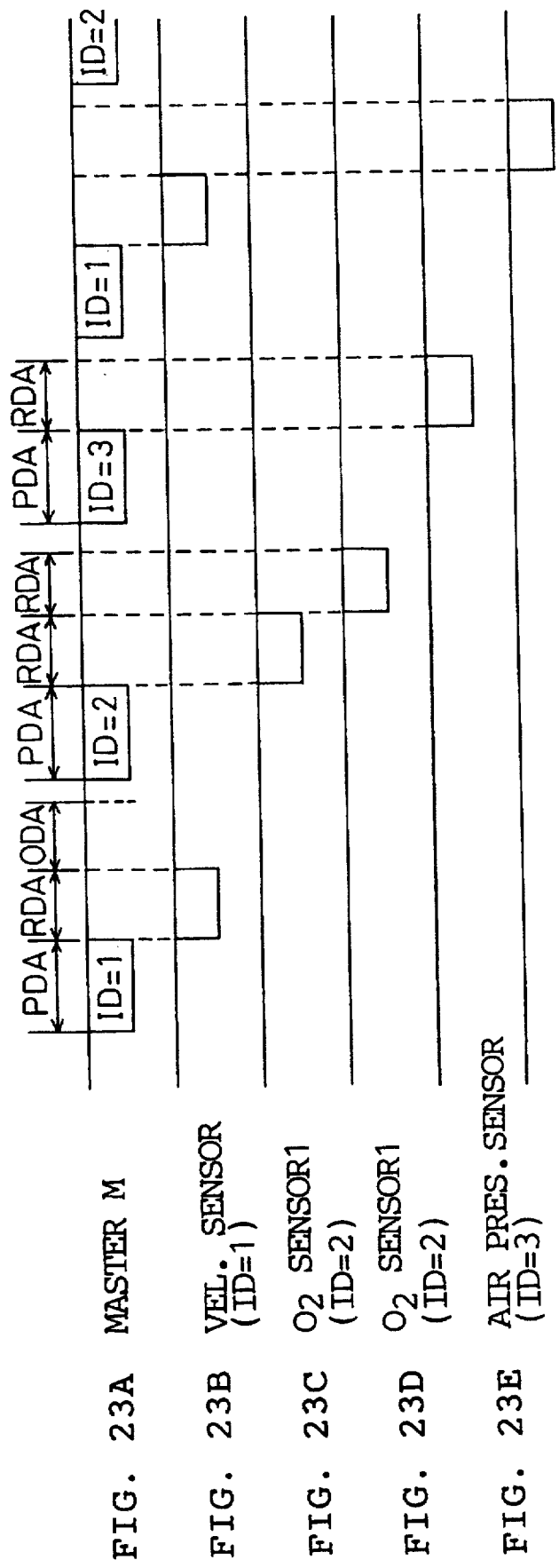
FIGS. 23A–23F are graphs showing a communication procedure in the second embodiment.

As shown in FIG. 23, the master MT sends out the polling data area PDA while sequentially renewing the value of the identification data block IDB in the polling data area PDA. The polling data area PDA of ID=2 is sent out at given intervals so that the response data area RDA and the option data area ODA are secured after the polling data area PDA of ID=1. The next polling data area PDA is sent out at given intervals so that two response data areas RDAs are secured after the polling data area PDA of ID=2, and so that the response data area RDA are secured after the polling data area PDA of ID=3.

Upon receiving the polling data area PDA in which the identification data (ID=1, 2, 3) of the self node is set, the vehicle velocity sensor S31, the oxygen sensor S32 and the air pressure sensor S34 transmit response data by the response data area RDA added immediately after the received polling data area PDA. Since the oxygen sensor S32 uses the response data area RDA immediately after that area, the sensor S32 makes a response using the second response data area RDA. Which response data area RDA is used for the oxygen sensor S32 or D33 is predetermined.

The option data area ODA is used when the option node attached to the transmission path B3 later transmits data to the master MT. In other words, although the option node attached later is not polled to the master MT, it can send out data to the master MT using the option data area ODA. For that reason, the option node can be readily added without changing the system. Also, it is unnecessary to previously prepare a polling data area PDA exclusive to the option node. This prevents the transmission efficiency from being lowered due to the option node which may not be used.

Figure 24:
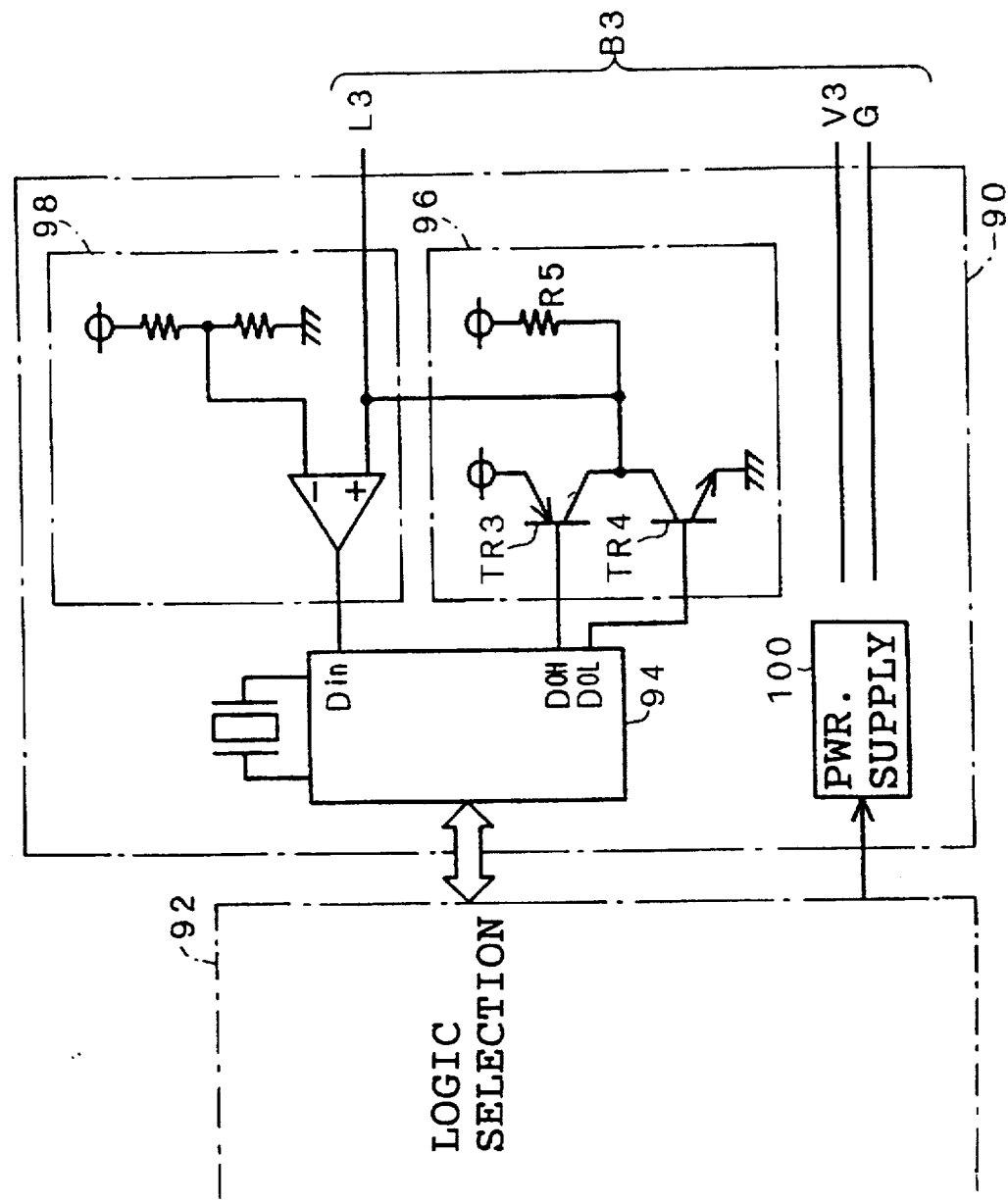
FIG. 24 is a circuit diagram showing the structure of the respective communication section of a master according to the second embodiment.

FIG. 24 is a circuit diagram showing the structure of the respective communication sections 86, 88 and 90 in the master MT. The respective communication sections 86, 88 and 90 are identical to each other with the exception that the transmission paths B1, B2 and B3 connected thereto are different. Therefore, only the IGN system communication section 90 will be described.

As shown in FIG. 24, the IGN system communication section 90 is a microprocessor which includes, e.g., a CPU, ROM and RAM, and includes a communication processor section 94, a driver section 96, a receiver section 98 and a power supply circuit 100. The communication processor section 94 controls the respective sections in accordance with an instruction from the logical section 92. The driver section 96 sends out transmission data produced by the communication processor section 94 to the signal line L3 of the IGN system transmission path B3. The receiver section 98 receives a signal sent out from the slaves S31, S32, . . . through the signal line L3. The power supply circuit 100 is on/off-controlled by the logical section 92, supplies power to the respective sections within the IGN system communication section 90, and supplies power even to the respective slaves S31, S32, . . . connected to the IGN system transmission path B3, through the power supply line V3.

The driver section 96 includes a push-pull circuit consisting of a pnp type transistor TR3 having an emitter connected to the power supply line and an npn type transistor TR4 having an emitter grounded, both of the transistors TR3 and TR4 having collectors connected to each other. The node between the respective collectors of the transistors TR4 and TR5 is connected to the signal line L3 as well as a resistor R5 which pulls up the signal line L3.

The bases of the transistors TR4 and TR5 are connected to the output terminals DOH and DOL of the communication processor section 94, respectively, and are on/off-controlled so as to drive the signal line L3 in a tri-state fashion. In other words, the output of the driver section 96 goes high when both of the output terminals DOH and DOL are low, goes low when they are high, and has a high impedance state when the output terminal DOH is H-level and the output terminal DOL is low.

The structure of the receiver section 98 is identical to the first embodiment, and therefore its description will be omitted.

In the communication processor section 94, the input terminal Din which inputs transmission data through the receiver section 98 is connected to the serial input of a CPU constituting the communication processor section 94. The output terminals DOH and DOL for driving the driver section 96 are assigned to I/O ports which are controlled by the CPU. Thus, the respective terminals Din, DOH and DOL are directly controlled by the CPU. In this embodiment, because the communication rate of transmission data is relatively low (for example, on the order of 5 kbps), the control of input/output of transmission data can be sufficiently executed by the processing of the CPU without using specialized hardware.

Next, the structure of the slave Smn will be described. The slave Smn may have a number of different structures depending on its function. Here, a general purpose node on which the vehicle velocity node S31 and a microprocessor are mounted will be described as one representative example.

The vehicle velocity sensor S31, as shown in FIG. 25A, includes a communication circuit 102, a position sensor 104 such as a light-blocking type hole element, amplifier circuit 106, a binary coding circuit 108, a period measuring circuit 110, and a time measuring circuit 112. The communication circuit 102 delivers transmission data with the IGN system communication section 90 through the signal line L3. The position sensor 104 detects the rotation of a rotor fitted to an axle. The amplifier circuit 106 amplifies the output of the position sensor 104. The binary coding circuit 108 binary-codes the output of the amplifying circuit 106 with a predetermined threshold value to produce a pulse signal. The period measuring circuit 110 measures a period of the pulse signal outputted from the binary coding circuit 108 on the basis of the edge clock ECK outputted by the communication circuit 102 to supply the period measurement value to the communication circuit 102 as higher significant 4 bits SD4 to SD7 of transmission data. The time measuring circuit 112 measures a time when the pulse signal is outputted on the basis of the edge clock ECK, likewise, to supply the time measured to the communication circuit 102 as lower significant 4 bits SD0 to SD3 of transmission data.

The period measuring circuit 110 is provided with a counter which operates in accordance with the edge clock ECK and holds the count value as a period measured value every time a pulse signal is inputted from the binary coding circuit 108. In the case where the edge clock ECK is slower than the vehicle velocity pulse, a circuit for multiplying the edge clock ECK is provided, and the count may be made in accordance with the multiplied clock, or the count value may be held every time the pulse signals are inputted a predetermined number of times. Conversely, a counter which operates in accordance with a pulse signal is provided, and the count value may be held every time the edge clocks are inputted a predetermined number of times.

Then, the communication circuit 102 sets the period measuring value thus measured and the measured time as transmission data SD0 to SD7, and transmits the data to the master MT, using the response data area RDA in accordance with the polling.

The general purpose node, as shown in FIG. 25B, includes a communication circuit 102 which is the same as the one in the vehicle velocity sensor node S31, a microprocessor 114 and a multiplying circuit 116. The microprocessor 114 inputs or outputs reception data RD0 to RD7 as well as transmission data SD0 to SD7 with respect to the communication circuit 102 to execute a variety of processing operations. The multiplying circuit 116 produces the operation clock CLK of the microprocessor 114 on the basis of the edge clock ECK outputted by the communication circuit 102.

The multiplying circuit 116 consists of an analog PPL circuit and produces the operation clock CLK having a period which is a predetermined multiple and which is synchronous with the edge clock ECK. The general purpose microprocessor 114 is equipped with input/output ports to which drive circuits for a variety of sensors or an actuator can be connected. In other words, the oxygen sensor nodes S32 and S33 or the air pressure sensor node S34 can be easily implemented by only fitting the oxygen sensor or the air pressure sensor to the general purpose node.

The vehicle velocity sensor node S31 and the general purpose node are integrated into one chip, and the external attachment of a quartz crystal or the like as a clock source is unnecessary. Therefore, the slave Smn can be implemented at a remarkably low cost and with a small size.

Figure 26:
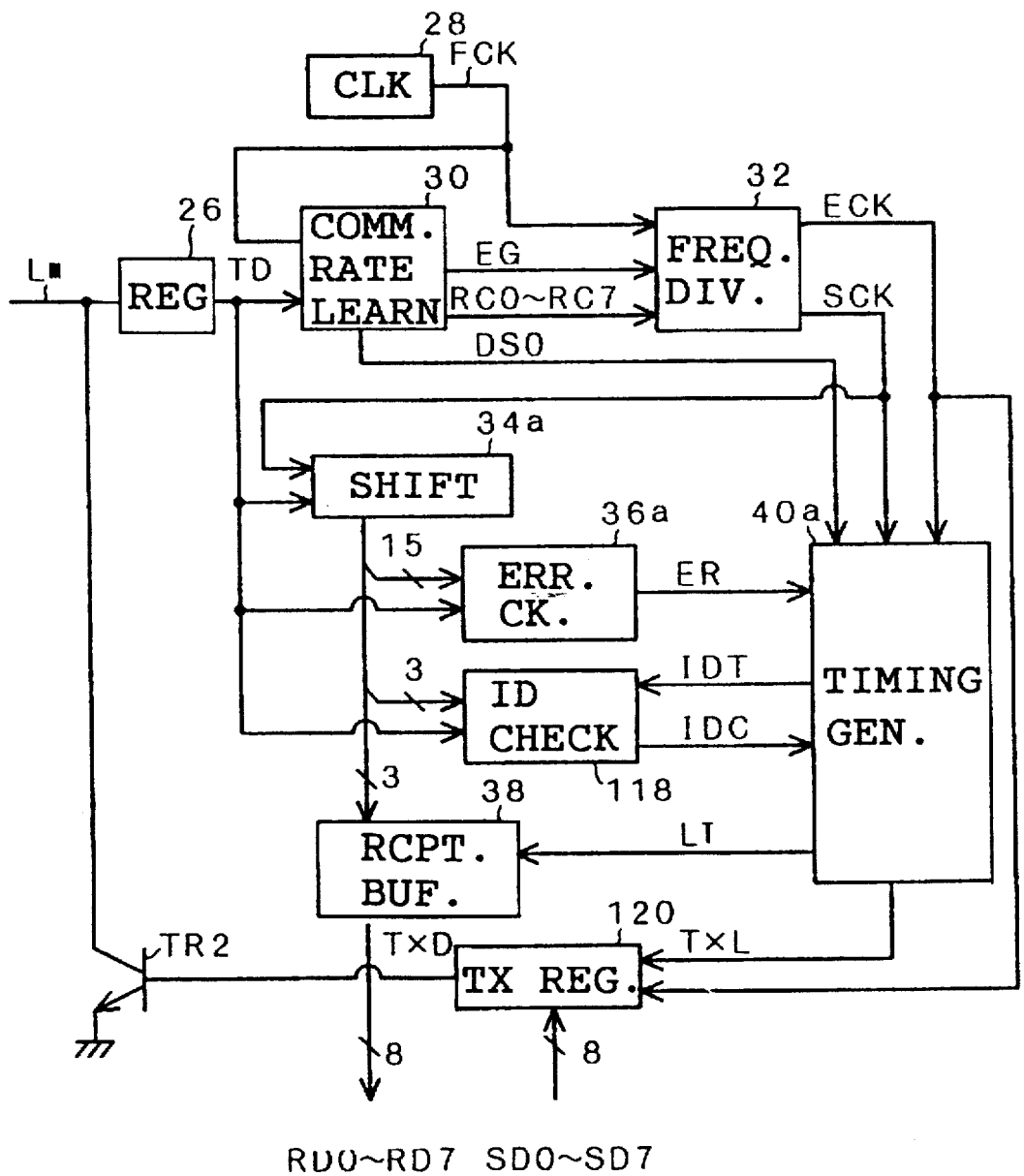
FIG. 26 is a block diagram showing the details of a communication circuit of the slave according to the second embodiment.

FIG. 26 is a block diagram showing the structure of the communication circuit 102 commonly provided for the respective slaves Smn. As shown in FIG. 26, the communication circuit 102 is identical to the receiving circuit 8 except for the addition of an ID check circuit 118 and a transmission register 120 to the receiving circuit 8 of the first embodiment (refer to FIG. 1). The ID check circuit 118 checks a value of an identification data block IDB in the received transmission data to detect whether that value coincides with identification data assigned to the self node in advance, or not. The transmission register 120 sends out the transmission data SD0 to SD7 supplied from the external to the signal line L through the transistor TR2 at a predetermined timing. Also, there is added a structure for expanding the shift register 34a and the error check circuit 36a in accordance with the frame format of transmission data and for driving the ID check circuit 118 as well as the transmission register 120 in the timing generating circuit 40a. Therefore, in this example, only the structure of the newly added ID check circuit 118 and transmission register 120 as well as a variety of timing signals generated by the timing generating circuit 40a will be described.

Figure 27:
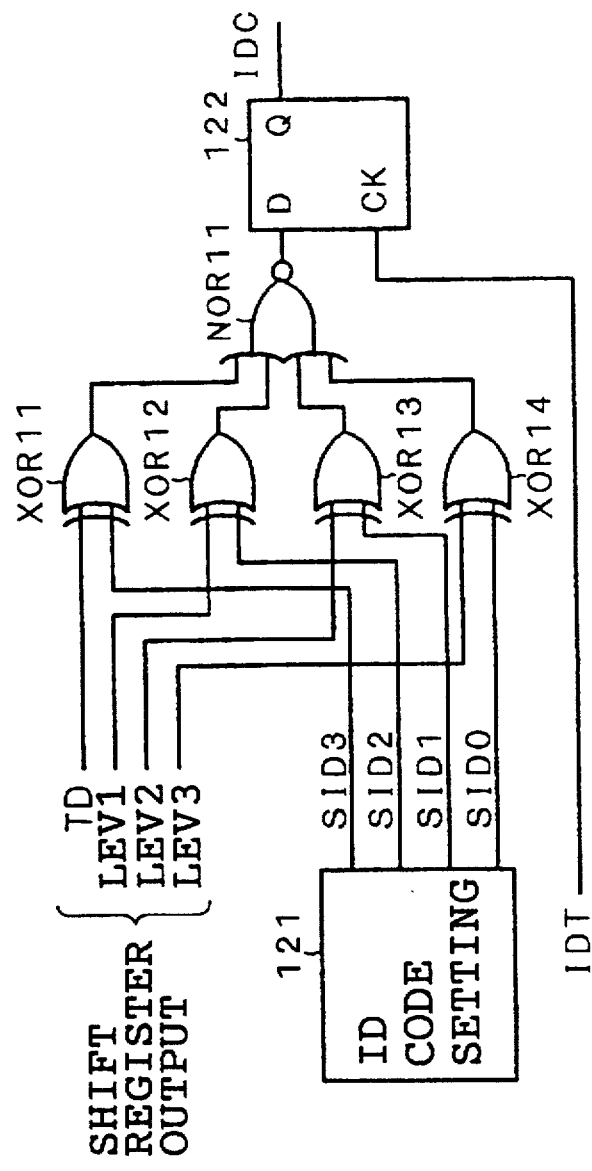
FIG. 27 is a circuit diagram showing the details of an ID check circuit according to the second embodiment.

First, the ID check circuit 118, as shown in FIG. 27, includes an ID setter 121, exclusive OR circuits XOR11 to XOR14, a NOR circuit NOR11, and a D-type flip flop circuit 122. The ID setter 121 sets the identification data SID0 to SID3 of the self node of 4 bits which are assigned to the self node. The exclusive OR circuits XOR11 to XOR14 compare the respective bits of the identification data SID0 to SID3 of the self node of the ID setter 121 with the output TD of the receiver 26 as well as the output of the first to third stages of the shift register 34a, respectively, and output a high-level signal if the former does not coincide with the latter. The NOR circuit NOR11 outputs a low-level signal when at least one of the outputs of the respective exclusive OR circuits XOR11 to XOR14 is high. The D-type flip flop circuit 122 latches the output of the NOR circuit NOR11 at the rising of the ID check timing signal IDT outputted from the timing generating circuit 40a at a predetermined timing to output the latched output to the timing generating circuit 40a as the ID check signal IDC. The ID setter 121 is implemented using, for example, a DIP switch or the like.

In other words, the ID check circuit 118 outputs a high level signal as the ID check signal IDC when a value of the received transmission data as well as a value of transmission data already set to the first to third stages of the shift register 34a coincide with the self node identification data SID0 to SID3 set to the ID setter 121.

Figure 28:
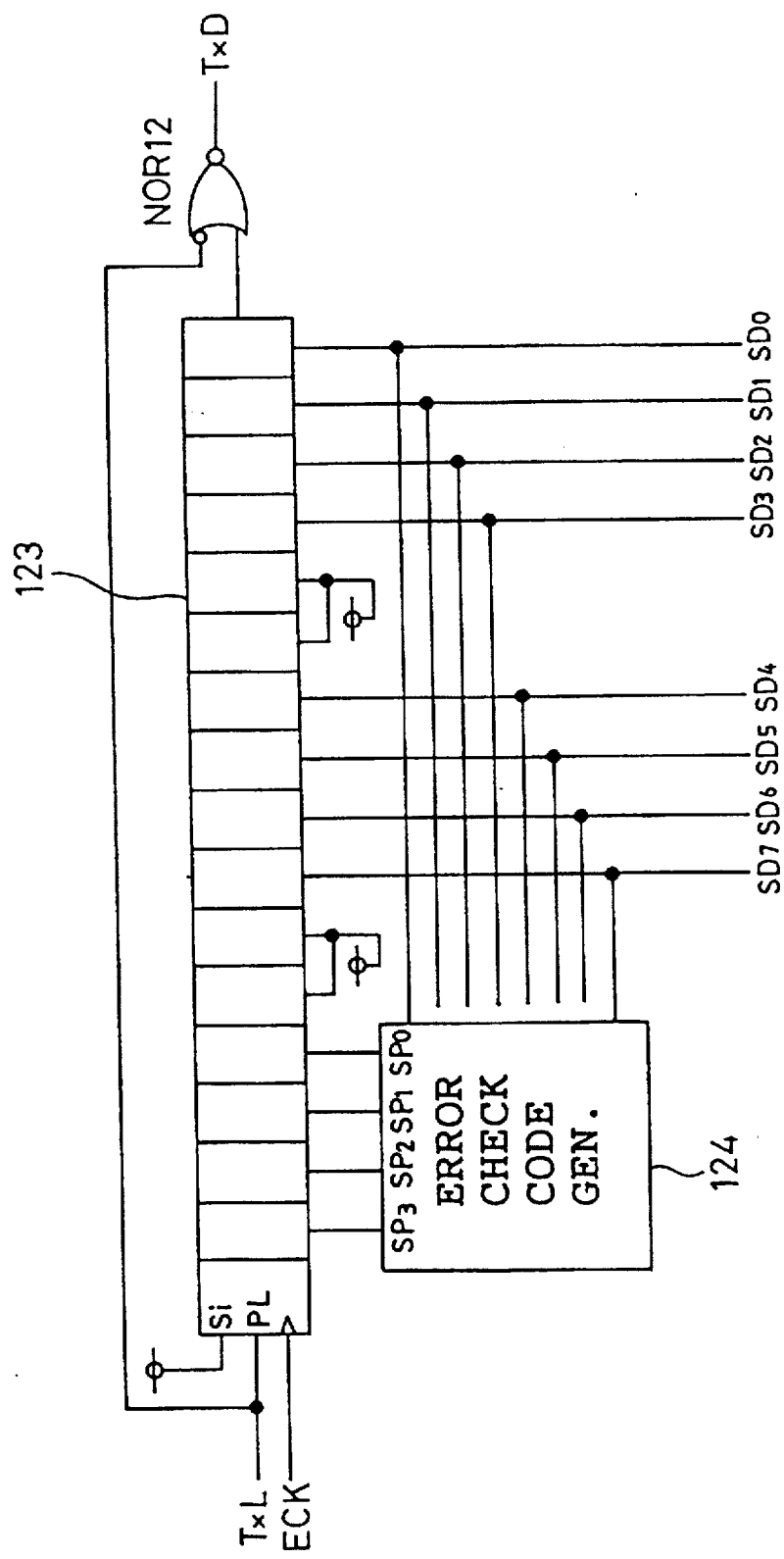
FIG. 28 is a circuit diagram showing the details of a transmission register in the second embodiment.

The transmission register 120, as shown in FIG. 28, include a shift register 123, an error check code generating circuit 124 and a NOR circuit NOR21. The shift register 123 has the same stages as the number of bits (16 bits in this example) contained in the response data area RDA of transmission data, and loads the transmission data SD0 to SD7 set to the parallel input, and so on in accordance with a load signal TxL outputted from the timing generating circuit 40a to shift the loaded data in accordance with the edge clock ECK outputted by the frequency dividing circuit 32. The error check code generating circuit 124 generates the error check codes SP0 to SP3 in accordance with the transmission data SD0 to SD7. The NOR circuit NOR21 output a high-level signal when the load signal TxL is low, and a signal of the inverted level of the output of the shift register 123 when the load signal TxL is high. The output of the NOR circuit NOR12 is inputted as a drive signal TxD to the transistor TR2 forming a driver.

To the parallel input of the shift register 123, four bits of the head are connected to the transmission data SD0 to SD3 inputted from the exterior in order; the subsequent 2 bits are connected to a power supply line; the subsequent 4 bits are connected to the transmission data SD4 to DS7; the subsequent 2 bits are connected to the power supply line; and the subsequent 4 bits are connected to the error check codes P0 to P3 which are outputted from the error check code generating circuit 124. The serial input Si of the shift register 123 is connected to the power supply line, and a signal of H-level is sequentially added to the last during the shift operation.

In the parallel input of the shift register 123, bits connected to the power supply line at the fifth and sixth bits as well as the eleventh and twelfth bits from the head are designed to not to destroy the synchronous signal SY sent out by the master.

The structure of the error check code generating circuit 124 is identical to that of the error check code generating circuit 22 in the transmitting circuit 6 of the first embodiment, and therefore its description will be omitted.

The timing generating circuit 40a can be realized by a simple sequential circuit, as in the first embodiment, and therefore its concrete circuit structure will be omitted. However, the operation of the timing generating circuit 40a will be described together with the operation of the ID check circuit 118 and transmission register 120 with reference to the timing chart shown in FIG. 29.

Figure 29:
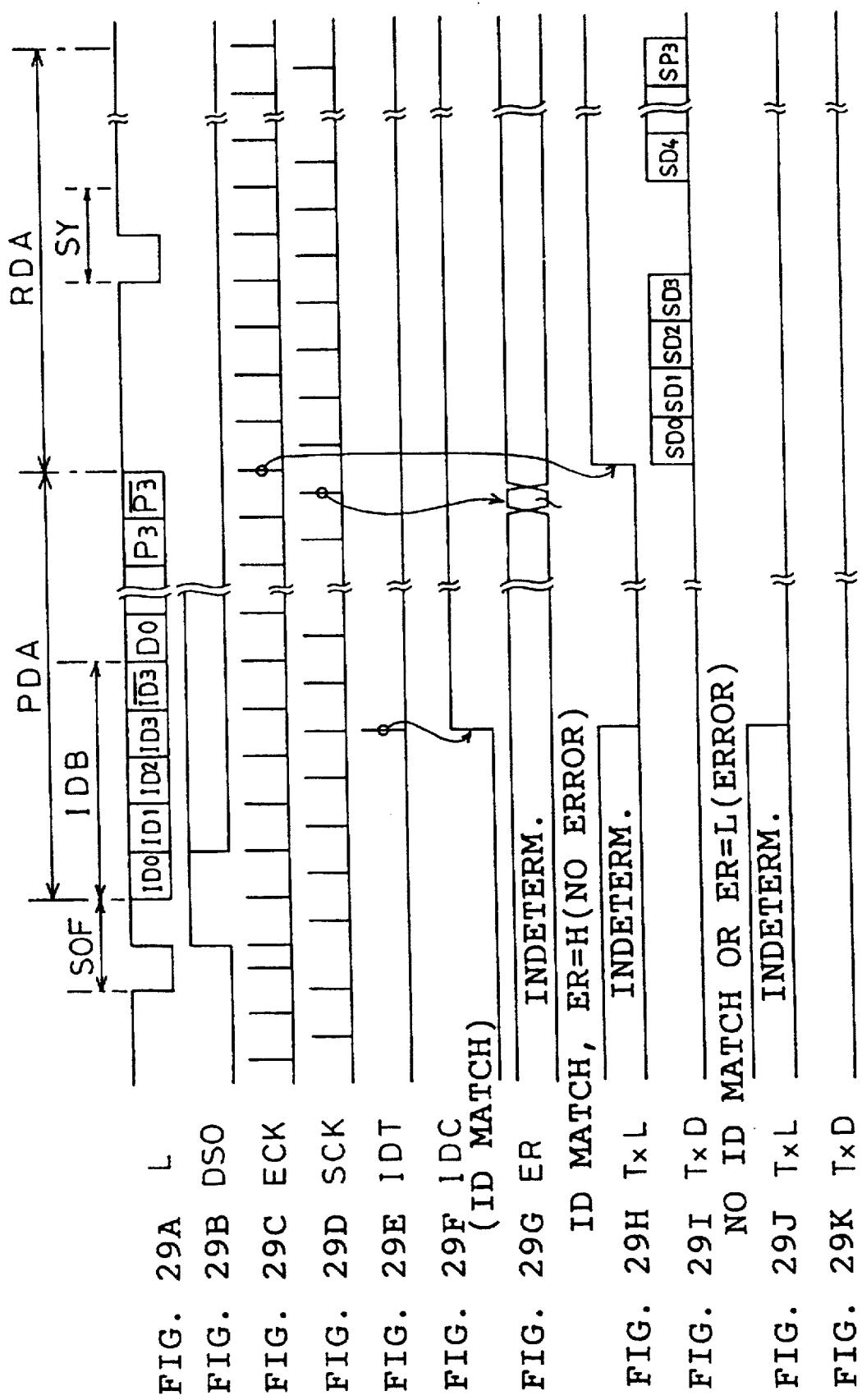
FIGS. 29A–29K are graphs showing the operation of a timing generating circuit in the second embodiment.

As shown in FIG. 29, first, upon the input of the rising of the SOF detection signal DSO, the timing generating circuit 40a counts the sample clock SCK, and outputs the sample clock SCK of the fifth pulse as is as the ID check timing signal IDT at the time of receiving the fourth bit (ID3) in the identification data block IDB, and simultaneously sets the low signal TxL to the low-level.

In this situation, the ID check circuit 118 compares the value ID0 to ID3 set to the identification data block IDB of transmission data with the identification data block SID0 to SID3 of the self slave. If the former coincides with the latter, the ID check signal IDS goes high.

Subsequently, the timing generating circuit 40a counts the sample clock SCK and confirms the error check signal ER outputted from the error check circuit 36a at the time of receiving the 21st pulse from the rising of the SOF detection signal DSO, that is, the final bit (inverse bit of P3) of the data area PDA. If there is no error in the received data and the error check signal ER is high, the timing generating circuit 40a outputs the sample clock SCK of the 21st pulse as is, to the reception buffer 38 as a latch signal LT (not shown), and sets the load signal TxL to a high level at the timing of the just succeeding edge clock ECK.

As a result, in the transmission register 120, the transmission data SD0 to SD7 and the error check codes P0 to P3 are set in the shift register 123. Simultaneously, the drive signal TxD starts to be outputted to the transistor TR2, and thereafter the drive signal TxD is sequentially outputted to the transistor TR2 in accordance with the edge clock ECK.

On the other hand, when there is an error in the received transmission data, and the error check signal ER is low when the error check signal is confirmed at the 21st pulse of the sample clock SCK from the rising of the SOF detection signal DSO, the timing generating circuit 40a holds the low level of the latch signal LT and load signal TxL as it is. For that reason, the received transmission data is scrapped without being taken in the reception buffer 38, and the drive signal TxD is not outputted from the transmission register 120.

In the case where a plurality of response data areas RDAs are set and response data is transmitted through the second response data area RDA, when response data is transmitted through the option data area ODA, the load signal TxL may be set to a high level at a timing of the edge clock ECK of the 17th pulse after the 21st pulse of the sample clock SCK from the rising of the SOF detection signal DSO.

As described above, in the vehicle communication system in accordance with the second embodiment, a plurality of transmission paths B1 to B3 are provided, and all the slaves Smn on the same transmission path Bm are simultaneously subjected to power supply or power interruption in accordance with the key position of the key switch 84.

Hence, according to the present invention, without the situation in which power is supplied to only a part of slaves Smn on the same transmission path Bm, the structure of a driver can be simplified.

In other words, in the case where slaves Smi which are energized and slaves Smi which are not energized mixedly exist on the same transmission path Bm, in order to prevent the impedance of the transmission path Bm from being lowered due to a pull-up resistor in a driver of the slave Smj which is not energized to adversely affect a signal on the transmission path Bm, a protective circuit is required which sets the output impedance of the slave Smj which is not energized to a high impedance. More specifically, for example, if a transistor with an open collector connection is used and a pull-up resistor is connected, a diode must be connected in series to the pull-up resistor to prevent current from flowing in the power supply line through the pull-up resistor. However, according to the present invention, because all the slaves on the same transmission path are simultaneously subject to power supply or power interruption, there is no state in which only part of the slaves on the same transmission path are energized. Therefore, such a protective circuit can be omitted.

Also, since a plurality of transmission paths B1 to B3 are provided, the number of slaves Smn connected to one transmission path Bm is reduced, thereby improving the transmission efficiency. As a result, since the communication rate can be made relatively low, the circuit structure and communication protocol can be simplified, and the noise resistance characteristics and so on can be improved.

In this embodiment, communication due to polling is conducted, and the same identification data ID0 to ID3 are assigned to the slaves (the oxygen sensor nodes S32 and S33 in this example) which collect data of the same type. The master MT is receives the response data at one polling operation.

Therefore, it is unnecessary to send out the polling data area PDA to every slave Smn, thereby improving the communication efficiency. Since the number of oxygen sensors is different depending on the type of vehicle or the regulations regarding exhaust gas in a country to which the automobile will be exported, the number of nodes of the oxygen sensor nodes S32 and S33 is also different. However, the number of oxygen sensors can be readily increased or decreased without redesigning the communication system if the response data areas RDA of the number corresponding to the maximum required number of oxygen sensor nodes are previously prepared subsequent to the polling data area PDA which designates the oxygen sensor nodes S32 and S33. This technique is not limited to the oxygen sensor, and the components the number of which is increased or decreased for use can be dealt with as in the above manner.

Further, in this embodiment, an option data area ODA is located, except for the response data area RDA, after the polling data area PDA to which predetermined identification data ID0 to ID3 are given. The option node fitted to the transmission path Bn later communicates with the master MT by using the option data area ODA.

Therefore, the addition of an option node to the transmission path Bn can be also dealt with without changing the communication system.

In the vehicle velocity sensor node S31 in accordance with this embodiment, a pulse signal is produced in accordance with the rotation of a rotor by using the position sensor 104, and period information obtained by measuring a period of the pulse signal and time information representative of a time at which the period of the pulse signal has been measured are sent out to the master as response data.

Therefore, in the master MT, the vehicle velocity, acceleration and so on can be reliably calculated on the basis of the period information and the time information, thereby being capable of stabilizing the vehicle control.

In other words, as in this embodiment, the system in which data is collected by polling does not send out data as soon as data is measured, but makes a irregular delay until measured data is transmitted. For that reason, acceleration obtained in accordance with a change of the period information with time cannot be calculated by only using the period information with accuracy. However, with the addition of time information representative of a time of measurement, even if data is transmitted irregularly, or even though transmission data is lost, the vehicle velocity or acceleration is not erroneously calculated, and stabilized vehicle control can be realized.

Also, in the case of data having an effective date such as the detected value of an oxygen sensor, for example, data which is too old is insignificant, and it can be judged at the reception side whether it is effective to conduct control using the received data, or not, by adding such time information. Thus, control suitable to the current state can be realized.

Furthermore, in the vehicle velocity sensor node S31, since the position sensor 104, that is, a semiconductor sensor is used, it can be integrated with the communication circuit and the like on one chip, so that the unit can be downsized and manufactured at low cost. Also, in the slaves Smn, since the communication circuit 102 generates a clock, even though the slaves Smn on which a microprocessor is included as in the general purpose node are used, no external attachment of a quartz or the like is required, and the slaves can be implemented on one chip.

Further, in this embodiment, the driver section 96 of the master MT includes a push-pull circuit which enables the tri-state output, whereas the driver of the slave Smn includes the transistor TR2 which is connected to the transmission path in the open collector manner.

Figure 30:
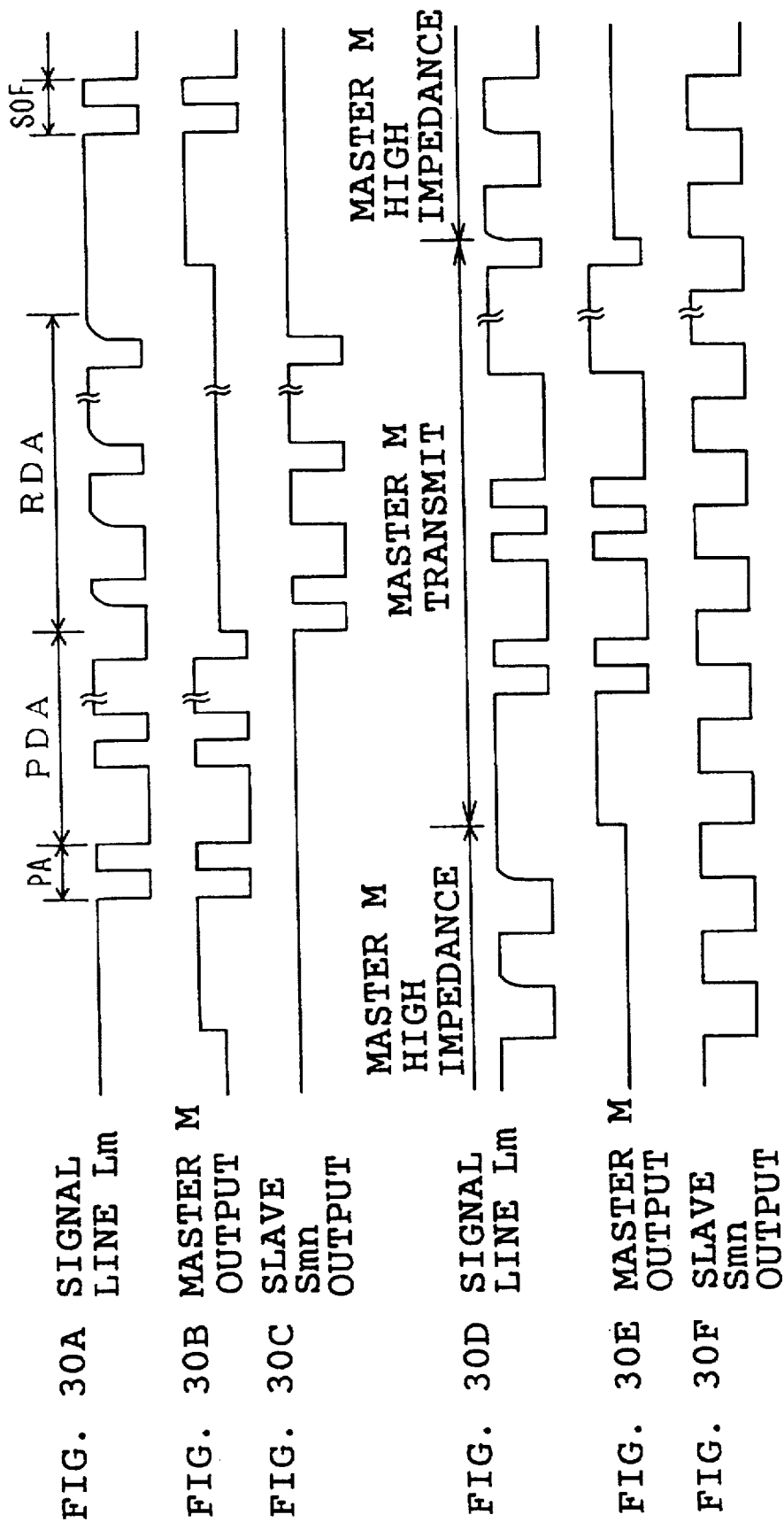
FIGS. 30A–30F is an explanatory diagram showing the operation of a driver in the second embodiment.

Therefore, as in FIG. 30A, a signal sent out from the master MT is of a waveform which is symmetrical in its rising and falling characteristics and has reduced distortion relative to the signal line Ln, thereby conducting communication with high reliability.

In other words, in the case of connecting a transistor to the transmission path Bm in the open collector manner as in the driver of the slave Smn, the waveform of a signal has a predetermined time constant at its rising because of an influence of the capacitance of the signal line Lm and the pull-up resistor, thereby resulting in a distorted waveform. The waveform of transmission data sent out from the master M is required to prevent the distortion of a waveform because a reception clock need be produced by the slave Smn on the basis of the pulse width of that transmission data. On the other hand, since the waveform of a signal sent out from the slave Smn may be read by the master MT, there arises no problem even if the waveform is distorted somewhat. Hence, an expensive push-pull circuit is used for only the master MT but the slave Smn is of the open-collector transistor type, with the result that the system can be implemented inexpensively while communication with high reliability is maintained.

Figure 31:
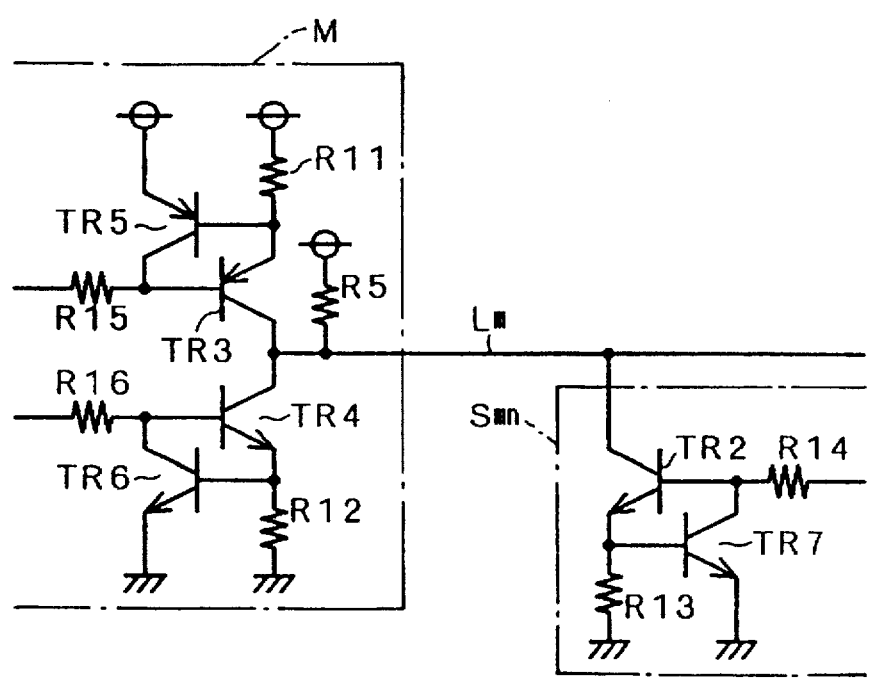
FIG. 31 is a circuit diagram showing a driver to which a current limiter circuit is added according to the second embodiment.

Further, as shown in FIG. 31, a current limiter circuit may be added to both the driver circuits for the master MT and the slave Smn. In other words, in the driver consisting of the transistor TR4 for the master MT, as additional components, a resistor R11 is inserted between the emitter of the transistor TR3 and the power supply line, and a resistor R12 is inserted between the emitter of the transistor TR4 and the ground. Moreover, a transistor TR5 and a transistor TR6 are added in such a manner that the transistor TR5 has a base connected to the emitter of the transistor TR3, a collector connected to the base of the transistor TR3, and an emitter connected to the power supply line, and the transistor TR6 has a base connected to the emitter of the transistor TR4, a collector connected to the base of the transistor TR4, and an emitter connected to the ground.

On the other hand, in the driver consisting of the transistor TR2 for the slave, a resistor R13 is inserted between the transistor TR2 and the ground, and a transistor TR5 having a base connected to the emitter of the transistor TR2, a collector connected to the base of the transistor TR2, and an emitter connected to the ground is added in the driver.

The resistors R14, R15 and R16 connected to the bases of the transistors TR2, TR3 and TR4, respectively, supply a base current.

According to the driver of that master MT, as the output current of the transistor TR3 is increased, a potential difference between the base and emitter of the transistor TR5 is made larger due to the resistor R11. If that potential difference becomes a predetermined value or more, the transistor TR5 turns on. Then, because the base potential of the transistor TR3 approaches the power supply level, the transistor TR3 acts in a direction in which an output current is reduced with the result that the output current of the transistor TR3 is limited to a predetermined value or less. Likewise, the transistor TR4 and the transistor TR2 of the slave Smn operate in a similar fashion.

In the case where the allowable output current of the driver for the master MT is set to be larger than that of the driver for the slave Smn (for example, the master side is 40 mA and the slave side is 20 mA), even if the slave Smn outputs a low level signal while the master MT outputs a high level signal, the driver of the master MT allows a current to flow 20 mA larger than the driver of the slave Smn. Accordingly, the signal level of the signal line Lm becomes the output level of the master MT.

As a result, as shown in FIG. 30B, when the output of the driver for the master MT is in a high impedance state, the output of the driver for the slave Smn appears in the signal line as it is. When a signal is sent out from the driver for the master MT, the output of the master MT appears in the signal line Lm regardless of the output of the slave Smn.

Therefore, even if the slave Smn is in a failure state so that response data cannot be received from the slave Smn, the transmission data from the master MT is received by the respective slaves Smn. For that reason, the master MT, when detecting such an abnormality, can notify the respective slaves Smn of the occurrence of the abnormality to safely cope with such an abnormality.

Figure 32A:
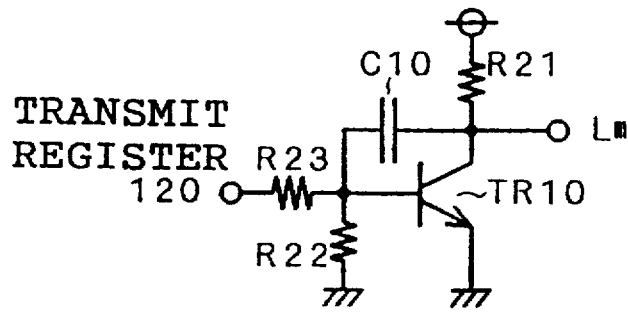
FIGS. 32A–32C are circuit diagrams showing drivers which are capable of reducing a radiation noise in this embodiment.
Figure 32B:
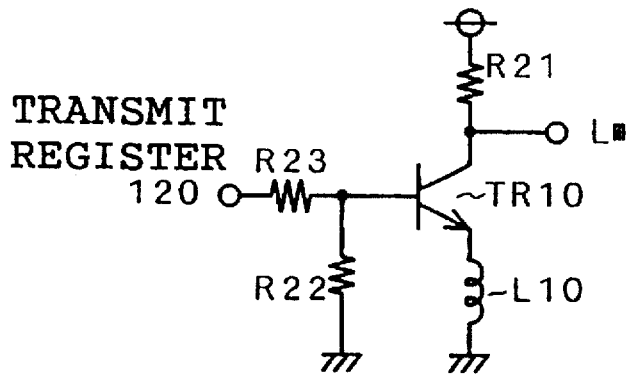
Figure 32C:
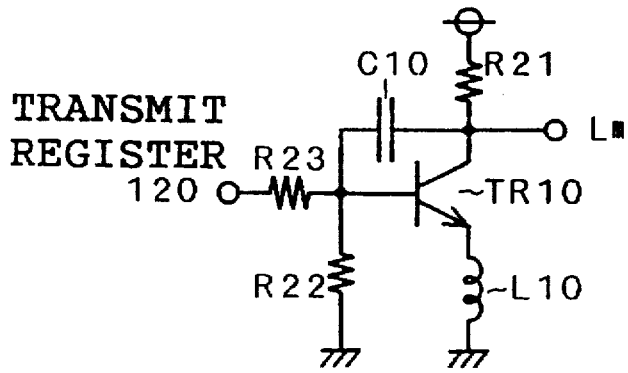

Moreover, in general, there is a case where the radiation noise from the signal line Lm interferes with a car radio or the like, which is a problem. For the purpose of preventing this problem, the driver for the slave Smn may be implemented as shown in FIGS. 32A to 32C. FIG. 32A shows a driver including a transistor TR10 having an emitter grounded and a collector connected to the transmission path, and a capacitor C10 is connected between the collector and base of the transistor TR10. A resistor R21, which is inserted between the emitter of the transistor TR10 and the power supply line, is designed to pull up the signal line L. A resistor R22, which is inserted between the base of the transistor TR10 and the ground, is designed to prevent the leakage current of the transistor TR10. A resistor R23, which is inserted between the base of the transistor TR10 and the signal input terminal, is designed to supply a base current.

According to that driver, because the capacitor C10 allows the change of output voltage to be negatively fed back to the base of the transistor TR1, the rising and falling edges of the waveform of an output voltage are made less steep, thereby remarkably reducing the radiation noise.

Also, in the case where the signal line Lm has a relatively large capacitance, a change of current is not proportional to a change of voltage because of the influence of that capacitance. Therefore, when the change of voltage is fed back as in the driver shown in FIG. 32A, the radiation noise cannot be reduced so much. In this situation, as shown in FIG. 32B, an inductor L10 having a predetermined inductance may be inserted between the emitter of the transistor TR10 and the ground instead of the capacitor C10. In this driver, since the change in output current is negatively fed back, the rising and falling edges of the waveform of the output current can be made gentle, and even if the signal line Lm having a relatively large capacitance is used, the radiation noise can be reliably reduced.

Furthermore, as shown in FIG. 32C, both of the capacitor C10 for negatively feeding back the change of the output voltage and the inductance L10 for negatively feeding back the change of the output current may be connected together, thereby more reliably reducing the radiation noise.

Figure 33A:
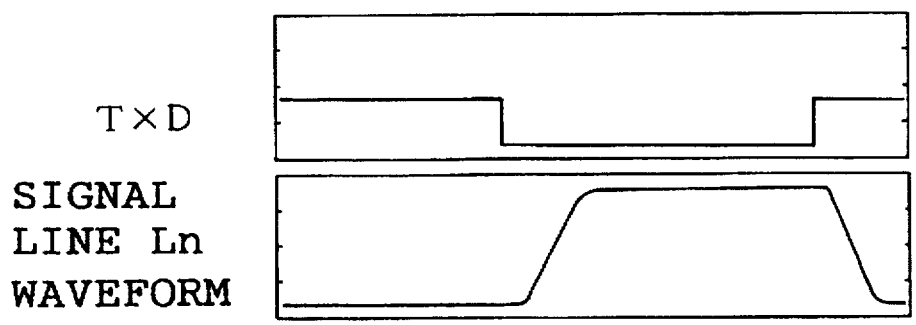
FIGS. 33A–33C are diagrams showing output waveforms of the drivers shown in FIGS. 32A–32C.
Figure 33B:
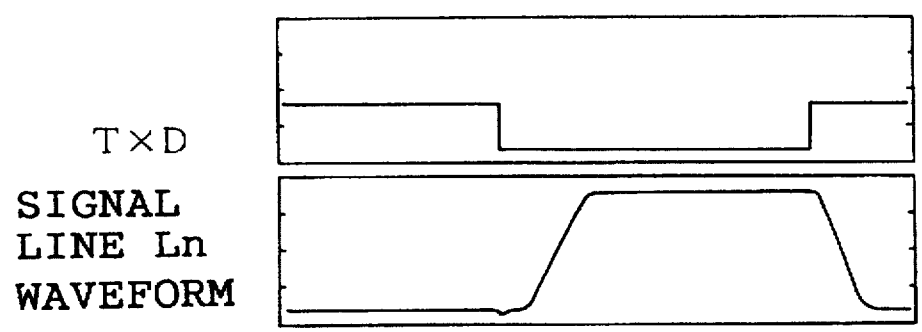
Figure 33C:
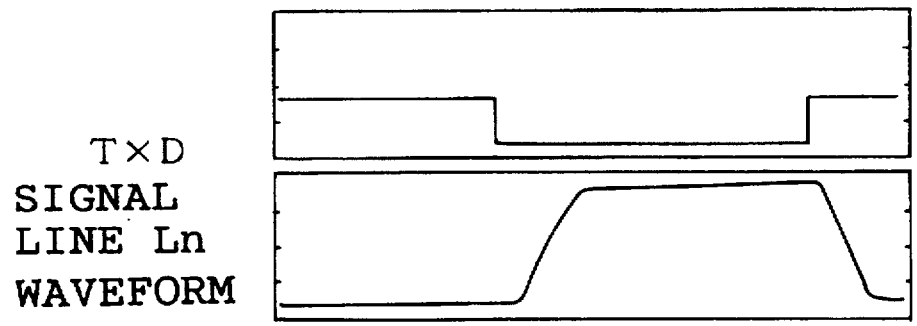

FIGS. 33A to 33C show the actually measured values of the output waveform of the circuits shown in FIGS. 32A to 32C. As shown in FIGS. 33A to 33C, in any circuit, it is found that the rising and falling edges of the output waveform become less steep. Also, these circuits may be applied to the transistor TR2 for transmitting the ACK bit and the NCK bit in the receiving circuit 8 of the slave S in accordance with the first embodiment.

Further, in the foregoing embodiment, transmission data conducts the error check of data D0 to D7 in accordance with the error check codes P0 to P3. However, the error check codes P0 to P3 which detect the entire errors of data D0 to D7 may be omitted, and a format in which a plurality of bits are assigned to the important bit data to always include a negative logic may be used.

Figure 34:
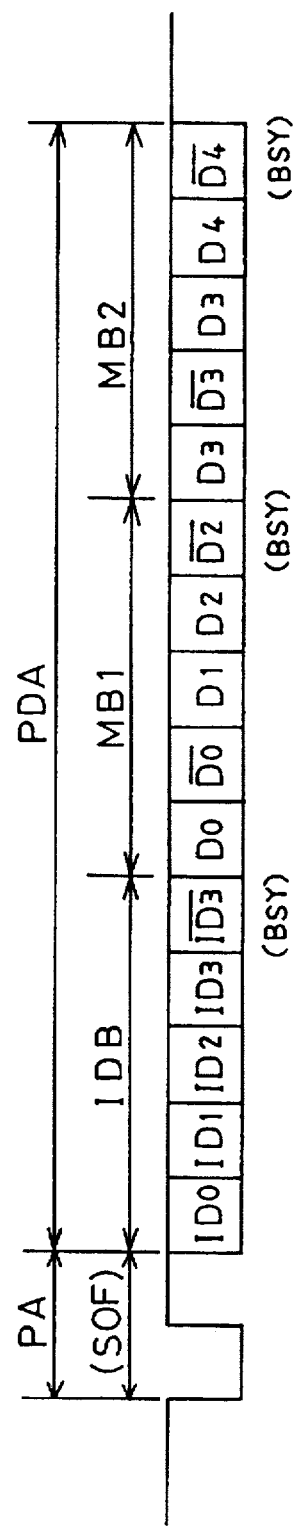
FIG. 34 is a diagram showing a frame format of transmission data including a redundant bit in this embodiment.

FIG. 34 is an example showing a format of transmission data. In this Figure, the polling data area PDA has an identification data block IDB and data blocks MB1 and MB2. The data block MB1 consists of data D0 to which the redundant bit of a negative logic is added so as to be expanded to two bits, and data D1 and D2 each have one bit. The data block MB2 consists of data D3 to which the redundant bits having one bit of a negative logic and one bit of a positive logic, respectively, are added to be expanded to 3 bits, and data D4 of one bit. Thus, data D0 to D4 of 5 bits in total are transmitted. The identification data ID3 and the inverse bits of the data D2 and D3 are of synchronous bits BSY which are inserted to prevent the same level having a predetermined length or longer to occur.

Figure 35:
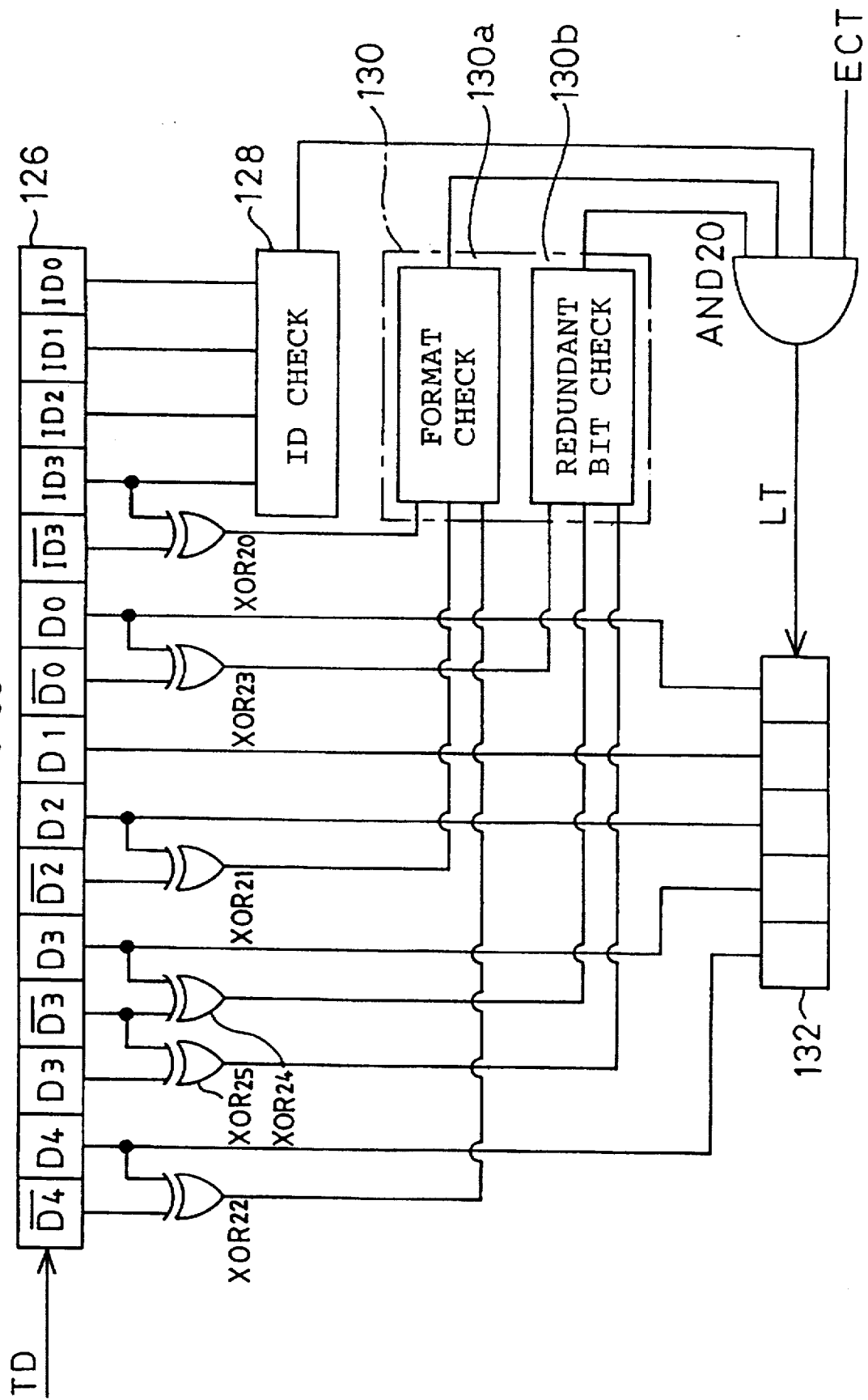
FIG. 35 is a circuit diagram showing the structure of a portion to be substituted in the case where transmission data including a redundant bit is received in the communication circuit.
Figure 36A:
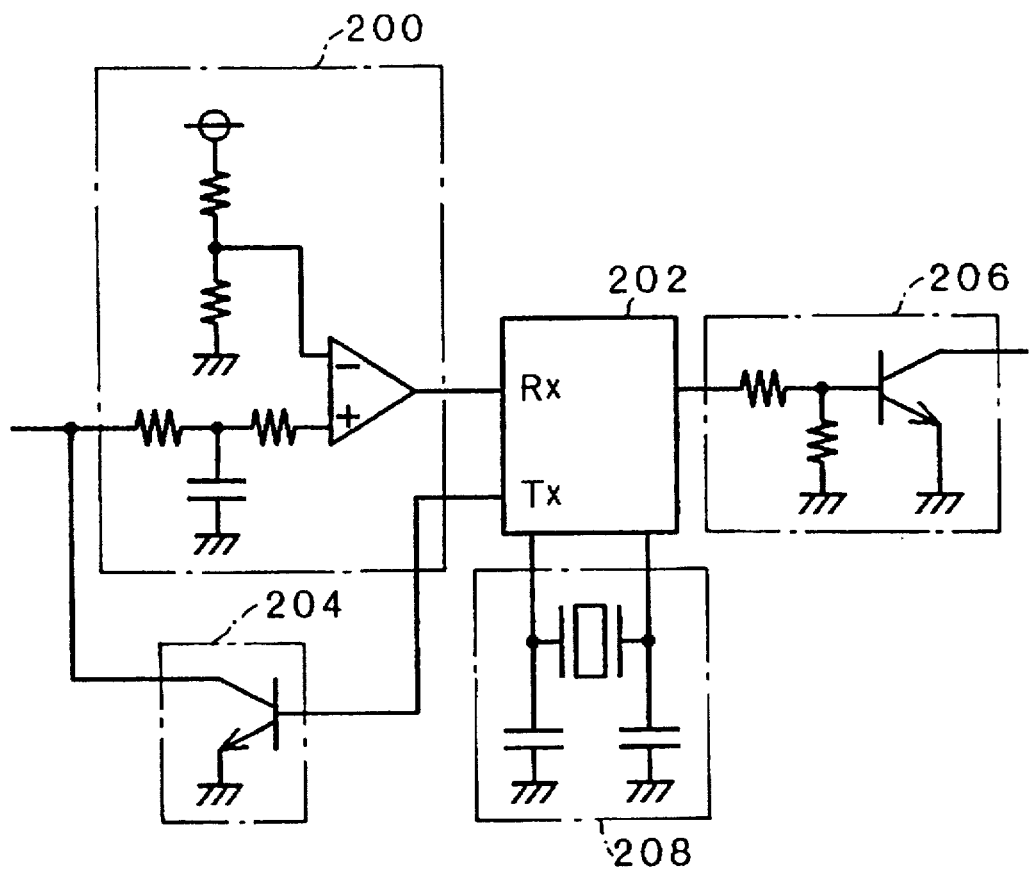
FIG. 36 is a circuit diagram showing the structure of a conventional data receiving circuit.
Figure 36B:
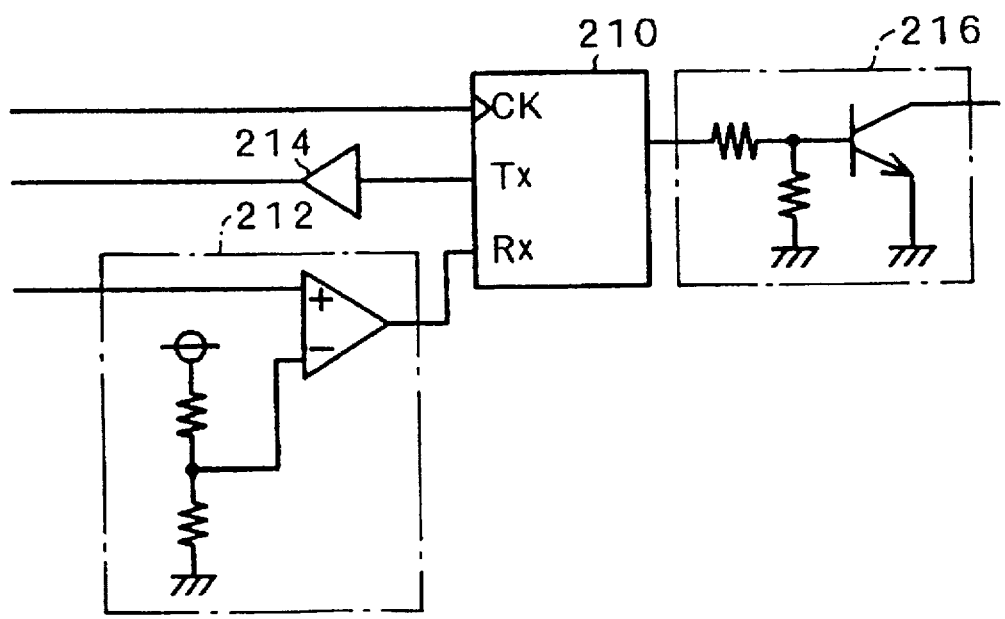

When the slave Smn receives such transmission data, a part of the communication circuit 102 (the shift register 34a, the ID check circuit 118, the error check circuit 36a and the reception buffer 38) is replaced by a circuit shown in FIG. 35. As shown in FIG. 35, the substituted circuit includes a shift register 126, an ID check circuit 128, an error check circuit 130, an AND circuit AND20 and a reception buffer 132. The shift register 126 has the bit length (15 bits in this example) corresponding to transmission data. The ID check circuit 128 consists of an ID setter for setting the self-slave identification data and a comparator for comparing a value set in the ID setter with the most significant 4 bits of the shift register 126, and outputs a high level signal when both are identical. The error check circuit 130 includes a format check circuit 130a for detecting whether a synchronous bit BSY is correctly inserted, and a redundant bit check circuit 130b for checking whether all the redundant bits are of an identical value. The AND circuit AND20 inputs the respective outputs of the ID check circuit 128, the format check circuit 130a and the redundant bit check circuit 130b as well as the error check timing signa ECT produced by the timing generating circuit 40a and outputted when the shift register 126 receives data for one frame, and outputs a signal of H-level when all the inputs are H-level. The reception buffer 132 takes data D0 to D4 set in the shift register 126 with the output of the AND circuit AND20 as a latch signal LT.

The format check circuit 130a inputs the respective outputs of an exclusive OR circuit XOR20, which inputs the identification data ID3 and a synchronous bit obtained by inverting the identification data ID3, an exclusive OR circuit XOR21, which inputs the reception data D2 and a synchronous bit obtained by inverting the reception data D2, and an exclusive OR circuit XOR22, which inputs the reception data D4 and a synchronous bit obtained by inverting the reception data D4. The format check circuit 130a outputs a high level signal when all the inputs are high, that is, normal.

The redundant bit check circuit 130b inputs the respective outputs of an exclusive OR circuit XOR23, which inputs the reception data D0 and the redundant bit of its negative logic, an exclusive OR circuit XOR24, which inputs the reception data D3 and the redundant bit of its negative logic, and an exclusive OR circuit XOR25, which inputs the redundant bit of the negative logic of the reception data D3 and the redundant bit of the positive logic thereof. The redundant bit check circuit 130b outputs a high level signal when all the inputs are high.

In the respective communication sections 86, 88 and 90 of the master MT, in the transmission of transmission data, the CPU outputs data bit by bit, and the transmission data containing a redundant bit can be readily produced using software.

In the communication circuit thus constituted, the identification data ID0 to ID3 in the received transmission data coincides with the predetermined self-node identification data. Also, the synchronous bit is correctly inserted in the transmission data. Further, when all the redundant bits are identical to the original data bits, the reception data D0 to D4 are taken in the reception buffer 132.

Accordingly, in the communication system using the transmission data of the format shown in FIG. 34, since the data bit to which the redundant bit is added always has both the positive logic and the negative logic, even if a short-circuiting temporarily occurs on the transmission path, an error can be reliably detected.

In other words, even if the redundant bits are added, if they are all identical in logic to the original data, when a short-circuiting temporarily occurs, it is not distinguishable from a low-level signal. However, with inclusion of the redundant bit of a negative logic, it can be reliably identified.

In this description, if all the redundant bits are not identical to the values of the original date, all of other data are not also taken. However, in the case where each bit is data having an independent meaning from other bits, it may be determined whether the received data is taken every bit of the reception data D0 to D4, or not. In this case, the scrapping of normal data due to an error of other bits may be prevented, thereby realizing communication with high efficiency. Also, as in the reception data D3, when it is expanded to 3 bits or more, its value may be judged in accordance with a majority decision.

Further, although the expanded bit is arranged continuous with the original bit, they may be away from each other. In this case, if it is expanded to 3 bits or more and its value is judged in accordance with a majority decision, a burst-type error hardly influences all of the expanded bits. As a result, a highly noise-resistant communication system can be realized.

Furthermore, in the foregoing embodiments, the logical section 92 and the respective communication sections 86, 88 and 90 are constituted by different microprocessors, respectively. In the case where the processing performance of the CPU is large, the microprocessor of the logical section 92 may conduct the processing of the microprocessor of the communication sections 86, 88 and 90.

Furthermore, in the foregoing embodiments, although the master MT transmits data to the slave, the master M side may transmit only the identification data block IDB and the SOF code shown in FIG. 3, and the slave may transmit the response data subsequently to the identification data block IDB.

While there has been described in connection with the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A data receiving unit comprising:

A) data receiving means for receiving, through a transmission path, transmission data which has been encoded according to a predetermined transmission code using a predetermined transmission clock signal and which includes a reference pulse having a pulse width corresponding to a period of said transmission clock signal;

B) clock generating means for generating a received clock signal in synchronization with said transmission data, said clock generating means including
   i) an oscillator generating a reference clock signal having a period which is shorter than said period of said transmission clock signal,
   ii) a counter counting an interval between points of change of said transmission data according to said reference clock signal,
   iii) a reference pulse detector detecting said reference pulse based on a count value from said counter, and
   iv) a received clock signal generating circuit generating said received clock signal in synchronization with said transmission data by frequency-dividing said reference clock signal based on a count value of said counter when said counter counts said pulse width of said reference pulse; and C) data decoding means for decoding said transmission data using said received clock signal.

2. The data receiving unit of claim 1, said clock generating means further including a correction circuit resetting said received clock signal generating circuit when detecting said points of change of said transmission data, thereby correcting a phase shift of said received clock signal.

3. The data receiving unit of claim 1, wherein said reference pulse detector detects said reference pulse based on a ratio of count values corresponding to intervals of two continuous sections of said transmission data which have opposite logic levels, said two continuous sections interposing a point of change of said transmission data therebetween.

4. The data receiving unit of claim 1, said clock generating means further including a count value determining circuit determining whether said count value of said counter circuit is within a predetermined range of a count value used for said frequency division of said reference clock signal when said reference pulse detector detects said reference pulse;

wherein when said counter value determining circuit determines that said count value of said counter circuit is within said predetermined range, said count value used for said frequency division of said reference clock is renewed to said count value of said counter circuit.

5. The data receiving unit of claim 4, further comprising error determining means for determining whether data decoded by said data decoding means is in error;

wherein said count value determining circuit includes determination range changing means for changing said predetermined range used for determination due to said count value determining circuit based on a determination result from said error determining means.

6. The data receiving unit of claim 1, wherein:

said data receiving means comprises a plurality of binary coding circuits having threshold values different from each other, corresponding ones of said clock generating means and said data decoding means being provided in correspondence with each of said binary coding circuits; and said data receiving unit further comprises error determining means for determining whether data which has been decoded by each of said data decoding means is in error, and selection output means for selecting a output of said data decoding means determined to be not in error by said error determining means to output a selected output.

7. The data receiving unit of claim 1, wherein said clock generating means is implemented in a semiconductor integrated circuit.

8. A data communication unit comprising:

A) a data transmitting unit which includes
   i) data encoding means for encoding data to be transmitted according to a predetermined transmission code using a predetermined transmission clock signal to generate transmission data,
   ii) a reference pulse adding circuit adding a reference pulse having a pulse width corresponding to a period of said transmission clock signal to a head of said transmission data, and
   iii) data transmitting means for transmitting said transmission data generated by said data encoding means to a transmission path, said data transmitting means including a push-pull circuit enabling a 3-state output to said transmission path; and B) a data receiving unit which includes
   i) data receiving means for receiving, through said transmission path, said transmission data transmitted by said data transmitting means,
   ii) clock generating means for generating a received clock signal in synchronization with said transmission data, said clock generating means including
      a) an oscillator generating a reference clock signal having a period which is shorter than said period of said transmission clock signal,
      b) a counter counting an interval between points of change of said transmission data according to said reference clock signal,
      c) a reference pulse detector detecting said reference pulse based on a count value from said counter, and
      d) a received clock signal generating circuit generating said received clock signal in synchronization with said transmission data by frequency-dividing said reference clock signal based on a count value of said counter when said counter counts said pulse width of said reference pulse,
   iii) data decoding means for decoding said transmission data using said received clock signal,
   iv) response data encoding means for encoding data to be transmitted according to said predetermined transmission code using said received clock signal generated by said clock generating means to generate transmission data, and
   v) response data transmitting means for transmitting said encoded data generated by said response data encoding means with said reference pulse added by said reference pulse adding means to said transmission path at a predetermined timing, said response data transmitting means including a transistor which is connected to said transmission path in an open collector configuration.

9. The data communication unit of claim 8, wherein said response data transmitting means includes a current limiter circuit prohibiting a current output of said transistor from exceeding a current output of said data transmitting means.

10. The data communication unit of claim 8, said response data transmitting means further including a negative feedback circuit negatively feeding a change in output of said transistor back to a base of said transistor.

11. A data communication system including a plurality of communication units each having
   A) a data transmitting unit including
      i) data encoding means for encoding data to be transmitted according to a predetermined transmission code using a predetermined transmission clock signal to generate transmission data,
      ii) a reference pulse adding circuit adding a reference pulse having a pulse width corresponding to a period of said transmission clock signal to a head of said transmission data, and
      iii) data transmitting means for transmitting said transmission data generated by said data encoding means to a transmission path; and
   B) at least one data receiving unit, each of said at least one data receiving units including
      i) data receiving means for receiving, through said transmission path, said transmission data transmitted by said data transmitting means,
      ii) clock generating means for generating a received clock signal in synchronization with said transmission data, said clock generating means including
         a) an oscillator generating a reference clock signal having a period which is shorter than said period of said transmission clock signal,
         b) a counter counting an interval between points of change of said transmission data according to said reference clock signal,
         c) a reference pulse detector circuit detecting said reference pulse based on a count value from said counter, and
         d) a received clock signal generating circuit generating said received clock signal in synchronization with said transmission data by frequency-dividing said reference clock signal based on a count value of said counter when said counter counts said pulse width of said reference pulse, and
      iii) data decoding means for decoding said transmission data using said received clock signal;
   wherein said data transmitting unit and said data receiving units in said communication unit are connected to a source of operative power to be turned on and turned off together.

12. A data communication unit comprising:
   A) a data transmitting unit including
      i) data encoding means for encoding data to be transmitted according to a predetermined transmission code using a predetermined transmission clock signal to generate transmission data, said data encoding means including bit expansion means for expanding a predetermined bit of data to be transmitted into a plurality of bits by including redundant bits including at least a bit logically inverse to said predetermined bit with said predetermined bit,
      ii) a reference pulse adding circuit adding a reference pulse having a pulse width corresponding to a period of said transmission clock signal to a head of said transmission data, and
      iii) data transmitting means for transmitting said transmission data generated by said data encoding means to a transmission path; and
   B) at least one data receiving unit comprising
      i) data receiving means for receiving, through said transmission path, said transmission data transmitted by said data transmitting means,
      ii) clock generating means for generating a received clock signal in synchronization with said transmission data, said clock generating means including
         a) an oscillator generating a reference clock signal having a period which is shorter than said period of said transmission clock signal,
         b) a counter counting an interval between points of change of said transmission data according to said reference clock signal,
         c) a reference pulse detector detecting said reference pulse based on a count value from said counter, and
         d) a received clock signal generating circuit generating said received clock signal in synchronization with said transmission data by frequency-dividing said reference clock signal based on a count value of said counter when said counter counts said pulse width of said reference pulse, and
      iii) data decoding means for decoding said transmission data using said received clock; said data decoding means including an error detecting means for detecting whether said redundant bits added by said bit expansion means are in error.

13. A multiplex communication unit in data communication system, said multiplex communication unit comprising:
   A) a data transmitting unit including
      i) data encoding means for encoding data to be transmitted according to a predetermined transmission code using a predetermined transmission clock signal to generate transmission data,
      ii) a reference pulse adding circuit adding a reference pulse having a pulse width corresponding to a period of said transmission clock signal to a head of said transmission data, and
      iii) data transmitting means for transmitting said transmission data generated by said data encoding means to a transmission path,
      iv) synchronous signal sending means for periodically sending out a synchronous signal including a low level and a high level at a predetermined timing, following said sending of said transmission data; and
   B) a plurality of data receiving units, each of said data receiving units including
      i) data receiving means for receiving, through said transmission path, said transmission data transmitted by said data transmitting means,
      ii) clock generating means for generating a received clock signal in synchronization with said transmission data, said clock generating means including
         a) an oscillator generating a reference clock signal having a period which is shorter than said period of said transmission clock signal,
         b) a counter counting an interval between points of change of said transmission data according to said reference clock signal,
         c) a reference pulse detector detecting said reference pulse based on a count value from said counter,
         d) a received clock signal generating circuit generating said received clock signal in synchronization with said transmission data by frequency-dividing said reference clock signal based on a count value of said counter when said counter counts said pulse width of said reference pulse, and e) a correction circuit which resets said received clock signal generating circuit when detecting said point of change of said transmission data, for correcting a phase shift of said received clock signal, iii) data decoding means for decoding said transmission data using said received clock signal, and iv) response sending means for sending out a response signal notifying said data transmitting unit of a reception condition of said transmission data at a predetermined timing which is different for different data receiving units.

14. A data communication unit of a polling system, said data communication unit having a data transmitting unit and a plurality of data receiving units in which said data transmitting unit sends inquiry data to each of said data receiving units, and each of said data receiving units outputs response data corresponding to said inquiry data, wherein:

said data transmitting unit includes

A) data encoding means for encoding data to be transmitted according to a predetermined transmission code using a predetermined transmission clock signal to generate transmission data, B) a reference pulse adding circuit adding a reference pulse having a pulse width corresponding to a period of said transmission clock to a head of said transmission data, C) data transmitting means for transmitting said transmission data generated by said data encoding means to a transmission path, and D) identification information giving means for generating said inquiry data consisting of predetermined identification information for uniquely identifying each of said data receiving units; and said data receiving unit includes A) data receiving means for receiving, through said transmission path, said transmission data transmitted by said data transmitting means, B) clock generating means for generating a received clock signal in synchronization with said transmission data, said clock generating means including i) an oscillator generating a reference clock signal having a period which is shorter than said period of said transmission clock signal, ii) a counter counting an interval between points of change of said transmission data according to said reference clock signal, iii) a reference pulse detector detecting said reference pulse based on a count value from said counter, iv) a received clock signal generating circuit generating said received clock signal in synchronization with said transmission data by frequency-dividing said reference clock signal based on a count value of said counter when said counter counts said pulse width of said reference pulse, v) data decoding means for decoding said transmission data using said received clock, vi) time data generating means for generating time data representative of a current time based on said received clock signal generated by said clock generating means, vii) a response data generating means for encoding said time data which is representative of a time when predetermined transmission data and said transmission data have been generated according to a transmission code using said received clock signal to generate response data, and viii) response data sending means for sending said response data following said transmission data upon detection of said inquiry data which designates said data communication unit itself.

15. The data communication unit of claim 14, wherein said data receiving unit further includes a semiconductor sensor; and transmission data means for producing said transmission data based on a detection value of said semiconductor sensor.

16. The data communication unit of claim 14, wherein:

said data transmitting unit further includes

A) first sending prohibiting means for prohibiting sending of succeeding inquiry data for only a time required for sending said response data by said data receiving unit after sending said inquiry data, and B) second sending prohibiting means for prohibiting sending of succeeding inquiry data further for said required time when sending inquiry data to which a predetermined identification information has been given; and said data receiving unit further includes response data sending permitting means for permitting sending of said response data from said response data sending means after a waiting state for said required time has elapsed when predetermined identification data has been given to said inquiry data.

* * * * *